US012192121B2

(12) United States Patent
DiFerdinando

(10) Patent No.: US 12,192,121 B2
(45) Date of Patent: Jan. 7, 2025

(54) HYPERSCALE SWITCH ELEMENT (HSS) FOR DATA CENTER NETWORK SWITCHING

(71) Applicant: Brightways Corporation, Langhorne, PA (US)

(72) Inventor: Stephen DiFerdinando, Langhorne, PA (US)

(73) Assignee: Brightways Corporation, Langhorne, PA (US)

( * ) Notice: Subject to any disclaimer, the term of this patent is extended or adjusted under 35 U.S.C. 154(b) by 568 days.

(21) Appl. No.: 17/567,090

(22) Filed: Dec. 31, 2021

(65) Prior Publication Data

US 2022/0321498 A1    Oct. 6, 2022

Related U.S. Application Data

(63) Continuation-in-part of application No. 17/558,162, filed on Dec. 21, 2021, now abandoned, which is a
(Continued)

(51) Int. Cl.
*H04L 49/101*  (2022.01)
*H04L 45/00*  (2022.01)
*H04L 45/745*  (2022.01)

(52) U.S. Cl.
CPC ............ *H04L 49/101* (2013.01); *H04L 45/66* (2013.01); *H04L 45/745* (2013.01)

(58) Field of Classification Search
CPC ...... H04L 49/101; H04L 45/66; H04L 47/745
See application file for complete search history.

(56) References Cited

U.S. PATENT DOCUMENTS

| 5,425,026 A | * | 6/1995 | Mori ................. H04Q 11/0478 370/410 |
| 8,804,733 B1 | | 8/2014 | Safrai et al. |

(Continued)

FOREIGN PATENT DOCUMENTS

| JP | 2017519449 A | 7/2017 |
| WO | 2013006154 A1 | 1/2013 |

OTHER PUBLICATIONS

International Search Report & Written Opinion in PCT Application No. PCT/US2019/038238 mailed Dec. 12, 2019, (8 pages).

*Primary Examiner* — Yaotang Wang
(74) *Attorney, Agent, or Firm* — Howard IP Law Group, PC

(57) ABSTRACT

A hyperscale switch device (HSS) comprising: a plurality of input/output (I/O) switch modules instantiated on an integrated circuit in switchable communication with a plurality of direct connect switch modules (PSP SFMs) instantiated on the integrated circuit via a cross bar switch, for communicating data packets between external devices, wherein for the plurality of input/output (I/O) switch modules instantiated on the integrated circuit, each I/O switch module instantiation having on an ingress side, a forwarding engine configured to receive and forward data packet requests; and an interface responsive to the forwarding engine for communicating a data packet out from the I/O switch module according to a port number provided by the forwarding engine; wherein the forwarding engine receives a network address identifier received in a data packet at an I/O port for transmission to a destination I/O port, and determines an internal port number for routing by the switch engine out from the switch module, according to a lookup table which
(Continued)

maps internal port numbers of the switch module with destination I/O ports corresponding to peripheral devices connected to a network.

16 Claims, 62 Drawing Sheets

Related U.S. Application Data continuation of application No. 16/853,496, filed on Apr. 20, 2020, now Pat. No. 11,206,225, which is a continuation of application No. 16/357,226, filed on Mar. 18, 2019, now Pat. No. 10,630,606.

(56) References Cited

U.S. PATENT DOCUMENTS

| | | |
|---|---|---|
| 9,225,549 B2 | 12/2015 | Christenson |
| 2002/0118692 A1* | 8/2002 | Oberman ............ H04L 49/3081 370/389 |
| 2003/0081598 A1* | 5/2003 | Bresniker ............ H04Q 3/5455 370/386 |
| 2010/0085981 A1 | 4/2010 | Gupta et al. |
| 2010/0316055 A1 | 12/2010 | Belanger et al. |
| 2012/0287787 A1 | 11/2012 | Kamble et al. |
| 2013/0346628 A1 | 12/2013 | Canion et al. |
| 2015/0180718 A1 | 6/2015 | Anantharam et al. |
| 2016/0350151 A1 | 12/2016 | Zou et al. |
| 2017/0111295 A1 | 4/2017 | Snowdon et al. |
| 2018/0324097 A1 | 11/2018 | Liu et al. |

\* cited by examiner

| Route Path | 00 (PSP) | 01 (PSP) | 10 (PSP) | 11 (I/O) | FPGA | I/O Port |
|---|---|---|---|---|---|---|
| Line Card | | | | | 2 | 17 |
| 16 | | | | | | |

*Fig. 6C*

MAC LEARNING - SFM READ
CMD=HASH LUT ROW WRITE = '01' HEX

| Column 1 | BYTE1 | BYTE2 | BYTE3 | BYTE4 | BYTE5 | BYTE6 | BYTE7 | BYTE8 |
|---|---|---|---|---|---|---|---|---|
| WD0 | MDA | MDA | MDA | MDA | MDA | MDA | MSA | MDA |
| WD1 | MSA | MSA | MSA | MSA | TYP | TYP |  | CMD |
| WD2 | SFM_0 | <SPARE> | MAG_1 | MAG_1 | MAG_1 | MAG_1 | MAG_1 | MAG_1 |
| WD3 | SFM_0 | <SPARE> | MAG_2 | MAG_2 | MAG_2 | MAG_2 | MAG_2 | MAG_2 |
| WD4 | SFM_0 | <SPARE> | MAG_3 | MAG_3 | MAG_3 | MAG_3 | MAG_3 | MAG_3 |
| WD5 | SFM_0 | <SPARE> | MAG_4 | MAG_4 | MAG_4 | MAG_4 | MAG_4 | MAG_4 |
| WD6 | SFM_0 | <SPARE> | MAG_5 | MAG_5 | MAG_5 | MAG_5 | MAG_5 | MAG_5 |
| WD7 | SFM_0 | <SPARE> | MAG_6 | MAG_6 | MAG_6 | MAG_6 | MAG_6 | MAG_6 |
| WD8 | SFM_1 | <SPARE> | MAG_1 | MAG_1 | MAG_1 | MAG_1 | MAG_1 | MAG_1 |
| WD9 | SFM_1 | <SPARE> | MAG_2 | MAG_2 | MAG_2 | MAG_2 | MAG_2 | MAG_2 |
| WD10 | SFM_1 | <SPARE> | MAG_3 | MAG_3 | MAG_3 | MAG_3 | MAG_3 | MAG_3 |
| WD11 | SFM_1 | <SPARE> | MAG_4 | MAG_4 | MAG_4 | MAG_4 | MAG_4 | MAG_4 |
| WD12 | SFM_2 | <SPARE> | MAG_1 | MAG_1 | MAG_1 | MAG_1 | MAG_1 | MAG_1 |
| WD13 | SFM_2 | <SPARE> | MAG_2 | MAG_2 | MAG_2 | MAG_2 | MAG_2 | MAG_2 |
| WD14 | SFM_2 | <SPARE> | MAG_3 | MAG_3 | MAG_3 | MAG_3 | MAG_3 | MAG_3 |
| WD15 | SFM_2 | <SPARE> | MAG_4 | MAG_4 | MAG_4 | MAG_4 | MAG_4 | MAG_4 |
| WD16 | SFM_2 | <SPARE> | MAG_5 | MAG_5 | MAG_5 | MAG_5 | MAG_5 | MAG_5 |
| WD17 | SFM_3 | <SPARE> | MAG_1 | MAG_1 | MAG_1 | MAG_1 | MAG_1 | MAG_1 |
| WD18 | SFM_3 | <SPARE> | MAG_2 | MAG_2 | MAG_2 | MAG_2 | MAG_2 | MAG_2 |
| WD19 | SFM_3 | <SPARE> | MAG_3 | MAG_3 | MAG_3 | MAG_3 | MAG_3 | MAG_3 |
| WD20 | SFM_4 | <SPARE> | MAG_1 | MAG_1 | MAG_1 | MAG_1 | MAG_1 | MAG_1 |
| WD21 | SFM_4 | <SPARE> | MAG_2 | MAG_2 | MAG_2 | MAG_2 | MAG_2 | MAG_2 |
| WD22 | SFM_4 | <SPARE> | MAG_3 | MAG_3 | MAG_3 | MAG_3 | MAG_3 | MAG_3 |
| WD23 | SFM_5 | <SPARE> | MAG_1 | MAG_1 | MAG_1 | MAG_1 | MAG_1 | MAG_1 |
| WD24 | SFM_5 | <SPARE> | MAG_2 | MAG_2 | MAG_2 | MAG_2 | MAG_2 | MAG_2 |
| WD25 | SFM_6 | <SPARE> | MAG_1 | MAG_1 | MAG_1 | MAG_1 | MAG_1 | MAG_1 |

| WD26 | SFM_6 | <SPARE> | MAG_2 | MAG_2 | MAG_2 | MAG_2 | MAG_2 | MAG_2 |
|---|---|---|---|---|---|---|---|---|
| WD27 | SFM_6 | <SPARE> | MAG_3 | MAG_3 | MAG_3 | MAG_3 | MAG_3 | MAG_3 |
| WD28 | SFM_6 | <SPARE> | MAG_4 | MAG_4 | MAG_4 | MAG_4 | MAG_4 | MAG_4 |
| WD29 | SFM_7 | <SPARE> | MAG_1 | MAG_1 | MAG_1 | MAG_1 | MAG_1 | MAG_1 |
| WD30 | SFM_7 | <SPARE> | MAG_2 | MAG_2 | MAG_2 | MAG_2 | MAG_2 | MAG_2 |
| WD31 | SFM_7 | <SPARE> | MAG_3 | MAG_3 | MAG_3 | MAG_3 | MAG_3 | MAG_3 |
| WD32 | SFM_7 | <SPARE> | MAG_4 | MAG_4 | MAG_4 | MAG_4 | MAG_4 | MAG_4 |
| WD33 | SFM_8 | <SPARE> | MAG_1 | MAG_1 | MAG_1 | MAG_1 | MAG_1 | MAG_1 |
| WD34 | SFM_8 | <SPARE> | MAG_2 | MAG_2 | MAG_2 | MAG_2 | MAG_2 | MAG_2 |
| WD35 | SFM_8 | <SPARE> | MAG_3 | MAG_3 | MAG_3 | MAG_3 | MAG_3 | MAG_3 |
| WD36 | SFM_8 | <SPARE> | MAG_4 | MAG_4 | MAG_4 | MAG_4 | MAG_4 | MAG_4 |
| WD37 | SFM_8 | <SPARE> | MAG_5 | MAG_5 | MAG_5 | MAG_5 | MAG_5 | MAG_5 |
| WD38 | SFM_9 | <SPARE> | MAG_1 | MAG_1 | MAG_1 | MAG_1 | MAG_1 | MAG_1 |
| WD39 | SFM_9 | <SPARE> | MAG_2 | MAG_2 | MAG_2 | MAG_2 | MAG_2 | MAG_2 |
| WD40 | SFM_9 | <SPARE> | MAG_3 | MAG_3 | MAG_3 | MAG_3 | MAG_3 | MAG_3 |
| WD41 | SFM_10 | <SPARE> | MAG_1 | MAG_1 | MAG_1 | MAG_1 | MAG_1 | MAG_1 |
| WD42 | SFM_11 | <SPARE> | MAG_1 | MAG_1 | MAG_1 | MAG_1 | MAG_1 | MAG_1 |
| WD43 | SFM_11 | <SPARE> | MAG_2 | MAG_2 | MAG_2 | MAG_2 | MAG_2 | MAG_2 |
| WD44 | SFM_11 | <SPARE> | MAG_3 | MAG_3 | MAG_3 | MAG_3 | MAG_3 | MAG_3 |
| WD45 | SFM_11 | <SPARE> | MAG_4 | MAG_4 | MAG_4 | MAG_4 | MAG_4 | MAG_4 |
| WD46 | SFM_11 | <SPARE> | MAG_5 | MAG_5 | MAG_5 | MAG_5 | MAG_5 | MAG_5 |
| WD47 | SFM_12 | <SPARE> | MAG_1 | MAG_1 | MAG_1 | MAG_1 | MAG_1 | MAG_1 |
| WD48 | SFM_12 | <SPARE> | MAG_2 | MAG_2 | MAG_2 | MAG_2 | MAG_2 | MAG_2 |
| WD49 | SFM_12 | <SPARE> | MAG_3 | MAG_3 | MAG_3 | MAG_3 | MAG_3 | MAG_3 |
| WD60 | SFM_14 | <SPARE> | MAG_1 | MAG_1 | MAG_1 | MAG_1 | MAG_1 | MAG_1 |
| WD61 | SFM_14 | <SPARE> | MAG_2 | MAG_2 | MAG_2 | MAG_2 | MAG_2 | MAG_2 |
| WD62 | SFM_14 | <SPARE> | MAG_3 | MAG_3 | MAG_3 | MAG_3 | MAG_3 | MAG_3 |
| WD63 | SFM_14 | <SPARE> | MAG_4 | MAG_4 | MAG_4 | MAG_4 | MAG_4 | MAG_4 |
| WD64 | SFM_14 | <SPARE> | MAG_5 | MAG_5 | MAG_5 | MAG_5 | MAG_5 | MAG_5 |
| WD65 | SFM_14 | <SPARE> | MAG_6 | MAG_6 | MAG_6 | MAG_6 | MAG_6 | MAG_6 |

FIG. 12(Cont)

| CMD=HASH LUT ROW WRITE = '01' HEX | | | | | | | | |
|---|---|---|---|---|---|---|---|---|
| Column 1 | BYTE1 | BYTE2 | BYTE3 | BYTE4 | BYTE5 | BYTE6 | BYTE7 | BYTE8 |
| WD0 | MDA | MDA | MDA | MDA | MDA | MDA | MDA | MDA |
| WD1 | MSA | MSA | MSA | MSA | MSA | TYP | TYP | CMD |
| WD2 | SFM | ROW | ROW | R0_B1 | R0_B2 | R0_B3 | R0_B4 | R0_B5 |
| WD3 | R0_B6 | R0_B7 | R0_B8 | R0_B9 | R0_B10 | R0_B11 | R0_B12 | R0_B13 |
| WD4 | R0_B14 | R0_B15 | R0_B16 | R0_B17 | R0_B18 | | | |
| WD5 | SFM | ROW | ROW | R1_B1 | R1_B2 | R1_B3 | R1_B4 | R1_B5 |
| WD6 | R1_B6 | R1_B7 | R1_B8 | R1_B9 | R1_B10 | R1_B11 | R1_B12 | R1_B13 |
| WD7 | R1_B14 | R1_B15 | R1_B16 | R1_B17 | R1_B18 | | | |
| WD8 | SFM | ROW | ROW | R2_B1 | R2_B2 | R2_B3 | R2_B4 | R2_B5 |
| WD9 | R2_B6 | R2_B7 | R2_B8 | R2_B9 | R2_B10 | R2_B11 | R2_B12 | R2_B13 |
| WD10 | R2_B14 | R2_B15 | R2_B16 | R2_B17 | R2_B18 | | | |
| WD11 | SFM | ROW | ROW | R3_B1 | R3_B2 | R3_B3 | R3_B4 | R3_B5 |
| WD12 | R3_B6 | R3_B7 | R3_B8 | R3_B9 | R3_B10 | R3_B11 | R3_B12 | R3_B13 |

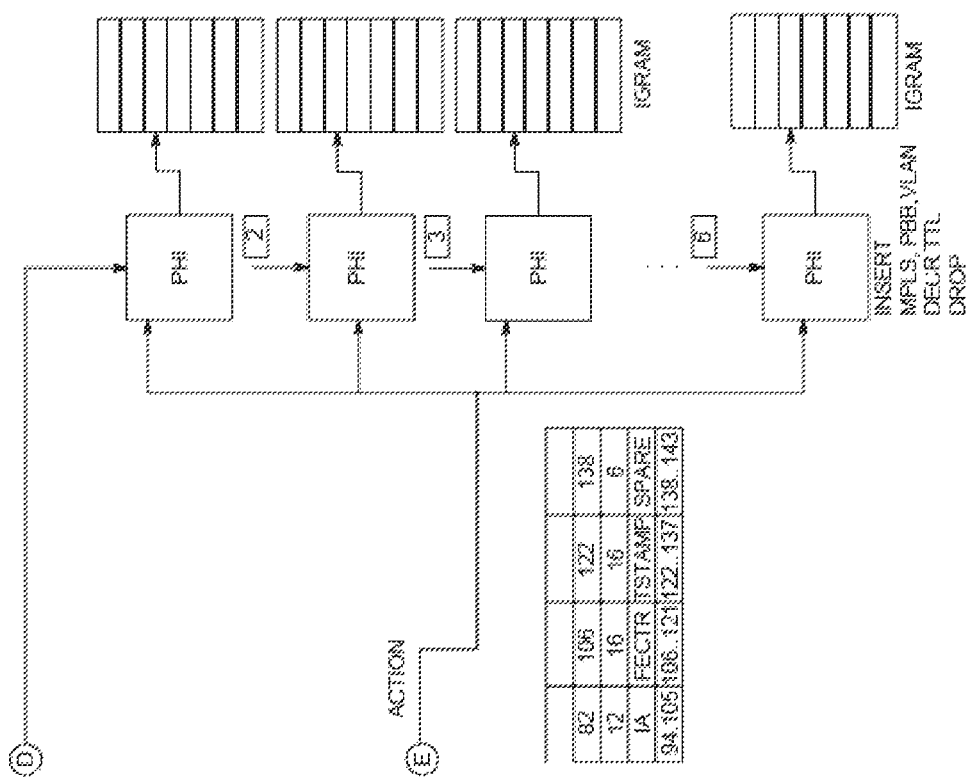

| OPENFLOW MTBL.MAC | BYTE1 | BYTE2 | BYTE3 | BYTE4 | BYTE5 | BYTE6 | BYTE7 | BYTE8 |
| CMD = OF.MTBL.MAC = XA0 | | | | | | | | |
| Column 1 | | | | | | | | |
| WD0 | MDA | MDA | MDA | MDA | MDA | MDA | MSA | MSA |
| WD1 | MSA | MSA | MSA | MSA | MSA | MSA | RC | CMD |
| WD2 | WRADR | WRADR | WRADR | WRADR | WDACNT | WDACNT | SPARE | SPARE |
| WD3 | FID | FID | MAC | MAC | MAC | MAC | PRI | PRI |
| WD4 | ETYP | ETYP | IPRT | IPRT | MM | MM | SPARE | SPARE |
| WD5 | FID | FID | MAC | MAC | MAC | MAC | PRI | PRI |
| WD6 | ETYP | ETYP | IPRT | IPRT | MM | MM | SPARE | SPARE |
| WD7 | FID | FID | MAC | MAC | MAC | MAC | PRI | PRI |
| WD8 | | | | | | | | |
| WD9 | FID | FID | MAC | MAC | MAC | MAC | PRI | PRI |
| WD10 | ETYP | ETYP | IPRT | IPRT | MM | MM | SPARE | SPARE |
| WD11 | FID | FID | MAC | MAC | MAC | MAC | PRI | PRI |

| | ETYP | ETYP | IPRT | IPRT | MM | MM | SPARE | SPARE |
|---|---|---|---|---|---|---|---|---|
| WD12 | ETYP | ETYP | IPRT | IPRT | MM | MM | SPARE | SPARE |
| WD13 | FE# | FE# | MAC | MAC | MAC | MAC | PRI | PRI |
| WD14 | ETYP | ETYP | IPRT | IPRT | MM | MM | SPARE | SPARE |
| WD15 | FE# | FE# | MAC | MAC | MAC | MAC | PRI | PRI |
| WD16 | ETYP | ETYP | IPRT | IPRT | MM | MM | SPARE | SPARE |
| WD17 | FE# | FE# | MAC | MAC | MAC | MAC | PRI | PRI |
| WD18 | ETYP | ETYP | IPRT | IPRT | MM | MM | SPARE | SPARE |
| ... | | | | | | | | |
| WD181 | FE# | FE# | MAC | MAC | MAC | MAC | PRI | PRI |
| WD182 | ETYP | ETYP | IPRT | IPRT | MM | MM | SPARE | SPARE |
| WD183 | FE# | FE# | MAC | MAC | MAC | MAC | PRI | PRI |
| WD184 | ETYP | ETYP | IPRT | IPRT | MM | MM | SPARE | SPARE |
| WD185 | FE# | FE# | MAC | MAC | MAC | MAC | PRI | PRI |
| WD186 | ETYP | ETYP | IPRT | IPRT | MM | MM | SPARE | SPARE |
| WD187 | FE# | FE# | MAC | MAC | MAC | MAC | PRI | PRI |
| | ETYP | ETYP | IPRT | IPRT | MM | MM | SPARE | SPARE |

ONE PACKET LOADS 23 ROWS... TO LOAD 16 K ROWS REQUIRES 2,850 CONTROL PLANE PACKETS

TIME TO FILL ENTIRE TABLE = 64K_ROWS * 64_BYTES PER ROW * 8_BITS / 3e9 = 11mS

FIG. 14B(Cont)

| Field | | Description |
|---|---|---|
| OXM_OF_IN_PORT | Required in ingress | Ingress port. This may be a physical or logical port. |
| OXM_OF_ACTSET_OUTPUT | Required in egress | Egress port from action set. |
| OXM_OF_ETH_DST | Required | Ethernet destination address. Can use arbitrary bitmask |
| OXM_OF_ETH_SRC | Required | Ethernet source address. Can use arbitrary bitmask |
| OXM_OF_ETH_TYPE | Required | Ethernet type of the OpenFlow packet payload, after VLAN tags. |
| OXM_OF_IP_PROTO | Required | IPv4 or IPv6 Protocol number |
| OXM_OF_IPV4_SRC | Required | IPv4 source address. Can use subnet mask or arbitrary bit-mask |
| OXM_OF_IPV4_DST | Required | IPv4 destination address. Can use subnet mask or arbitrary bitmask |
| OXM_OF_IPV6_SRC | Required | IPv6 source address. Can use subnet mask or arbitrary bit-mask |
| OXM_OF_IPV6_DST | Required | IPv6 destination address. Can use subnet mask or arbitrary bitmask |
| OXM_OF_TCP_SRC | Required | TCP source port |
| OXM_OF_TCP_DST | Required | TCP destination port |
| OXM_OF_UDP_SRC | Required | UDP source port |
| OXM_OF_UDP_DST | Required | UDP destination port |

FIG. 14C

| FTBL | 0 | 32 | 64 | 72 | 82 | 94 | 106 | 122 | 138 |
|---|---|---|---|---|---|---|---|---|---|
| | 0 | 32 | 8 | 10 | 12 | 12 | 16 | 16 | 0 |
| | 32 | PBB | GRP | MTR | OPORT | IA | FECTR | TSTAMP | SPARE |
| | MPLS | | | | | | | | |
| | 0..31 | 32..63 | 64..71 | 72..81 | 82..93 | 94..105 | 106..121 | 122..137 | 138..140 |

| OPENFLOW FTBL | | | | | | | | |
|---|---|---|---|---|---|---|---|---|
| CMD = OF.FTBL.MAC = A8 | | | | | | | | |
| Column1 | BYTE1 | BYTE2 | BYTE3 | BYTE4 | BYTE5 | BYTE6 | BYTE7 | BYTE8 |
| WD0 | MDA | MDA | MDA | MDA | MDA | MDA | MSA | MSA |
| WD1 | MSA | MSA | MSA | MSA | TYP | TYP | RC | CMD |
| WD2 | WRADR | WRADR | WRADR | WRADR | WDCNT | WDCNT | SPARE | SPARE |
| WD3 | MPLS | MPLS | GRP | MTR | OPORT | OPORT | IA | IA |
| WD4 | MPLS | MPLS | GRP | MTR | OPORT | OPORT | IA | IA |
| WD5 | MPLS | MPLS | GRP | MTR | OPORT | OPORT | IA | IA |
| WD6 | MPLS | MPLS | GRP | MTR | OPORT | OPORT | IA | IA |
| WD7 | MPLS | MPLS | GRP | MTR | OPORT | OPORT | IA | IA |
| WD8 | MPLS | MPLS | GRP | MTR | OPORT | OPORT | IA | IA |
| WD199 | MPLS | MPLS | GRP | MTR | OPORT | OPORT | IA | IA |
| TIME TO FILL ENTIRE TABLE=64K ROWS * 8 BYTES PER ROW * 8 BITS / 3e9 = 1mms | | | | | | | | |

FIG. 14E

| | ORIGINAL PACKET | | | TAG INSERT W/1 TAG | |
|---|---|---|---|---|---|
| | CYL1 | CYL2 | | CYL1 | CYL2 |
| CYC0 | DMAC | DMAC | CYC0 | CYL1_0 | CYL2_0 |
| CYC1 | DMAC | DMAC | CYC1 | CYL1_1 | CYL2_1 |
| CYC2 | DMAC | SMAC | CYC2 | CYL1_2 | CYL2_2 |
| CYC3 | SMAC | SMAC | CYC3 | CYL1_3 | CYL2_3 |
| CYC4 | SMAC | SMAC | CYC4 | CYL1_4 | CYL2_4 |
| CYC5 | TYPE | PL0 | CYC5 | CYL1_5 | CYL2_5 |
| CYC6 | PL1 | PL2 | CYC6 | TAG | TAG |
| CYC7 | PL3 | PL4 | CYC7 | CYL1_6 | CYL2_6 |
| CYC8 | PL5 | | CYC8 | CYL1_7 | CYL2_7 |
| CYC9 | | | CYC9 | CYL1_8 | CYL2_8 |
| CYC10 | | | CYC10 | CYL1_9 | CYL2_9 |

Single Cycle Delay 1400

| | ORIGINAL PACKET | | | TAG INSERT W/1 TAG | |
|---|---|---|---|---|---|
| | CYL1 | CYL2 | | CYL1 | CYL2 |
| CYC0 | DMAC | DMAC | CYC0 | CYL1_0 | CYL2_0 |
| CYC1 | DMAC | DMAC | CYC1 | CYL1_1 | CYL2_1 |
| CYC2 | DMAC | SMAC | CYC2 | CYL1_2 | CYL2_2 |
| CYC3 | SMAC | SMAC | CYC3 | CYL1_3 | CYL2_3 |
| CYC4 | SMAC | SMAC | CYC4 | CYL1_4 | CYL2_4 |
| CYC5 | TYPE | PL0 | CYC5 | CYL1_5 | CYL2_5 |
| CYC6 | PL1 | PL2 | CYC6 | TAG | TAG |
| CYC7 | PL3 | PL4 | CYC7 | CYL1_6 | CYL2_6 |
| CYC8 | PL5 | | CYC8 | MPLS | MPLS |
| CYC9 | | | CYC9 | CYL1_7 | CYL2_7 |
| CYC10 | | | CYC10 | CYL1_8 | CYL2_8 |

| | ORIGINAL PACKET | | | | |
|---|---|---|---|---|---|
| | CYL1 | CYL2 | CYL3 | CYL4 | CYL5 |
| CYC0 | DMAC | DMAC | DMAC | DMAC | DMAC |
| CYC1 | SMAC | SMAC | SMAC | SMAC | TYPE |
| CYC2 | PL3 | PL4 | PL5 | PL6 | PL7 |
| CYC3 | PL11 | PL12 | PL13 | PL14 | PL15 |
| CYC4 | PL19 | PL20 | PL21 | PL22 | PL23 |
| CYC5 | PL27 | PL28 | PL29 | PL30 | PL31 |
| CYC6 | PL35 | PL36 | PL37 | PL38 | PL39 |
| CYC7 | PL43 | PL44 | PL45 | PL46 | PL47 |
| | ORIGINAL PACKET | | | | |
| | CYL1 | CYL2 | CYL3 | CYL4 | CYL5 |
| CYC0 | DMAC | DMAC | DMAC | DMAC | DMAC |
| CYC1 | SMAC | SMAC | SMAC | SMAC | TAG1 |
| CYC2 | PL1 | PL2 | PL3 | PL4 | PL5 |
| CYC3 | PL9 | PL10 | PL11 | PL12 | PL13 |
| CYC4 | PL17 | PL18 | PL19 | PL20 | PL21 |
| CYC5 | PL25 | PL26 | PL27 | PL28 | PL29 |
| CYC6 | PL33 | PL34 | PL35 | PL36 | PL37 |
| CYC7 | PL41 | PL42 | PL43 | PL44 | PL45 |
| | ORIGINAL PACKET | | | | |
| | CYL1 | CYL2 | CYL3 | CYL4 | CYL5 |
| CYC0 | DMAC | DMAC | DMAC | DMAC | DMAC |
| CYC1 | SMAC | SMAC | SMAC | SMAC | TAG1 |
| CYC2 | TYPE | PL0 | PL1 | PL2 | PL3 |
| CYC3 | PL7 | PL8 | PL9 | PL10 | PL11 |
| CYC4 | PL15 | PL16 | PL17 | PL18 | PL19 |
| CYC5 | PL23 | PL24 | PL25 | PL26 | PL27 |
| CYC6 | PL31 | PL32 | PL33 | PL34 | PL35 |
| CYC7 | PL39 | PL40 | PL41 | PL42 | PL43 |
| | ORIGINAL PACKET | | | | |
| | CYL1 | CYL2 | CYL3 | CYL4 | CYL5 |
| CYC0 | DMAC | DMAC | DMAC | DMAC | DMAC |
| CYC1 | SMAC | SMAC | SMAC | SMAC | TYPE |
| CYC2 | PL3 | PL4 | PL5 | PL6 | PL7 |
| CYC3 | PL11 | PL12 | PL13 | PL14 | PL15 |
| CYC4 | PL19 | PL20 | PL21 | PL22 | PL23 |
| CYC5 | PL27 | PL28 | PL29 | PL30 | PL31 |
| CYC6 | PL35 | PL36 | PL37 | PL38 | PL39 |
| CYC7 | PL43 | PL44 | PL45 | PL46 | PL47 |
| | ORIGINAL PACKET | | | | |
| | CYL1 | CYL2 | CYL3 | CYL4 | CYL5 |
| CYC0 | DMAC | DMAC | DMAC | DMAC | DMAC |
| CYC1 | SMAC | SMAC | SMAC | SMAC | TYPE |
| CYC2 | PL3 | PL4 | PL5 | PL6 | PL7 |
| CYC3 | PL11 | PL12 | PL13 | PL14 | PL15 |
| CYC4 | PL19 | PL20 | PL21 | PL22 | PL23 |
| CYC5 | PL27 | PL28 | PL29 | PL30 | PL31 |
| CYC6 | PL35 | PL36 | PL37 | PL38 | PL39 |
| CYC7 | PL43 | PL44 | PL45 | PL46 | PL47 |

| | | | | TAG INSERT W/1 TAG | | |
|---|---|---|---|---|---|---|
| CYL6 | CYL7 | CYL8 | | CYL1 | CYL2 | CYL3 |
| DMAC | SMAC | SMAC | CYC0 | DMAC | DMAC | DMAC |
| PL0 | PL1 | PL2 | CYC1 | SMAC | SMAC | SMAC |
| PL8 | PL9 | PL10 | CYC2 | PL1 | PL2 | PL3 |
| PL16 | PL17 | PL18 | CYC3 | PL9 | PL10 | PL11 |
| PL24 | PL25 | PL26 | CYC4 | PL17 | PL18 | PL19 |
| PL32 | PL33 | PL34 | CYC5 | PL25 | PL26 | PL27 |
| PL40 | PL41 | PL42 | CYC6 | PL33 | PL34 | PL35 |
| PL48 | PL49 | PL50 | CYC7 | PL41 | PL42 | PL43 |
| | | | | TAG INSERT W/2 TAG | | |
| CYL6 | CYL7 | CYL8 | | CYL1 | CYL2 | CYL3 |
| DMAC | SMAC | SMAC | CYC0 | DMAC | DMAC | DMAC |
| TAG1 | TYPE | PL0 | CYC1 | SMAC | SMAC | SMAC |
| PL6 | PL7 | PL8 | CYC2 | TYPE | PL0 | PL1 |
| PL14 | PL15 | PL16 | CYC3 | PL7 | PL8 | PL9 |
| PL22 | PL23 | PL24 | CYC4 | PL15 | PL16 | PL17 |
| PL30 | PL31 | PL32 | CYC5 | PL23 | PL24 | PL25 |
| PL38 | PL39 | PL40 | CYC6 | PL31 | PL32 | PL33 |
| PL46 | PL47 | PL48 | CYC7 | PL39 | PL40 | PL41 |
| | | | | TAG INSERT W/3 TAG | | |
| CYL6 | CYL7 | CYL8 | | CYL1 | CYL2 | CYL3 |
| DMAC | SMAC | SMAC | CYC0 | DMAC | DMAC | DMAC |
| TAG1 | TAG2 | TAG2 | CYC1 | SMAC | SMAC | SMAC |
| PL4 | PL5 | PL6 | CYC2 | TAG3 | TAG3 | TYPE |
| PL12 | PL13 | PL14 | CYC3 | PL5 | PL6 | PL7 |
| PL20 | PL21 | PL22 | CYC4 | PL13 | PL14 | PL15 |
| PL28 | PL29 | PL30 | CYC5 | PL21 | PL22 | PL23 |
| PL36 | PL37 | PL38 | CYC6 | PL29 | PL30 | PL31 |
| PL44 | PL45 | PL46 | CYC7 | PL37 | PL38 | PL39 |
| | | | | TAG INSERT W/1 TAG | | |
| CYL6 | CYL7 | CYL8 | | MPLS | CYL2 | CYL3 |
| DMAC | SMAC | SMAC | CYC0 | DMAC | DMAC | DMAC |
| PL0 | PL1 | PL2 | CYC1 | SMAC | SMAC | SMAC |
| PL8 | PL9 | PL10 | CYC2 | MPLS | PL0 | PL1 |
| PL16 | PL17 | PL18 | CYC3 | PL7 | PL8 | PL9 |
| PL24 | PL25 | PL26 | CYC4 | PL15 | PL16 | PL17 |
| PL32 | PL33 | PL34 | CYC5 | PL23 | PL24 | PL25 |
| PL40 | PL41 | PL42 | CYC6 | PL31 | PL32 | PL33 |
| PL48 | PL49 | PL50 | CYC7 | PL39 | PL40 | PL41 |
| | | | | TAG INSERT W/1 TAG | | |
| CYL6 | CYL7 | CYL8 | | MPLS | CYL2 | CYL3 |
| DMAC | SMAC | SMAC | CYC0 | CYL1_1 | CYL2_1 | CYL3_1 |
| PL0 | PL1 | PL2 | CYC1 | CYL1_2 | CYL2_2 | CYL3_2 |
| PL8 | PL9 | PL10 | CYC2 | CYL5_3 | MPLS | MPLS |
| PL16 | PL17 | PL18 | CYC3 | CYL3_3 | CYL4_3 | CYL5_3 |
| PL24 | PL25 | PL26 | CYC4 | CYL3_4 | CYL4_4 | CYL5_4 |
| PL32 | PL33 | PL34 | CYC5 | CYL3_5 | CYL4_5 | CYL5_5 |
| PL40 | PL41 | PL42 | CYC6 | CYL3_6 | CYL4_6 | CYL5_6 |
| PL48 | PL49 | PL50 | CYC7 | CYL3_7 | CYL4_7 | CYL5_7 |

FIG. 14K(Cont)

| CYL4 | CYL5 | CYL6 | CYL7 | CYL8 |
|---|---|---|---|---|
| DMAC | DMAC | DMAC | SMAC | SMAC |
| SMAC | TAG | TAG | TYPE | PL0 |
| PL4 | PL5 | PL6 | PL7 | PL8 |
| PL12 | PL13 | PL14 | PL15 | PL16 |
| PL20 | PL21 | PL22 | PL23 | PL24 |
| PL28 | PL29 | PL30 | PL31 | PL32 |
| PL36 | PL37 | PL38 | PL39 | PL40 |
| PL44 | PL45 | PL46 | PL47 | PL48 |
| | | | | |
| CYL4 | CYL5 | CYL6 | CYL7 | CYL8 |
| DMAC | DMAC | DMAC | SMAC | SMAC |
| SMAC | TAG1 | TAG1 | TAG2 | TAG2 |
| PL2 | PL3 | PL4 | PL5 | PL6 |
| PL10 | PL11 | PL12 | PL13 | PL14 |
| PL18 | PL19 | PL20 | PL21 | PL22 |
| PL26 | PL27 | PL28 | PL29 | PL30 |
| PL34 | PL35 | PL36 | PL37 | PL38 |
| PL42 | PL43 | PL44 | PL45 | PL46 |
| | | | | |
| CYL4 | CYL5 | CYL6 | CYL7 | CYL8 |
| DMAC | DMAC | DMAC | SMAC | SMAC |
| SMAC | TAG1 | TAG1 | TAG2 | TAG2 |
| PL0 | PL1 | PL2 | PL3 | PL4 |
| PL8 | PL9 | PL10 | PL11 | PL12 |
| PL16 | PL17 | PL18 | PL19 | PL20 |
| PL24 | PL25 | PL26 | PL27 | PL28 |
| PL32 | PL33 | PL34 | PL35 | PL36 |
| PL40 | PL41 | PL42 | PL43 | PL44 |
| | | | | |
| CYL4 | CYL5 | CYL6 | CYL7 | CYL8 |
| DMAC | DMAC | DMAC | SMAC | SMAC |
| SMAC | TAG | TAG | TYPE | MPLS |
| PL2 | PL3 | PL4 | PL5 | PL6 |
| PL10 | PL11 | PL12 | PL13 | PL14 |
| PL18 | PL19 | PL20 | PL21 | PL22 |
| PL26 | PL27 | PL28 | PL29 | PL30 |
| PL34 | PL35 | PL36 | PL37 | PL38 |
| PL42 | PL43 | PL44 | PL45 | PL46 |
| | | | | |
| CYL4 | CYL5 | CYL6 | CYL7 | CYL8 |
| CYL4_1 | CYL5_1 | CYL6_1 | CYL7_1 | CYL8_1 |
| CYL4_2 | TAG | TAG | TAG | TAG |
| CYL6_2 | CYL7_2 | CYL8_2 | CYL1_3 | CYL2_3 |
| CYL6_3 | CYL7_3 | CYL8_3 | CYL1_4 | CYL2_4 |
| CYL6_4 | CYL7_4 | CYL8_4 | CYL1_5 | CYL2_5 |
| CYL6_5 | CYL7_5 | CYL8_5 | CYL1_6 | CYL2_6 |
| CYL6_6 | CYL7_6 | CYL8_6 | CYL1_7 | CYL2_7 |
| CYL6_7 | CYL7_7 | CYL8_7 | CYL1_8 | CYL2_8 |

FIG. 14K(Cont)

| Counter | Bits | |
|---|---|---|
| Per Flow Table | | |
| Reference Count (active entries) | 32 | Required |
| Pocket Lookup | 64 | Optional |
| Pocket Matches | 64 | Optional |
| Per Flow Entry | | |
| Received Packets | 64 | Optional |
| Received Bytes | 64 | Optional |
| Duration (Seconds) | 32 | Required |
| Duration (nanoSeconds) | 32 | Optional |
| Per Post | | |
| Received Packets | 64 | Required |
| Transmitted Packets | 64 | Required |
| Received Bytes | 64 | Optional |
| Transmitted Bytes | 64 | Optional |
| Receive Drops | 64 | Optional |
| Transmit Drops | 64 | Optional |
| Receive Errors | 64 | Optional |
| Transmit Errors | 64 | Optional |
| Receive Frame Alignment Errors | 64 | Optional |
| Receive Overrun Errors | 64 | Optional |
| Receive CRC Errors | 64 | Optional |
| Collisions | 64 | Optional |
| Duration (Seconds) | 32 | Required |
| Duration (nanoSeconds) | 32 | Optional |
| Per Queue | | |
| Transmit Packets | 64 | Required |
| Transmit Bytes | 64 | Optional |
| Transmit Overrun Errors | 64 | Optional |
| Duration (Seconds) | 32 | Required |
| Duration (nanoSeconds) | 32 | Optional |
| Per Group | | |
| Reference Count (flow entries) | 32 | Optional |
| Pocket Count | 64 | Optional |
| Byte Count | 64 | Optional |
| Duration (Seconds) | 32 | Required |
| Duration (nanoSeconds) | 32 | Optional |
| Per Group Bucket | | |
| Pocket Count | 64 | Optional |
| Byte Count | 64 | Optional |
| Per Meter | | |
| Flow Count | 32 | Optional |
| Input Packet Count | 64 | Optional |
| Input Byte Count | 64 | Optional |
| Duration (Seconds) | 32 | Required |
| Duration (nanoSeconds) | 32 | Optional |
| Per Meter Band | | |
| IN Band Packet Count | 64 | Optional |
| IN Band Byte Count | 64 | Optional |
| Tables : List Of Counters | | |

FIG. 15

HYPERSCALE SWITCH ELEMENT (HSS) FOR DATA CENTER NETWORK SWITCHING

CROSS-REFERENCE TO RELATED APPLICATIONS

This application is a continuation-in-part of co-pending U.S. patent application Ser. No. 17/558,162 filed on Dec. 21, 2021, which is a continuation of U.S. patent application Ser. No. 16/853,496, filed Apr. 20, 2020, which is a continuation of U.S. patent application Ser. No. 16/357,226 filed on Mar. 18, 2019, now issued as U.S. Pat. No. 10,630,606, the entire disclosures of which are incorporated by reference herein for all purposes.

FIELD OF THE INVENTION

The present disclosure relates in general to data packet switched network systems, and more particularly, to a hyperscale switch element and components configured to form a system on chip switch for interfacing with input/output (I/O) ports and memory components within an architecture for use in a data center network environment.

BACKGROUND

Cloud computing or processing via "the cloud," represents the delivery of on-demand computing resources over a network configuration such as the internet on a pay-for-use basis. Cloud computing is typically implemented via one or more data centers. A data center is a centralized location rendered with computing resources and crucial telecommunications, including servers, storage systems, databases, devices, access networks, software and applications. Programmable logic devices are a class of integrated circuits utilized in such data centers that can be programmed to perform a wide variety of operations. Programmable logic devices may include FPGAs and other integrated circuit (IC) devices configured to perform custom operations and exchange data with one another and with other external (e.g. off-circuit) devices via interfaces. Routing resources for external interfaces (e.g. memory controllers, transceivers, etc.) for connecting with different data processing circuits may be configured in System-on-Chip (SoC) programmable packages.

With the explosive growth of information technology (IT) and applications requiring heightened security, reliability, and efficient and fast processing times, data centers are increasing worldwide in both size and number. Hyperscale data centers which house such massive computing infrastructures not only consume massive amounts of energy but also discharge significant pollutants into the atmosphere each year, including but not limited to hundreds of millions of tons of carbon dioxide ($CO_2$). Additional problems associated with hyperscale data centers include thermal heating and cooling requirements for ensuring proper device and system operations, increased capital costs and expenditures for diesel generators, battery backups, power conversion, cooling, and the like. Further still, size and processing limitations associated with semiconductor (e.g. silicon) electronic elements or devices, and the need for enhanced processing speed and concomitant increase in utilization of and cost for electricity contribute to the need for new technical solutions.

Networked storage systems and remote computing systems can be included in high-density installations, such as rack-mounted environments. However, as the densities of networked storage systems and remote computing systems increase, various physical limitations are being reached. These limitations include density limitations based on the underlying storage technology as well as computing density limitations based on the various physical space requirements for network interconnects, in addition to significant space requirements for environmental climate control systems.

In addition to the above, these bulk storage systems traditionally have been limited in the number of devices that can be included per host. This can be problematic in storage environments where higher capacity, redundancy, and reliability are desired. These shortcomings may be especially pronounced with the increasing data storage and retrieval needs in networked, cloud, and enterprise environments. Still further, power dissipation in a switch is directly proportional to the number of switch hops needed to traverse integrated circuit devices (and serializers/deserializers or SERDES) for transferring data packets from a source or ingress port of a network connected first peripheral device, to a destination or egress port of a network connected second peripheral device. Thus, power requirements and power usage/consumption within network data packet switches represent significant technological as well as environmental challenges.

Alternative systems, devices, architectures, apparatuses, and methods for addressing one or more of the above identified shortcomings is desired.

SUMMARY

Systems, devices, architectures, apparatuses, methods and computer programs are presented for implementing a semiconductor switch module instantiated on an integrated circuit, comprising a forwarding engine configured to receive and forward data packet requests; and a switch engine co-located with the forwarding engine on the switch flow module for providing an interface to communicate a data packet to an external device according to a port number provided by the forwarding engine; wherein the forwarding engine receives a network address identifier received in a data packet at an I/O port for transmission to a destination I/O port, and determines an internal port number for routing by the switch engine out from the switch module, according to a lookup table which maps internal port numbers of the switch module with destination I/O ports corresponding to peripheral devices connected to a network.

In one embodiment of the present disclosure, a hyperscale switch comprises a plurality of semiconductor crossbar switching elements connected to one another according to a direct point-to-point electrical mesh interconnect for transceiving data packets between peripheral devices connected to the switch and utilizing a lookup table and network device addressing for reduced switching power, wherein only two of said plurality of semiconductor crossbar switching elements are traversed by said data packets being routed between any two of said peripheral devices.

In one embodiment of the present disclosure, a semiconductor switch flow module instantiated on an integrated circuit comprises on an ingress side, at least one ingress FIFO queue for receiving data packets via an input interface at a given bit rate, and a transmitter for selectively transmitting the data packets out from the switch flow module to an external device according to a priority mechanism; and on an egress side, a sequencer configured to receive at its input from an external SERDES port a data packet, and to correlate a port number prepended on the data packet with an address in a port number queue associating an internal port of the switch flow module with the packet number for routing of the data packet to the destination port address via the internal port.

In another embodiment, a plurality of switch flow module instantiations on an integrated circuit may be configured to form a hyper scale switch device comprising: a plurality of input/output (I/O) switch flow modules instantiated on an integrated circuit, each I/O switch flow module instantiation having on an ingress side, a forwarding engine configured to receive and forward data packet requests; and a switch engine co-located with the forwarding engine for providing an interface to communicate a data packet out from the switch flow module according to a port number provided by the forwarding engine; wherein the forwarding engine receives a network address identifier received in a data packet at an I/O port for transmission to a destination I/O port, and determines an internal port number for routing by the switch engine out from the switch module, according to a lookup table which maps internal port numbers of the switch module with destination I/O ports corresponding to peripheral devices connected to a network; and a plurality of direct connect switch flow modules instantiated on the integrated circuit, each direct connect switch flow module instantiation having on an ingress side, at least one ingress FIFO queue for receiving data packets via an input interface at a given bit rate, and a transmitter for selectively transmitting the data packets out from the switch module to an external device according to a priority mechanism; and on an egress side, a sequencer configured to receive at its input from an external SERDES port a data packet, and to correlate a port number prepended on the data packet with an address in a port number queue associating an internal port of the switch module with the packet number for routing of the data packet to the destination port address via the internal port.

In a further embodiment, the hyperscale switch device includes the plurality of I/O switch modules further comprising one or more ingress FIFO queues for selectively routing the data packets.

In further embodiments, the hyper scale switch module (HSS) may be connected at an interface via one of its switch flow modules to a Clos network or a non-Clos network.

In a further embodiment, the non-Clos network is a direct point-to-point mesh network.

In another embodiment, the plurality of switch module instantiations on the integrated circuit may be integrated on one of an ASIC or FPGA, SoC or microprocessor.

In another embodiment, the plurality of switch module instantiations on the integrated circuit may be implemented in HDL.

In another embodiment, the switch module instantiations may be configurable for one of ten Gigabit (10G), 25G, 40G, 50G, 100G, 200G, or 400G signal line processing.

In an embodiment, the address header is one of a MAC address header and an IP address header. It is understood that in other embodiments, other types of address headers may also be implemented In an embodiment, an integrated OpenFlow engine is operative to match various fields in the packet and take action as to whether to insert fields, forward the data packet or drop the packet for intrusion defense according to the matching.

In an embodiment, the lookup table stores MAC addresses or IP addresses corresponding to connected peripheral devices and/or TCP, UDP, or MPLS labels.

In an embodiment, the network is an Ethernet network.

In an embodiment, the network comports with a computer networking communications standard used in high-performance computing that features very high throughput and very low latency, such an InfiniBand (IB).

In an embodiment, further processing includes performing virtual output queuing on the data packet transfers from ingress to egress of each of the switch module instantiations.

In an embodiment, MAC or IP address headers within a lookup table are obtained and mapping updates are made to map peripheral device connections with corresponding external I/O ports associated with the plurality of switch module instantiations. A master lookup table may contain the MAC or IP address headers of the peripheral devices connected with corresponding external I/O ports associated with the plurality of switch module instantiations and periodically update corresponding local lookup tables for access by each of the switch module instantiations.

In an embodiment, a non-Clos network data packet switch method comprises receiving, at an external I/O port of a first network semiconductor switch element electrically connected to a peripheral device, network traffic data packet to be forwarded to a second peripheral device connected to an external I/O port of one of a plurality of network semiconductor crossbar switch elements; determining, at the first network semiconductor crossbar switch element, a destination external I/O port on which the network traffic data packet is to be forwarded, according to a lookup table mapping peripheral device connections with corresponding external I/O ports of the plurality of network semiconductor crossbar switch elements, and according to an address header corresponding to the destination peripheral device connected to the network; prepending to the network traffic data packet an indicator of the destination external I/O port of the second network semiconductor switch element; and forwarding the network traffic data packet to the second network semiconductor switch element, via a direct point-to-point electrical mesh interconnect which defines a direct electrical connection between one internal I/O port of each semiconductor cross bar switch element, and one internal I/O port of each other semiconductor cross bar switch element. The method further comprises receiving by the second network semiconductor crossbar switch element, at its internal I/O port connected to the first network semiconductor crossbar switch element via the direct point-to-point electrical mesh interconnect, the prepended network traffic data packet; and outputting by the second network semiconductor crossbar switch element the network traffic data packet onto the destination external I/O port to the second switch-connected peripheral device, whereby the routing of data packets from the first switch-connected peripheral device, to the second switch-connected peripheral device traverses only at most two semiconductor crossbar switch elements.

In an embodiment that lookup table is learned autonomously or loaded by an external agent across the control plane via the OpenFlow protocol.

In an embodiment, a non-Clos data network switch system for communicating data packets from a first switch-connected peripheral device, to a second switch-connected peripheral device, comprises: a chassis; a plurality of line cards housed within the chassis and having I/O terminals for transceiving data packets; a plurality of semiconductor crossbar switch elements, each having external I/O ports in electrical communication with I/O terminals of corresponding ones of the plurality of line cards housed within the chassis, for routing data packets between switch-connected peripheral devices; a control processor configured to maintain a lookup table mapping peripheral device connections with corresponding external I/O ports associated with the plurality of semiconductor crossbar switch elements; wherein each semiconductor crossbar switch element comprises a forwarding processor configured to access the lookup table in response to a data packet received at a given external I/O port of the semiconductor cross bar switch element, and route the data packet according to the lookup table and an address header of the data packet, onto another one of the external I/O ports corresponding to a destination one of the plurality of semiconductor switch elements, via a direct point-to-point electrical mesh interconnect directly connecting each of the plurality of semiconductor crossbar switch elements with every other one of the semiconductor crossbar switch elements; whereby the routing of data packets from the first switch-connected peripheral device, to the second switch-connected peripheral device traverses only at most two semiconductor crossbar switch elements associated with the line access cards.

In one embodiment of the present disclosure, a network switching apparatus for communicating data packets from a first switch-connected peripheral device, to a second switch-connected peripheral device, comprises a chassis containing a plurality of line cards with each line card interconnected via a direct point-to-point mesh interconnect pattern or network. A control processor is configured to maintain a lookup table mapping peripheral device connections with corresponding I/O ports associated with the plurality of line cards. On each line card a crossbar switching element is configured to enable electrical connection of any one of the line card I/O ports through the direct point-to-point electrical mesh interconnect pattern which connects each of the plurality of line cards with every other one of the line cards, to a corresponding destination port on one of the plurality of line access cards. The switching connection is made in response to detection of a data packet on an ingress I/O port of a given line card. Through the switching element on the line card, the data packet is routed or forwarded over the direct point-to-point electrical mesh interconnect pattern according to the lookup table mapping based on a destination address header of the data packet, whereby transmission of packets between input and output ports of any two line cards and respective cross bar switch elements occurs in only two hops. In a particular embodiment, each switching element has a direct electrical connection to every other switching element, and egress transmission lines output from any switching element are communicated via the electrical mesh interconnect at select differential pair connections for switching purposes, with the final port destination prepended to the data packet transmitted from the switching element so that no further processing or route determination is required on the electrical mesh, and the downstream line card and switching element. The ingress receive lines on the switching element (e.g. corresponding to the destination port or destination peripheral device) receive directly the data packet and pass through to the destination peripheral port and device. In an embodiment, differential pairs or alternative electrical/optical transmission styles/geometries maybe implemented.

According to the architecture of the present disclosure, reduction in the number of physical hops among line cards or integrated circuits on the line cards significantly reduces electrical power consumption and significantly increases speed, in addition to enhancing thermal efficiency and reducing cooling and power requirements of a network packet switch.

In one embodiment of the present disclosure, a hyperscale switch is implemented within a plurality of silicon switching elements, at least one per line card arranged within a rack mount or chassis, each silicon switching element including a routing and forwarding engine for use with a network address identifier such as a media access control (MAC) network address received in a data packet at an I/O port, for transmission to a destination I/O port connected to a peripheral device, wherein an electrical mesh interconnect network architecture provides direct point-to-point connections with each of the corresponding I/O ports on each silicon switching element, within an Ethernet packet routing network configuration.

In another embodiment, the hyperscale switch is implemented with a hypervisor to create and run one or more virtual machines and/or virtualized workloads in accordance with a select network operating system. In one embodiment, the network operating system may be an open source network operating system such as Openflow, or a full stack (closed) system installed with applications running natively in the operating system.

In one embodiment, the direct point-to-point mesh electrical interconnect pattern or network is implemented as a printed circuit backplane comprising multi-gigabit transmission lines with direct point-to-point electrical connections.

In one embodiment, the printed circuit backplane electrical interconnect network is achieved such that the backplane of the device is silicon-free.

In one embodiment, each silicon switching element is configured as an application specific integrated circuit (ASIC) or Field programmable gate array (FPGA) device (e.g. chip) and the printed circuit backplane comprising multi-gigabit copper transmission lines provide direct point-to-point electrical connections with the integrated circuit (IC) chip I/O connections (or system on a chip or SoC) on each of the respective line cards.

In an embodiment, the network switching platform may be configured as a data center LAN mesh architecture embodiment so as to condense networking and provide a gateway for data services while enabling data center expansion of its network virtualization presence.

In an embodiment, the network switch platform is designed for versatility in multiple data center networking applications, either as a standalone high capacity switch or access, end of row, core, or interconnection switch accommodating 10/40/100G optical transceivers with migration capacity.

Embodiments of the present disclosure include a network data packet switch comprising a chassis housing a plurality of line cards having I/O ports thereon for connecting to peripheral devices. Each line card includes one or more silicon switching elements such as ASICs or FPGAs having I/O ports for connecting with every other switching element through a printed circuit backplane or p-spine architecture of point-to-point direct electrical interconnections between each of the switching elements (and hence line cards) within the chassis. Each silicon switching element contains therein a forwarding and routing engine for routing data packets according to a packet address header such as a MAC header via the printed circuit backplane of point-to-point direct electrical interconnections from a source peripheral device connected to the network switch, to a destination peripheral device. The forwarding and routing is performed within the transmitting ASIC or FPGA (or SoC) according to a lookup table containing routing information stored thereon.

In distinction to conventional leaf and spine network architectures, embodiments of the present disclosure provide for a line card with silicon switching element having a forwarding engine co-located on the line card with routing and/or OpenFlow processing functionality, whereby communications and routing into/out of the line card and silicon switching element via the point-to-point direct electrical interconnection mesh backplane provides reduced serializer/deserializer (SERDES) components and I/O gateway tolls that increase switch speed or throughput speed, while reducing power and I/O component requirements.

In an embodiment of the present disclosure, each line card is configured in a non-Clos packet switching network and includes a plurality of integrated circuits which define a fabric cross bar implementation, wherein each integrated circuit on each line card has a direct (i.e. point-to-point) electrical connection via a printed circuit board backplane, with every other integrated circuit on every line card connected via the printed circuit backplane structure.

In an embodiment of the present disclosure, each line card is configured in a non-Clos packet switching network and includes a plurality of field programmable gate array (FPGA) components which define a fabric cross bar implementation, wherein each FPGA on each line card has a direct (i.e. point-to-point) electrical connection via a silicon-free printed circuit board backplane, with every other FPGA on every line card connected via the silicon-free printed circuit backplane structure.

In an embodiment, the FPGA may be replaced and/or integrated with components including one or more processor cores, microprocessors or microcontrollers, DSPs, graphics processor (GPU), on chip memory, hardware accelerators, peripheral device functionality such as Ethernet and PCIE controllers, and the like, for implementation as a system on a chip (SoC) in connection with communication via the direct point-to-point electrical interconnect structure.

In an embodiment, the architecture of the direct (i.e. point-to-point) electrical connection interconnect structure connecting each of the semiconductor cross bar switch elements having integrated within each semiconductor cross bar switch element MAC, data packet routing and disposition, FIFO output queuing and congestion management processing, VLAN, VXLAN, and VOQ functionality, may be implemented as a virtual switch for execution on a high performance computer server to provide for virtual segmentation, securitization, and reconfiguration.

Thus, according to embodiments of the present disclosure, there is disclosed a hyperscale switch (HSS) comprising a plurality of input/output (I/O) switch flow modules instantiated on an integrated circuit in switchable communication via a cross bar switch, with a plurality of direct connect switch flow modules (PSP SFMs) instantiated on the integrated circuit, for transferring data packets between external devices. For the plurality of input/output (I/O) switch flow modules instantiated on the integrated circuit, each said I/O switch flow module instantiation having: on an ingress side, a forwarding engine configured to receive and forward data packets; and an interface responsive to the forwarding engine for communicating a data packet out from the I/O switch module according to a port number provided by the forwarding engine; wherein the forwarding engine receives a network address identifier received in a data packet at an I/O port for transmission to a destination I/O port, and determines an internal port number for routing by the switch engine out from the switch module, according to a lookup table which maps internal port numbers of the switch module with destination I/O ports corresponding to peripheral devices connected to a network; and a FIFO queue configured to receive data packets via an input serializer/deserializer interface at a given bit rate, and transmit the data packet outside of the switch flow module to another switch flow module designated according to the router table and responsive to a grant from the designated switch flow module upon the raising of a real-time request; and on an egress side, a sequencer configured to receive multiple independent data packets at its input responsive to requests for connection from external switch flow modules connectable via an internal switch matrix, and sequentially transmit each data packet to a corresponding port of an external device. For the plurality of direct connect switch flow modules (PSP SFMs) instantiated on the integrated circuit, each direct connect switch flow module instantiation having: on an ingress side, a FIFO queue for receiving data packets via an input serializer/deserializer interface at a given bit rate, and for transmitting the data packet outside of the switch flow module to a particular port in accordance with a data packet indicator and responsive to a grant from an another switch flow module associated with the particular port of a real-time request; on an egress side, a sequencer configured to receive multiple independent data packets at its input responsive to requests for connection from other switch flow modules connectable via an internal switch matrix, and to sequentially transmit each data packet to a corresponding port of an external integrated circuit element; thereby reducing the number of transceiver hops needed to progress a data packet from a source external I/O port to a destination external I/O port. In an embodiment, the lookup table mapping is generated through internal learning means or through external programming via an OpenFlow protocol and a LAN hypervisor server. In an embodiment, the I/O switch flow module comprises a sequencer module configured to interface with an external controller according to a predetermined protocol to obtain routing information and LAN topology for data packet routing out of the I/O switch flow module. In an embodiment, the sequencer module includes a Hash look-up table to a) determine the port number and b) pre-pend onto the data packet in the FIFO queue and c) route the data packet out of the switch flow module for transfer to an external integrated circuit. In an embodiment, the external integrated circuit is an intermediate integrated circuit connected to the end point integrated circuit via a direct connect mesh network. In an embodiment, the external integrated circuit is an intermediate integrated circuit connected to the end point integrated circuit via a multi-level network such as a CLOS network.

In an embodiment, when the number of data packets in the I/O SFM ingress FIFO queue exceeds a predetermined threshold, the I/O SFM sequencer raises a request to establish connection with another switch flow module for transferring data packets from the FIFO queue into high bandwidth memory via the another switch flow module upon grant of the connection request. In an embodiment, connection is established for continuous communication of data packets from the I/O SFM FIFO queue into memory via the another switch flow module until the number of data packets in the FIFO queue falls below the threshold, and whereby the another switch flow module is adapted to read each data packet back from memory and raise a connection request to route to the destination address associated with the data packet.

In an embodiment, the sequencer is configured to store in a queue only a preset number of packets for output via the switch engine, and wherein, when multiple packets reside in the sequential queue for output via the switch engine, the sequencer causes the switch engine to sequentially output real-time, on demand connection requests for corresponding packets in the queue based on their order within the sequential queue and according to an arbitration, whereby, on the condition that a grant acknowledgement of the given connection request is not received after a given number of clock cycles, the sequencer outputs a new connection request for the next packet in the line, on the condition that the indicator points to a destination address distinct from the preceding destination addresses in the queue. In an embodiment, a single FIFO queue stores all of the data packets.

In an embodiment, on the egress side, an arbiter is configured to resolve simultaneous requests received from other switch flow modules. On the ingress side, the sequencer is configured to pre-pend a data packet priority bit indicator for downstream VLAN routing of the data packet according to one or more protocols. On the egress side, the egress sequencer is responsive to a priority indicator of the data packet to sort data packets according to priority for VLAN routing of the data packet.

In an embodiment, the sequencer module interfaces with a control plane processor to accept routing information and LAN topology according to updates in the routing table as an alternative to an Openflow routing, wherein the sequencer module interfaces with a control plane processor to accept routing information and LAN topology according to an Openflow protocol.

In an embodiment, the hyperscale switch device further comprises a plurality of independent arbiters, each associated with a respective egress FIFO queue, for granting parallel requests to transfer data packets from select sub-groupings of other switch flow modules, to thereby reduce congestion for data packet transfer connections.

In an embodiment, the hyperscale switch is further configured such that on the condition that an I/O SFM cannot determine the destination switch flow module for routing of the data packet, the I/O SFM routes the data packet to a designated switch flow module for packet replication and broadcast via sequential request and grant operations via the crossbar, and wherein each replicated data packet is tagged with a broadcast identifier.

BRIEF DESCRIPTION OF THE DRAWINGS

FIG. 6C is an exemplary illustration showing fields of a lookup and routing table for processing the data packet transfer from source to destination according to an embodiment of the present disclosure.

FIG. 12 is an example of an Ethernet frame structure associated with MAC learning and SFM read operations according to an embodiment of the present disclosure.

FIG. 14 and FIG. 14A-K shows an exemplary block diagram and packet data processing including OpenFlow processing for I/O SFM modules according to an aspect of the present disclosure.

FIG. 15 illustrates an example of readable counters readable via the control plane processor according to particular read command instruction invoked according to an aspect of the disclosure.

DETAILED DESCRIPTION

Figure 1A:
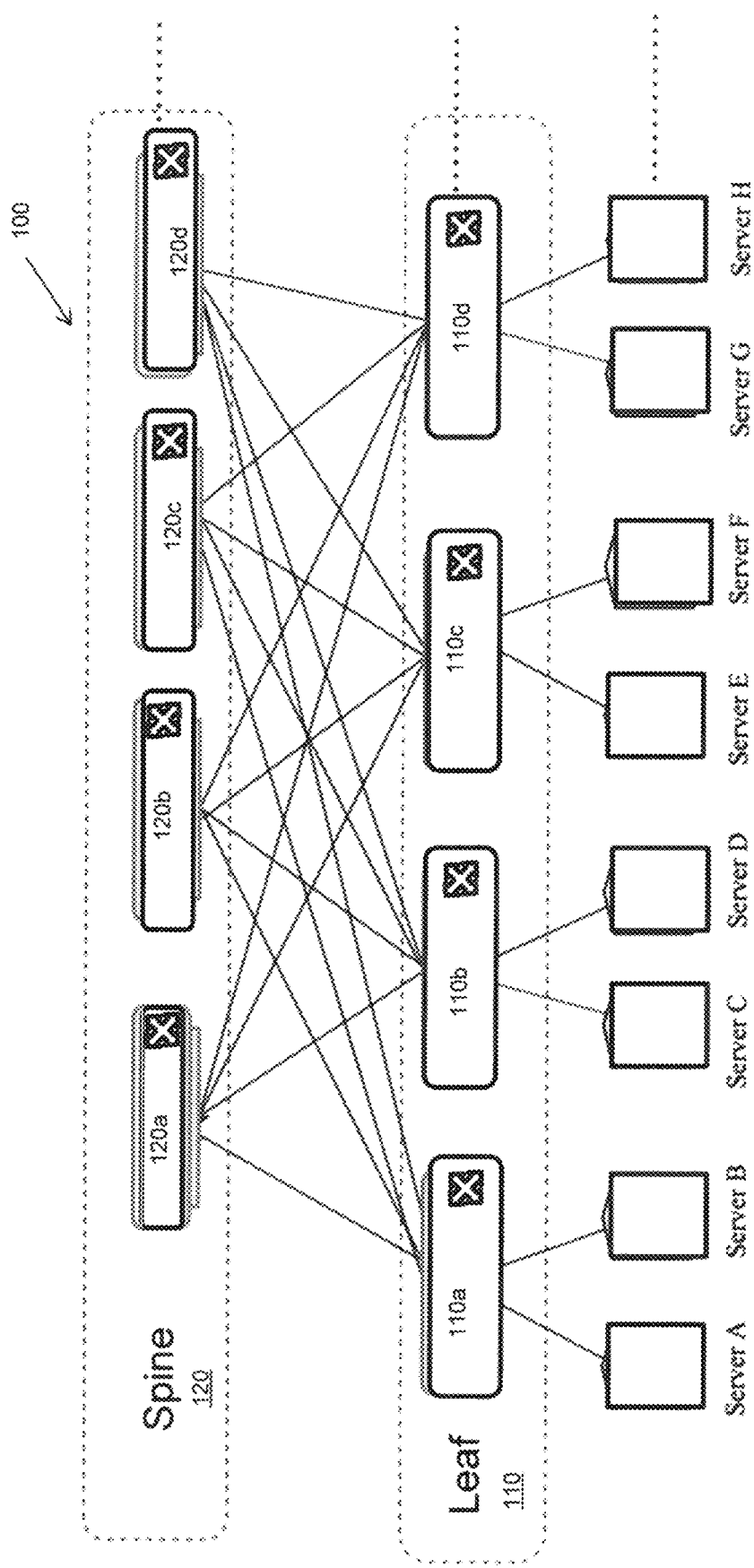
FIGS. 1A and 1B are simplified schematic diagrams of tiered network switch architectures according to the prior art.

It is to be understood that the figures and descriptions of the present invention have been simplified to illustrate elements that are relevant for a clear understanding of the present invention, while eliminating, for purposes of clarity, many other elements found in network switches and packet switching systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Although data packet switching networks may take on a number of forms, in one such form a switch fabric may include a card modular platform. A card modular platform typically comprises a backplane and multiple switch fabric modules and/or other types of boards, such as servers, routers, telco line cards, storage cards and so on, contained within a single unit, such as a chassis or shelf, for example, that permits data packet switching between a plurality of network nodes, thereby forming the switch fabric between the network nodes.

FIG. 1A illustrates a switch interconnect in the form of a Clos network 100 according to the prior art. In general, Clos network 100 includes packet switches having uplink ports that are coupled to uplink ports of other packet switches. The packet switches also include downlink ports that may be coupled to hardware resources or peripheral devices (labeled as servers A through H). Such peripheral devices may be implemented not only as servers but as network interfaces, processors, storage area network interfaces, hosts, and so on. The Clos network switching architecture of the prior art may implement a Clos or folded Clos network having a leaf and spine with fabric module architecture as shown in FIG. 1A. Each leaf server or line card device of FIG. 1A is represented as element 110 (shown as 110a-110d) and the spine with fabric module is represented as element 120 (shown as 120a-120d).

The servers are connected to leaf switches (such as top of rack or TOR switches) with each leaf switch connected to all spine switches. As shown, each peripheral device or server is at least three physical hops away from every other peripheral device, as the processing requires data packet routing from a source peripheral device (e.g. server A) to a destination peripheral device (e.g. server E) through a 3 hop leaf and spine network (e.g. 110a, 120b, and 110c) to reach its destination. The structure may be further expanded to a multi-stage (e.g. 5-stage CLOS) by dividing the topology into clusters and adding an additional spine layer (also referred to as a super-spine layer). Considering the Clos crossbar fabric, and current art implementations, an additional semiconductor device operative as a staging module for assessment in the route for packet forwarding fabric requires each device to be 5 hops away from one another. As each hop through a semiconductor device suffers from dissipating power (work) through resistance and loss of throughput speed traversing through the semiconductor, such a system exhibits several disadvantageous features. Aspects of the present disclosure integrate the crossbar switching functionality, the forwarding and routing, virtual output queuing, OpenFlow processing, VLAN, and control plane integration within a semiconductor FPGA device, integrated circuit, or SoC, which may be implemented on a line card, in order to achieve the advantages discussed herein.

Figure 1B:
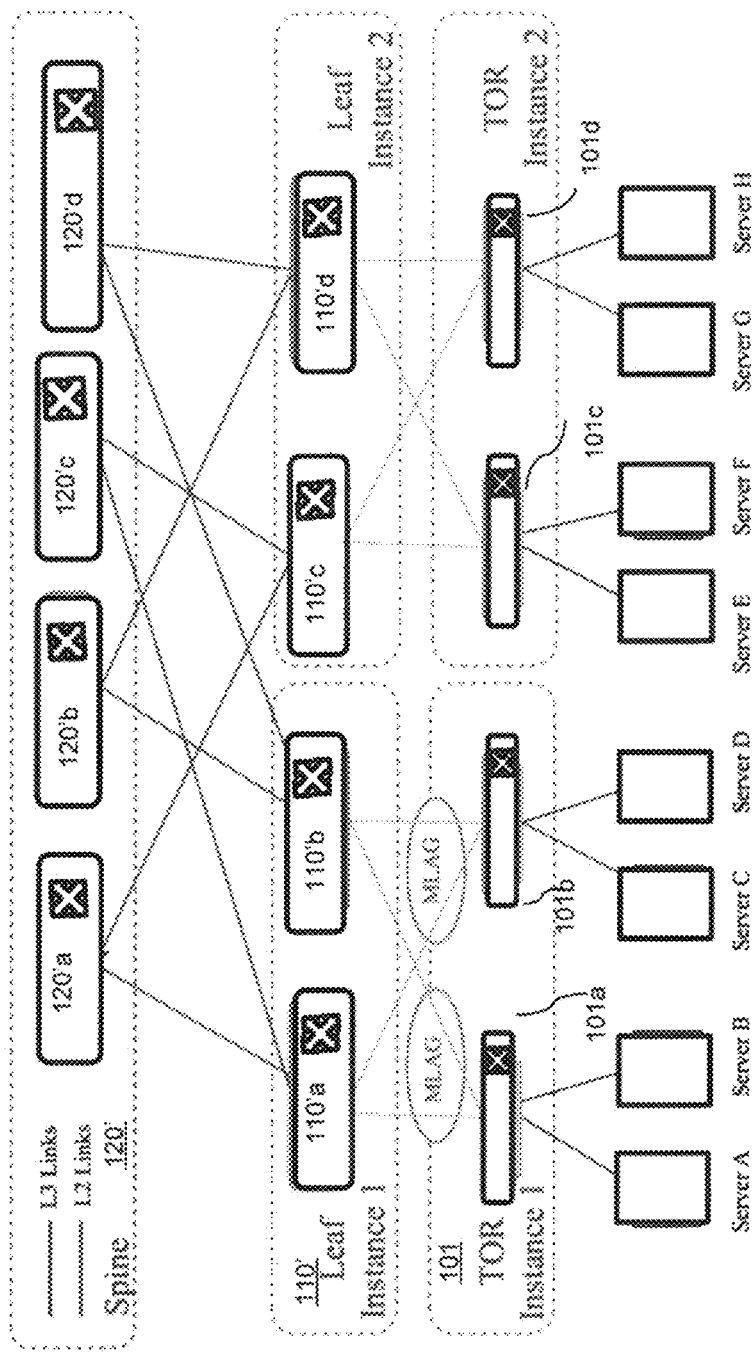

FIG. 1B shows another CLOS switching embodiment, including Multi-Chassis Link Aggregation Group (MLAG or MCLAG). Servers may be can be connected to two different leaf 110' or TOR 101 switches in order to have redundancy and load balancing capability. The prior art CLOS architecture embodiment of FIG. 1B may utilize both OSI layer 2 (L2) packet switching as well as layer 3 (L3) routing, where packets are sent to a specific next-hop IP address, based on a destination IP address. FIG. 1B shows a CLOS topology using Layer 3 routing for spine 120' to leaf 110' connections and multiple TOR as well as leaf switch instantiations. Similar to the routing requirements of FIG. 1A, the CLOS architecture of FIG. 1B also requires multiple hops through additional semiconductor devices in the routing of a data packet for traversing the data packet switch network in order to transfer packets from one peripheral device (e.g. server A) to another peripheral device (e.g. server C). Each hop through a semiconductor suffers from dissipating power through the resistance physics of semiconductors and loss of throughput speed traversing through the semiconductor.

In contrast to conventional leaf server and spine server network architectures such as those shown in FIGS. 1A and 1B, wherein a multi-tier Clos architecture is implemented which requires multiple hops (3 or greater) to switch data packets from a given input port of a connected device (e.g. server A) to a given output port of a connected device (e.g. server B), embodiments of the present disclosure provide a non-Clos network implemented as a collapsed or flattened (e.g. linear) form of network element architecture and data packet switching, which reduces the number of hops between I/O devices, while increasing the speed and reducing the power requirements for a given switching operation. Moreover, embodiments of the present disclosure integrate within a single semiconductor switch element multiple functionalities which serve to reduce power dissipation, increase switch speed, and maintain industry standard form factor within a data network architecture. Embodiments of the present disclosure integrate previously disparate functionalities onto or within a single semiconductor switch element to provide forwarding and routing engine and crossbar switching functionality, virtual output queuing (VOQ), QOS, openflow channel processing, and VLAN functionality within a non-Clos mesh network data packet switch.

In one exemplary embodiment, there is disclosed a chassis which houses multiple line cards or line card blades, where each line card has a faceplate with slots configured to receive a peripheral device connection. Each line card may contain a semiconductor crossbar switching element implemented as an integrated circuit or FPGA or system on a chip and configured to route data packets through a direct point-to-point electrical mesh interconnect. The electrical mesh interconnect directly connects I/O ports on each of the semiconductor crossbar switching elements with every other semiconductor crossbar switching element, whereby data packet routing is accomplished according to an address header on the received data packet and a lookup table of peripheral device connections associated with the semiconductor crossbar switching element, to thereby enable a 2 hop packet switch network. The network may be implemented as a hyper scale or modular switch.

Embodiments of the present disclosure may be implemented within a chassis using rack mount line cards, or may be implemented using blades and various form factors, with particular card configurations (e.g. horizontal, vertical, or combinations thereof), as well as different card/I/O numbers (e.g. N=2, 4, 8, 16, 24, 32, etc.—although powers of 2 are not required and the numbers maybe be any positive integer).

As used herein in embodiments of the present disclosure, the term "hop" represents a single physical hop that includes a direct physical connection between two devices in a system. Similarly stated, a single physical hop can be defined as a traversing or routing of a data packet which traverses through an integrated circuit (e.g. an FPGA, microchip, ASIC, or other programmable or reprogrammable chip device) and any one set of its transceivers or serializer/deserializer (SERDES) device input(s) to its SERDES device output(s) on a switching element.

Exemplary embodiments of the present disclosure may implement a network data packet switch comprising line cards configured within a chassis and each having disposed thereon (or associated therewith) a semiconductor crossbar switch element connected with every other semiconductor crossbar switch element with fabric module via a direct point-to-point electrical mesh interconnect backplane structure. In an embodiment, the backplane structure may be semiconductor or silicon-free. In a particular embodiment, the direct point-to-point electrical mesh interconnect backplane structure may be implemented as a printed circuit electrical mesh interconnect. In another particular embodiment, the direct point-to-point electrical mesh interconnect backplane structure may be implemented as a plurality of discrete wires (e.g. micro wires or nano wires).

In further distinction to conventional leaf and spine network architectures, embodiments of the present disclosure provide for a semiconductor crossbar switch element having a forwarding engine co-located on a line card with routing functionality whereby communications and routing into/out of the switch element (and hence line card) via a direct point-to-point electrical mesh interconnect provides reduced SERDES and I/O gateway tolls that increase switching throughput or decrease switch latency, while reducing power and I/O component requirements.

According to a further implementation of the present disclosure, each switch element includes one or more ASICs or field programmable gate array (FPGA) components which together with the direct point-to-point electrical mesh interconnect define a fabric cross bar implementation. Each switch element is associated with a line card, and each FPGA on each line card has a direct (i.e. point-to-point) electrical connection (via the silicon-free printed circuit board backplane) with every other FPGA on the corresponding line card.

Figure 1C:
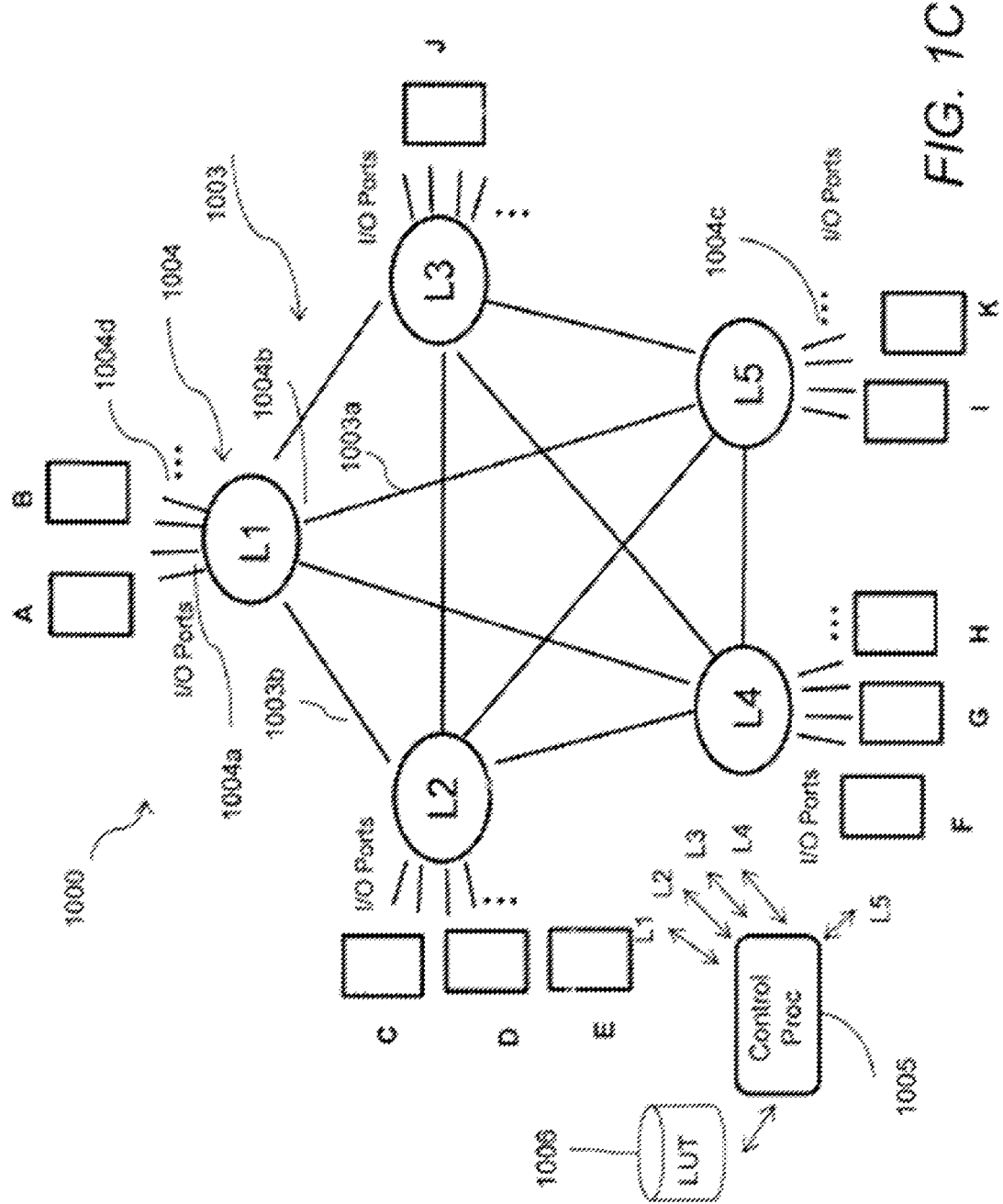
FIG. 1C is a simplified schematic diagram of a non-Clos network data packet switch architecture according to an embodiment of the present disclosure.

Referring now to FIG. 1C, there is shown a simplified schematic diagram of a non-Clos network data packet network switch architecture 1000 according to an embodiment of the present disclosure. As shown therein, semiconductor crossbar switch elements 1004 (data network packet switches) labeled as L1-L5 are configured in a flattened architecture so that data packet communication between resources (e.g. peripheral devices identified as server A-server K) is accomplished with a reduced number of hops. More particularly, each semiconductor switch element (e.g. L1) has a plurality of associated external I/O ports (e.g. 1004a) for connecting with corresponding peripheral devices (e.g. server A) for transceiving data packets. Each semiconductor switch element also has a plurality of associated internal I/O ports 1004b. A point-to-point electrical mesh interconnect 1003 defines a direct electrical connection between one internal I/O port of each semiconductor cross bar switch element, and one internal I/O port of each other semiconductor cross bar switch element. A control processor 1005 is configured to maintain a lookup table (LUT) 1006 mapping of peripheral device connections with corresponding external I/O ports associated with the plurality of semiconductor crossbar switch elements. In response to detection of a data packet on one of its external I/O ports, semiconductor crossbar switch element L1 determines a destination switch element (e.g. L5) for the data packet and a destination external I/O port of the destination semiconductor crossbar switch element (e.g. 1004c), according to the lookup table mapping (LUT) and based on an address header of the data packet. On the condition that the destination semiconductor crossbar switch element is different from the semiconductor crossbar switch element that detected the data packet on one of its external I/O ports, that element outputs the data packet and an indicator of the destination external I/O port, onto one of its internal I/O ports that is connected to the destination semiconductor crossbar switch element via the point-to-point electrical mesh interconnect (e.g. 1003a). If the destination semiconductor crossbar switch element is the same as the source element according to the lookup table (e.g. data packet communication between server A and server B), the source element (e.g. L1) outputs the data packet onto its own destination external I/O port (e.g. 1004d) according to the lookup table mapping (without traversing the mesh interconnect). In this manner, the matrix configuration of semiconductor crossbar switch element connections to one another through the point-to-point electrical mesh interconnect, and the re-direct I/O connection when the point-to-point electrical mesh interconnect is not utilized (for same destination board/same destination semiconductor switch element I/O), provides for a system with less power dissipation, increased throughput speeds, and reduced cooling energy requirements.

On the receive or destination (ingress) side, each semiconductor crossbar switch element (e.g. L5) is further responsive to receipt of a data packet and an indicator of the destination external I/O port at one of its internal I/O ports. In response, the ingress semiconductor element receives and outputs the data packet, without the indicator, onto the external I/O port identified by the indicator (e.g. 1004c), to the second switch-connected peripheral device (e.g. server K). In this manner, the routing of data packets from the first switch-connected peripheral device, to the second switch-connected peripheral device traverses a minimum number (only at most two) of semiconductor crossbar switch elements or two hops.

In comparison to the multi-tier and multi-hop leaf and spine with fabric module architecture of FIGS. 1A and 1B, the architecture of the present disclosure implements data packet switching with reduced hops and increases the routing speed or throughput within the system, reduces the power required by traversing less transceiver or SERDES I/O chips, and results in less heat being produced, thereby achieving substantially reduced electrical power consumption and associated heat (thermal output).

The data packets may comprise a stream of data units (e.g., data packets, data cells, a portion of a data packet, a portion of a data cell, a header portion of the data packet, a payload portion of the data packet, etc.) from a peripheral processing device (devices A-K). The data packet stream forwarded from the first switching element L1 connected to the peripheral processing device A and destined to the peripheral processing device K has prepended onto it an indicator of the destination I/O port for processing through the second crossbar switch element L5 via the direct electrical mesh interconnect 1003a.

Each data packet delivered to and detected by an external I/O port of a semiconductor crossbar switch element includes a header comprising an identifier of the source peripheral processing device (e.g., an Internet Protocol (IP) address or a medium access control (MAC) address of the peripheral processing device), and an identifier of the destination peripheral processing device (e.g., an IP address or a MAC address of the peripheral processing device). The egress semiconductor crossbar switch element strips off the destination address (e.g. the destination MAC address) and uses this address as an index to lookup table 1006. The lookup table contains entries mapping each of the semiconductor crossbar switch elements with I/O ports according to the point-to-point connectivity of electrical mesh interconnect to the internal I/O ports of each switch element, and each of the external I/O connections to each of the known peripheral devices. The lookup table mapping provides the particular destination (ingress) semiconductor cross bar switch element and corresponding external I/O port of that destination element that connects to the destination peripheral device. The egress semiconductor crossbar switch element then activates a corresponding one of its internal I/O ports that connects, via the point-to-point electrical mesh interconnect, to the corresponding (ingress) destination switch element that is connected to the destination peripheral device.

The egress semiconductor switch element also prepends to the data packet the corresponding external I/O port of the destination semiconductor switch element device to which the data packet is to be forwarded onto, based on the lookup table mapping. The internal I/O port activated at the egress semiconductor crossbar switch element transfers the data packet with the destination external I/O port identifier, over the direct electrical connection mesh interconnect, to an internal I/O port of the destination (ingress) semiconductor switch element. This destination semiconductor switch element reads the data packet header containing the prepended information of the external I/O port, discards any extraneous header data, and routes the data packet through this crossbar switch and onto that port which is directly connected to the destination peripheral device for receipt by that device.

In this manner, only at most two semiconductor switch elements are traversed in any data packet switching between any two switch connected peripheral devices.

Figure 2:
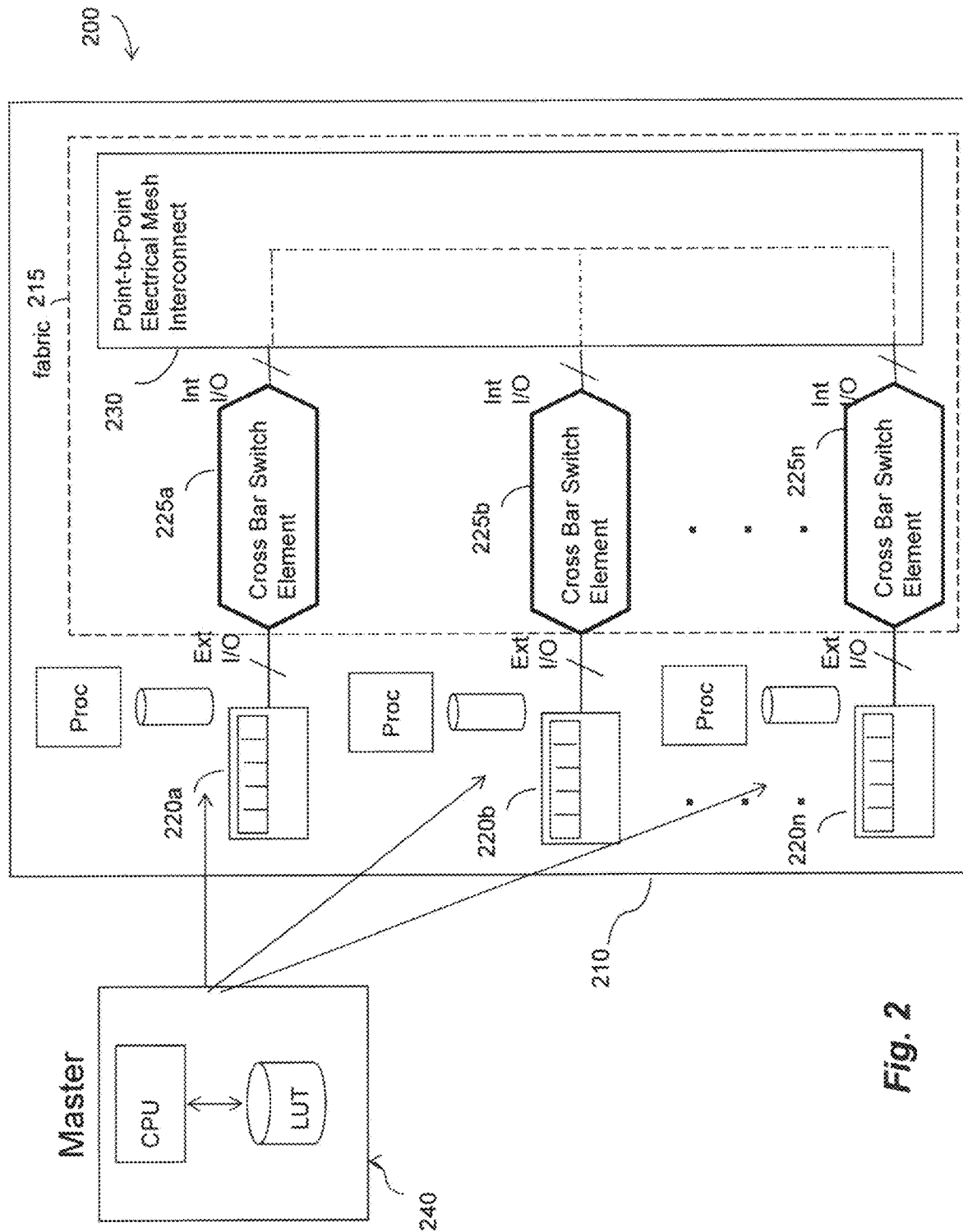
FIG. 2 is a more detailed schematic diagram of a network data packet switch architecture according to an embodiment of the present disclosure.
Figure 2A:
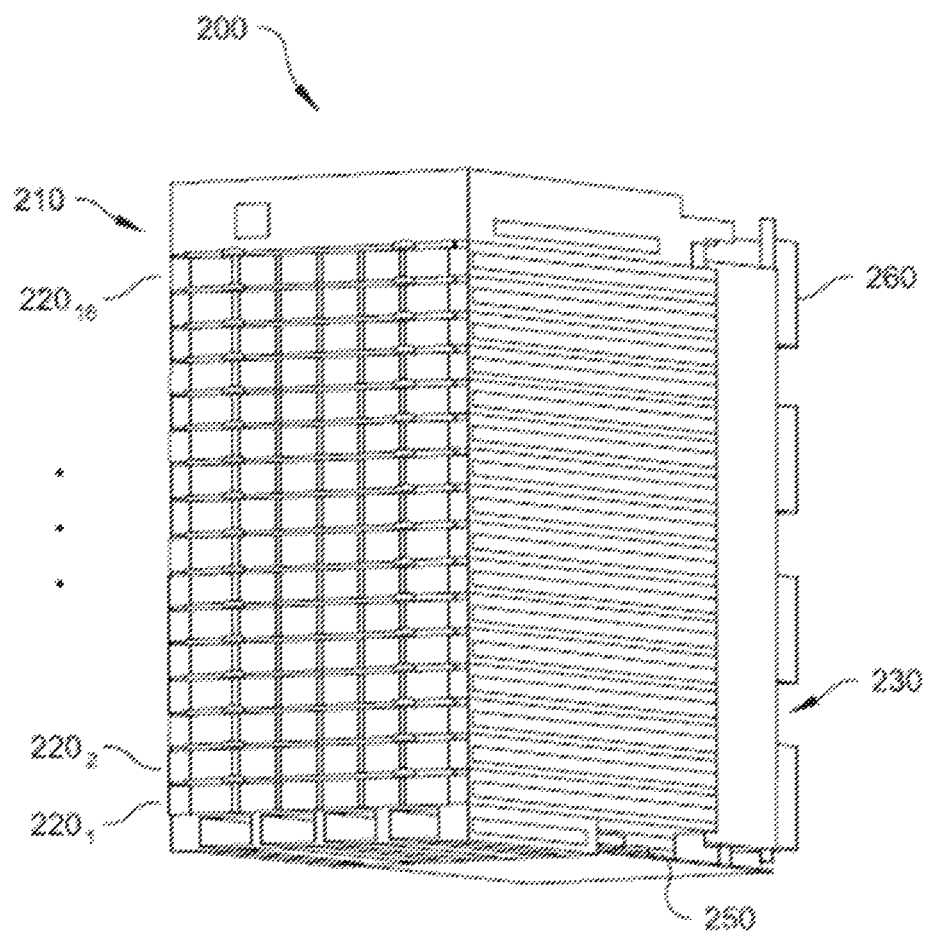
FIGS. 2A, 2B, 2C, and 2D illustrate exemplary partial and cutaway views showing components of a network data packet switch architecture according to an embodiment of the present disclosure.
Figure 2B:
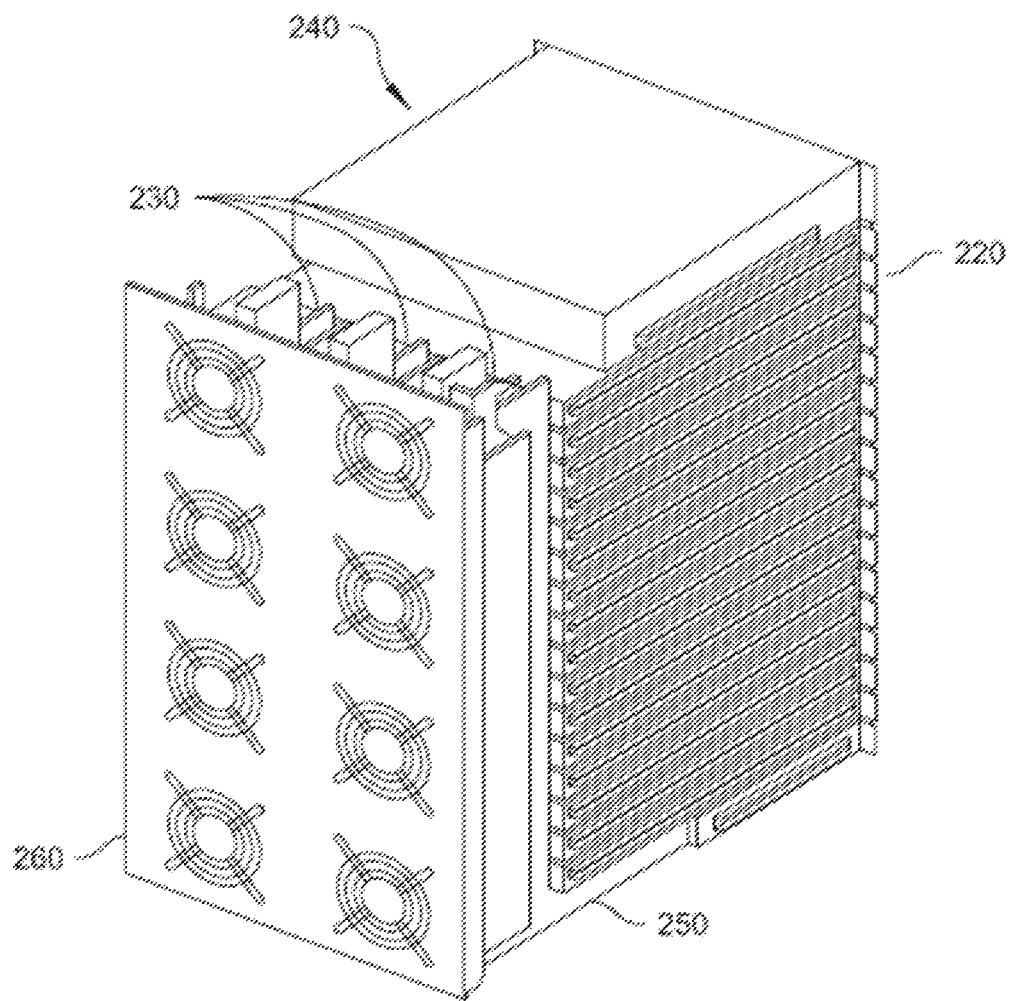
Figure 2C:
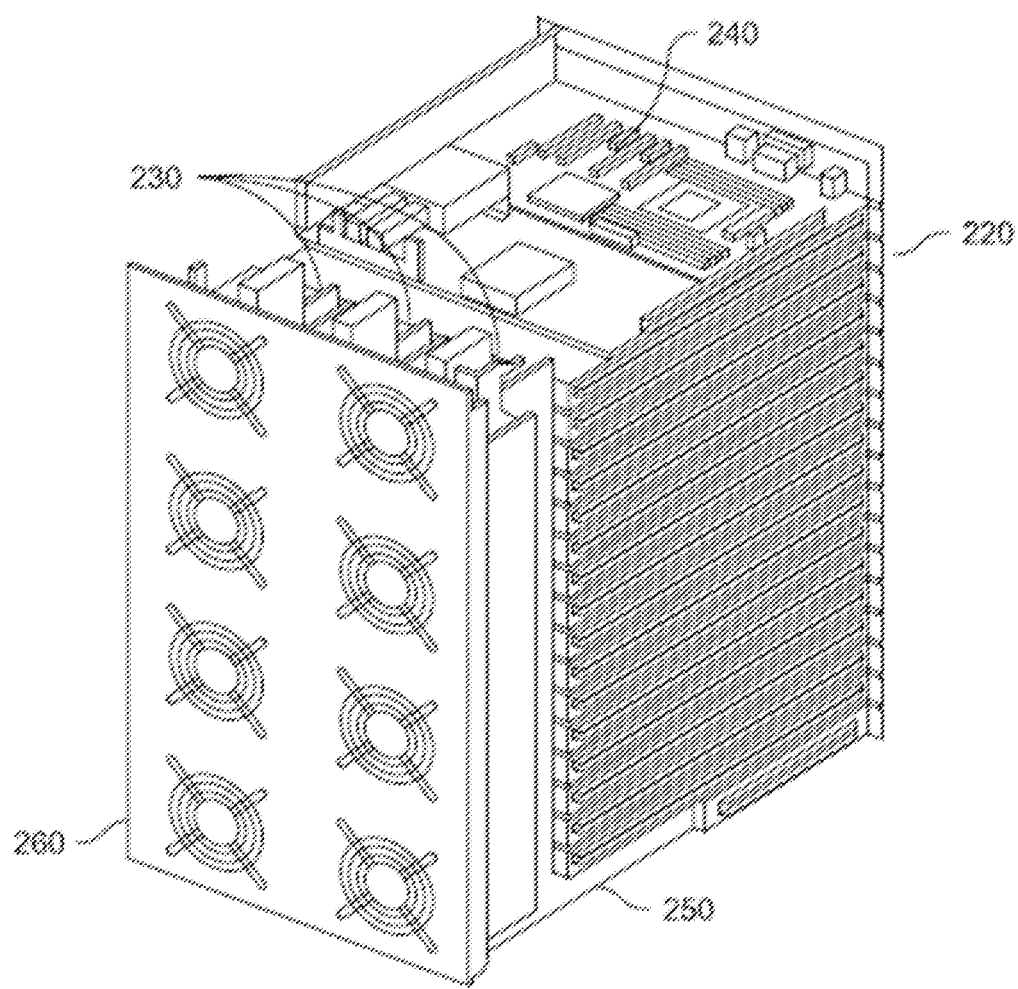

In an embodiment,

Referring now to FIG. 2, in connection with FIG. 1C, there is provided an exemplary embodiment of a non-Clos data network switching apparatus 200 for communicating data packets from a first switch-connected peripheral device (e.g. device A of FIG. 1C), to a second switch-connected peripheral device (e.g. device K of FIG. 1C) within an Ethernet architecture. In the non-limiting embodiment disclosed herein, apparatus 200 illustrates a modular architecture wherein a plurality of circuit boards or line cards 220a, 220b, . . . 220n, are housed within chassis 210. The line cards may be implemented as modular circuit boards, each having a faceplate with I/O ports or slots for connection with peripheral devices for transceiving data packets. It is understood that various types of serial links may be utilized for connection therewith, such as Peripheral Components Interconnect/PCIe, by way of non-limiting example. The I/O communications between peripheral devices may be implemented as one or more of 10G, 25G, 40G, 50G, 100G and/or other relative data rate signal line processing. As shown in FIG. 2, the integrated fabric module 215 according to the present disclosure includes each of the semiconductor crossbar switch elements 225a, 225b, . . . 225n, having its external I/O ports for connecting to peripheral devices through a corresponding line card, and its internal I/O ports connected to corresponding internal I/O ports on every other semiconductor crossbar switch element via the point-to-point electrical mesh interconnect 230.

For each semiconductor crossbar switch element associated with a given line card, a control plane includes a control micro-processor and CPU memory in communication with a master controller 240 and address routing table (e.g. via a separate Ethernet connection) for receiving routing table entries (or OpenFlow variables for routing) and updates for transfer into each of the semiconductor switch elements. Once received in each of the switch elements (e.g. FPGAs), each routing table gets populated into the forwarding engine for each of the switch flow modules in each of the FPGAs.

FIGS. 2A-2D illustrate an exemplary embodiment of the schematic structures illustrated in FIG. 1C and FIG. 2. With respect to FIGS. 2 and 2A-2D, like reference numerals are used to indicate like parts. As shown, a plurality of rack mounted modular line cards 220a, 220b, . . . , 220n may be removably inserted into a corresponding slot or cavity within the chassis. Although shown in a horizontally stacked configuration with 16 line cards (i.e. 220₁, . . . , 220₁₆), it is understood that other configurations may be implemented.

Various cutaway views of the network switch implementation 200 having a chassis 210 housing a plurality of removable line cards with integrated fabric module are depicted in FIGS. 2A, 2B, 2C, and 2D. In this exemplary embodiment, each line card has disposed thereon a semiconductor crossbar switch element in the form of an FPGA. Each FPGA is connected to every other FPGA on a separate line card, via a vertical backplane point-to-point electrical mesh interconnect 230. In an embodiment, the on board FPGA chips have internal I/O ports connected in point-to-point fashion via a silicon-free printed circuit board trace interconnect backplane. A motherboard 240 containing a master computer processing unit (CPU) and lookup/routing tables provides control and communications via a control plane with each of the FPGAs (FIG. 3) disposed on line cards 220. Power is provided via a power control board 250 containing a power supply and accompanying electronic circuits and is configured at the basis of the chassis. The power supply module may include, for example, a 12 V power supply, AC/DC module, and distribution module for supplying power to the system. A fan assembly 260 is mounted at a back end of the chassis and includes a series of fans positioned relative to the line cards and backplane structures so as to provide optimal cooling to the unit. The illustrated embodiment includes a series of I/O ports on its faceplate for receiving, and outputting signals through the line card with integrated fabric structure in a manner that reduces the number of hops, increases speed and reduces power consumption.

In the illustrated embodiment of FIGS. 2A-2D, the point-to-point electrical mesh interconnect may be implemented as a plurality of vertically oriented printed circuit boards with trace connections electrically connected to each of the FPGA's internal I/Os on each line card via appropriate connector modules 232, 234 according to the desired I/O port speed for the particular switch elements. By way of non-limiting example, connectors such as those manufactured by Molex may used to provide 64 transmission line differential pairs within a given connector module (e.g. 10G transmission).

Figure 2D:
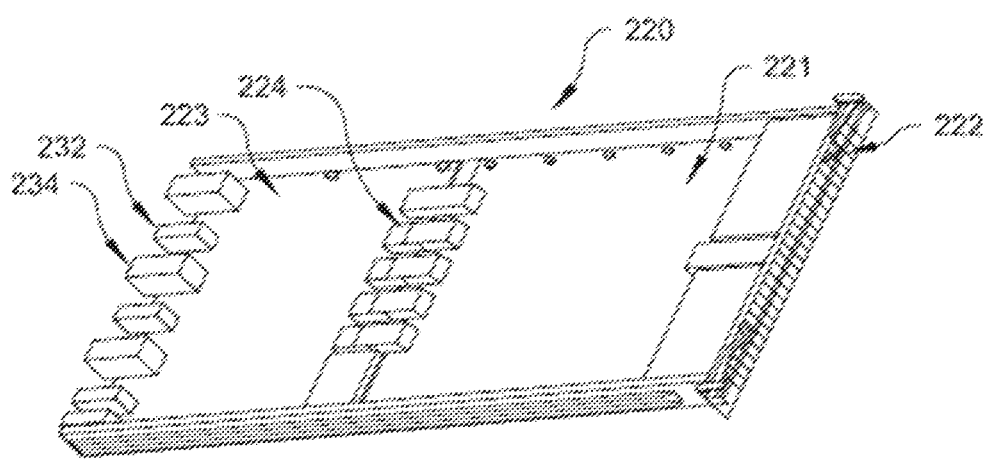

FIG. 2D shows a more detailed view of an exemplary line card useful for implementing an embodiment of the present disclosure. As shown, line card 220 may be implemented in a standard 1U (1.75 inch height) configuration. In the particular implementation illustrated, faceplate slots 222 are configured to receive peripheral device connections via a standard pluggable interface for communicating data packets over the network interface. Connectors 224 operate to convey the I/O data packets directly from each of the faceplate terminals (lines not shown in FIG. 2D) to corresponding external I/O ports (not shown in FIG. 2D) of the semiconductor crossbar switch element disposed on circuit board 223 of line card 220. In the illustrated embodiment, circuit board 221 provides direct I/O connections from the faceplate to board 223 via connectors 224, but is effectively available for utilization for other processing and/or networking functionality.

As described herein, a control processor is configured to maintain a lookup table mapping peripheral device connections with corresponding I/O ports associated with the plurality of line cards. A crossbar switching element (e.g. L1, L2, . . . ) is configured on each line card, where the crossbar switching element is adapted to enable electrical connection of any one of the line card I/O ports through direct point-to-point electrical mesh interconnect pattern (1003) which connects each of the plurality of line cards with every other one of the line cards, to a corresponding destination port on one of the plurality of line access cards, in response to detection of a data packet on an ingress I/O port of a given line card, and according to the lookup table mapping based on an address header of the data packet. In this manner, transmission of data packets between input and output ports of any two line cards and respective cross bar switch elements from source to destination occurs in only two hops.

The control plane includes a control micro-processor and CPU memory in communication with the motherboard on each line card for transfer of routing table entries into each of the FPGAs. Once received in each of the FPGAs, the routing table gets populated into the forwarding engine for each of the switch flow modules (FIG. 5) in each of the FPGAs. Each SFM has the forwarding engine which uses that table. In an embodiment, each SFM may have its own table. The logic that accesses that table is represented as the forwarding engine. The same may be realized with OpenFlow populating of the lookup table.

Figure 3:
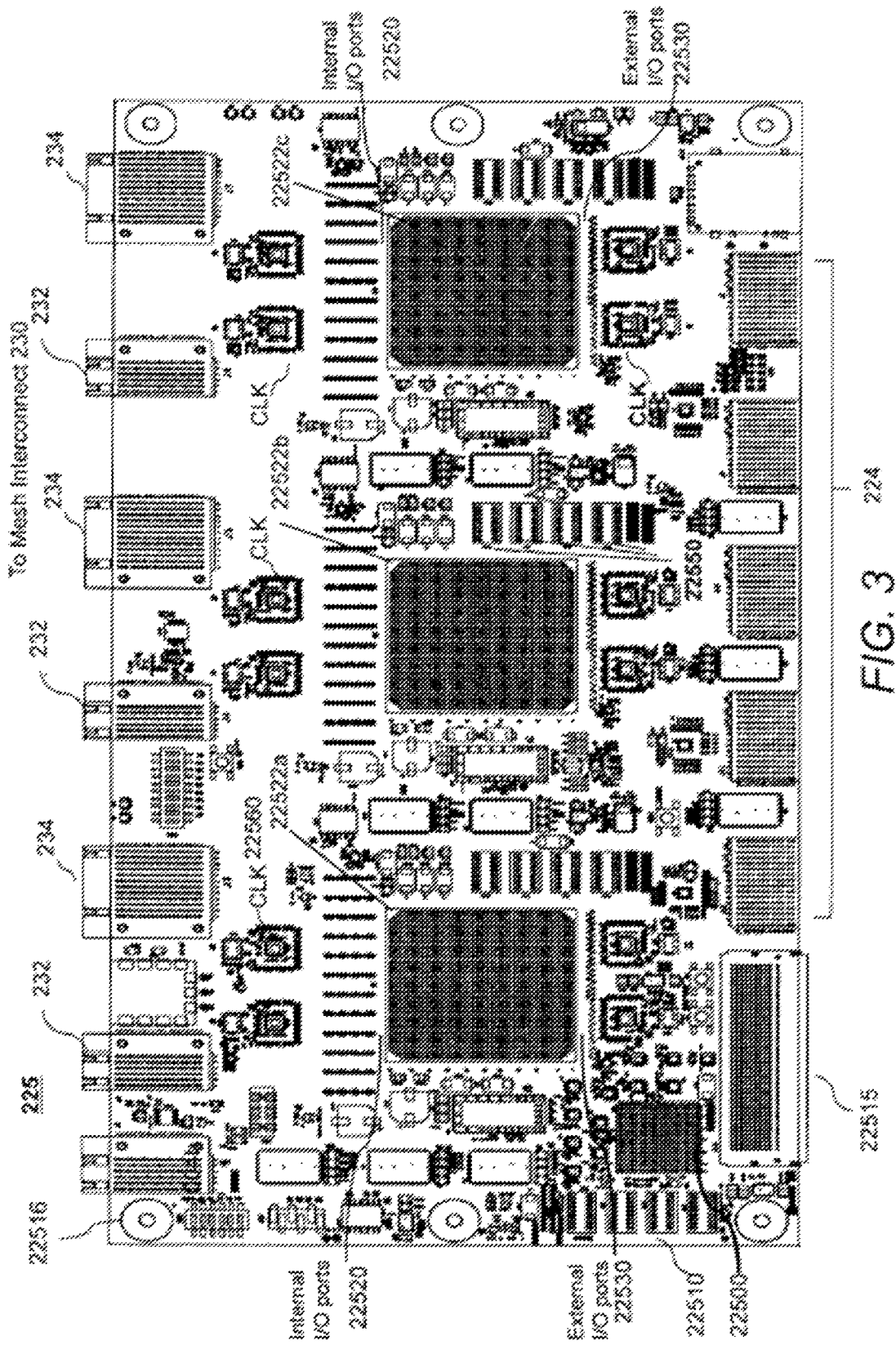
FIG. 3 is an exemplary illustration of components of a semiconductor crossbar switch element embodied as an FPGA architecture disposed on a line card with I/O interconnects to a printed circuit backplane of point-to-point direct electrical interconnections between different semiconductor switch elements for implementing the data packet network switching functionality according to an embodiment of the disclosure.
Figure 4:
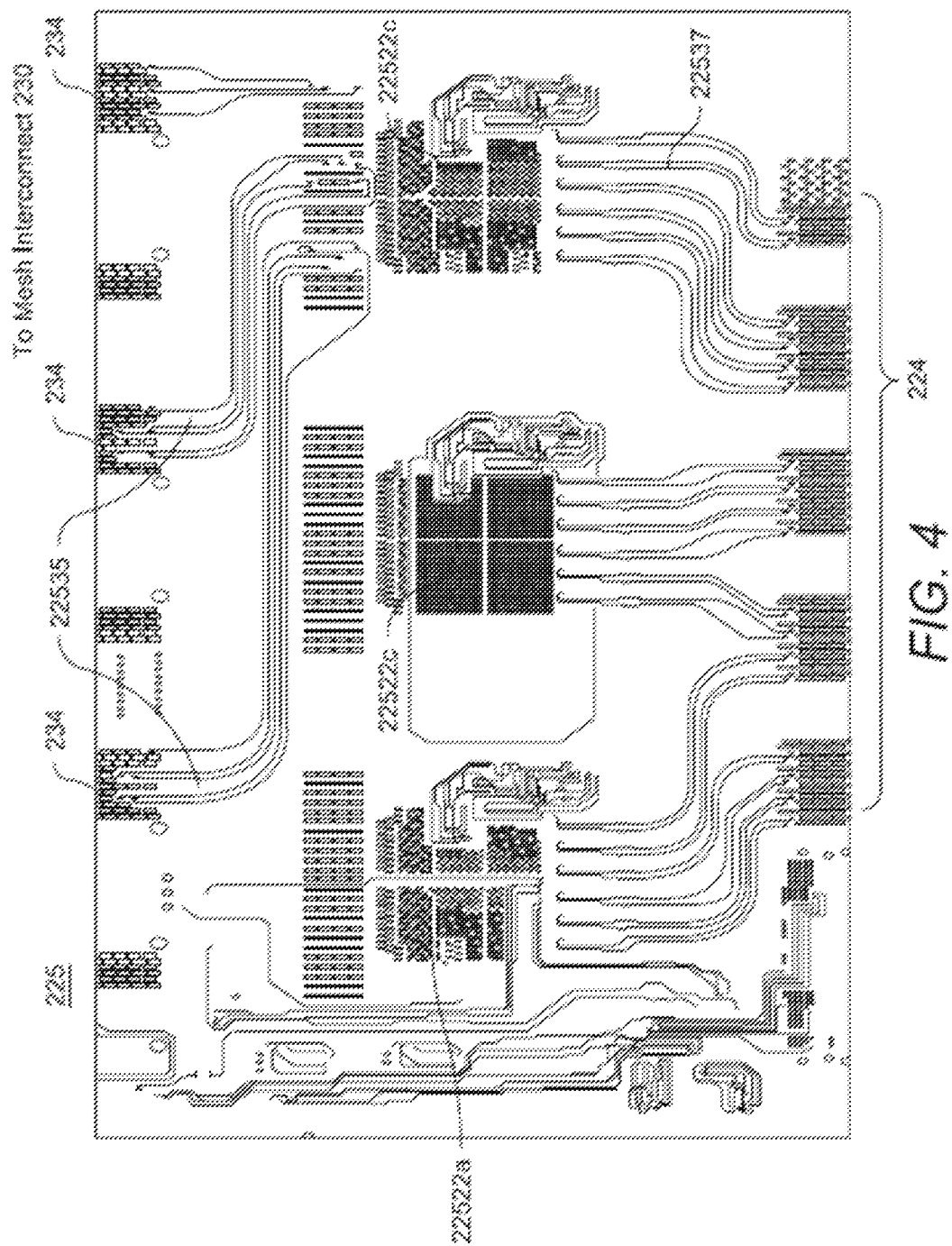
FIG. 4 is a more detailed illustration of FIG. 3, depicting transmit (egress) signal lines out of a semiconductor switch element to interconnections on the printed circuit backplane for data packet transmission to a destination device for implementing the network switch functionality according to an embodiment of the disclosure.
Figure 4A:
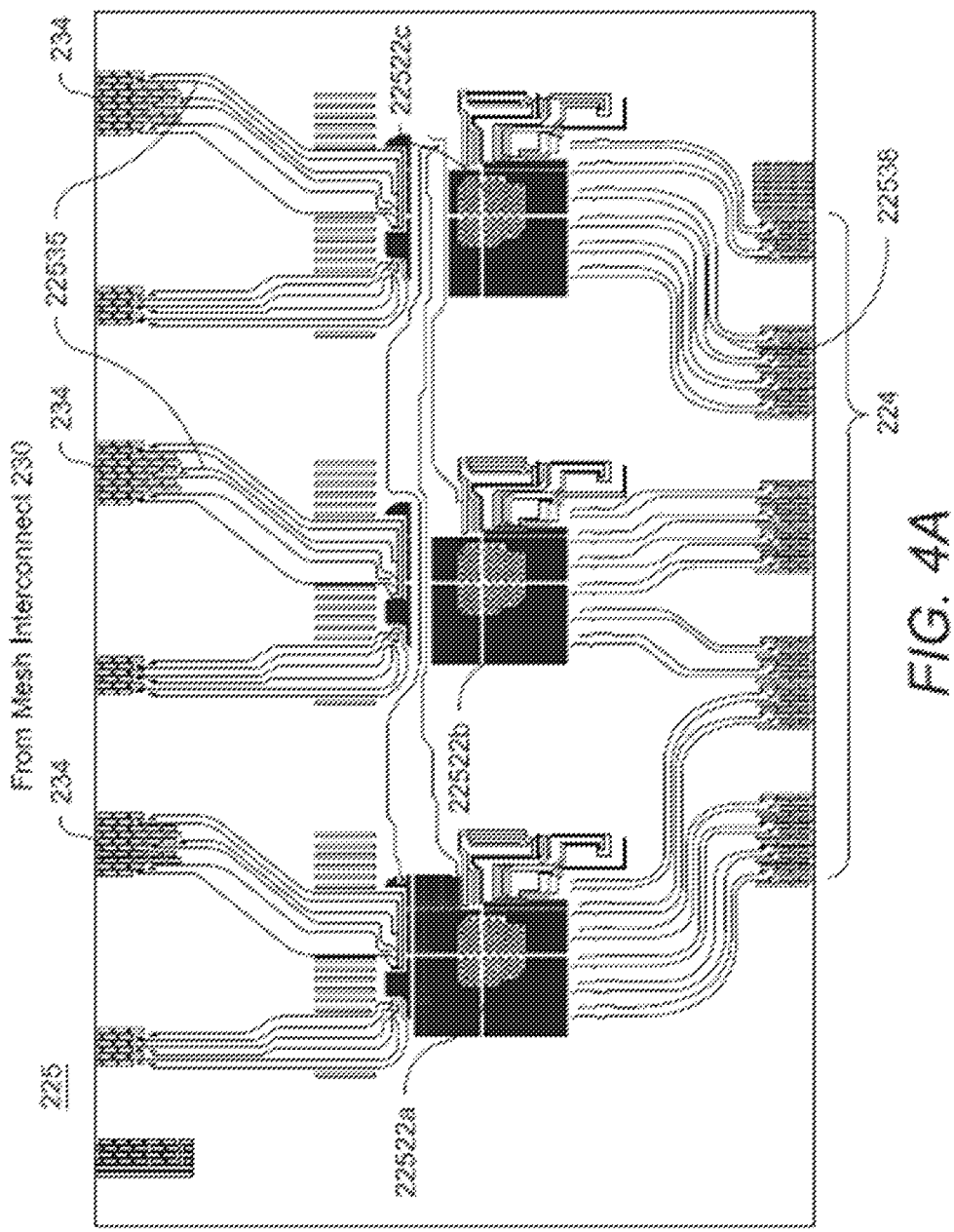
FIG. 4A is a more detailed illustration of FIG. 3, depicting receive (ingress) signal lines out from the printed circuit backplane to a receiving (ingress) semiconductor switch element for data packet reception at a destination device for implementing the network switch functionality according to an embodiment of the disclosure.

FIG. 3 is illustrative of the components of each of the semiconductor cross-bar switch elements labeled generally as 225 (FIG. 2) and disposed on a circuit board such as a line card 200 (FIG. 2) according to an exemplary embodiment of the disclosure. FIGS. 4 and 4A illustrate more detailed representations of element 225 disposed on a line card 200, including an illustration of exemplary signal paths among components and particular Tx/Rx communications within the fabric. Referring to FIGS. 3, 4, and 4A, each semiconductor crossbar switch element includes a field programmable gate array (FPGA) 225222 disposed on a circuit board implemented as a line card. In the exemplary embodiment of FIG. 3, three FPGAs 22522a, 22522b, and 22522c are disposed on each line card and implemented as routing and forwarding engine in order to route the data packet signals (e.g. 48 lines of one or more of 10G, 25G, 40G, 50G, 100G). Each FPGA has its external I/O ports 22530 directly connected to corresponding terminals of connectors 224. Internal I/O ports 22520 are connected with every other FPGA on every other line card via a direct (i.e. point-to-point) electrical mesh interconnect through connectors 232, 234. In an embodiment, the three FPGAs shown in FIG. 3 are coupled to the other FPGAs on every other line card via a semiconductor-free or silicon-free printed circuit board backplane comprising 6 vertical printed circuit boards 230 (FIG. 2A-C) and corresponding connectors 232, 234. Preferably, input/output channels are arranged evenly across the three integrated circuit chips or FPGAs disposed on each of the line cards. Each chip outputs on 48 I/O lines differential paired, to transceiver (T/R) modules, which transmit via the passive fabric to respective inputs. The passive fabric thus provides a direct connection between T/R modules. By enveloping the functionality of the forwarding engine, crossbar switch, control plane, and point-to-point electrical mesh interconnect within an integrated fabric of the semiconductor crossbar switch element, the number of chip traversals needed to forward a packet from one peripheral device to another is reduced. Hence, the power costs corresponding to the number of serial/parallel/serial conversions or SERDES traversals, are advantageously reduced through the present architecture and processing. More particularly, as the routing and forwarding engine along with the switching functionality is all performed within the semiconductor switching element (e.g. silicon FPGA) and data packets communicated between egress and ingress FPGAs through the point-to-point electrical mesh interconnect, significant power reduction is realized. This is significant as each of the transceivers or SERDES on an integrated circuit or FPGA chip dissipate about 50% of the power required. Thus, by reducing the number of hops and hence number of transceivers, along with collapsing the switching within the geometry of the FPGA, significant power savings are achieved.

Each FPGA has associated packet buffering functionality for regulating network traffic and mitigating network congestion and which may be implemented as one or more Double Data Rate (DDR) Synchronous Dynamic Random Access Memory (SDRAM) units 22550. DDR is a common type of memory used as RAM for most every modern processor. Clock (CLK) sources 22560 associated with each of the FPGAs are configured to control timing and routing of data packets, processes, and control mechanisms throughout the chip.

In the embodiment illustrated in FIGS. 2A-2D, the vertical backplane electrical mesh interconnect structure is configured as having a maximum of 72 differential pairs of signals (Tx/Rx). Each semiconductor switch element associated with each line card has 3 FPGAs per line card. Thus, 48 FPGA chips may be accessed within the chassis such that, for 72 differential pairs, the pathways traversing the various connectors, for each handling 50 Gbe, corresponds to 4 TB per connector. Further, according to embodiments of the present disclosure, the communications paths between peripheral devices are non-optical within the apparatus. Only at the control plane where QFSP/FSP optical processing occurs, which processing is not part of the data packet forwarding path. In an embodiment, each of the printed circuit boards is via-free, with each board having multiple layers or laminates for processing the various Tx/Rx signal paths.

In an embodiment of the present disclosure, data packets enter the line card with address data content and each packet is addressed by tables controlled and updated by the motherboard to one of the 48 outputs on the chip. Transmission is fanned out on all three modules while reception (over the mesh interconnect) is provided on a subset of FPGA modules for a given line card.

In an embodiment of the disclosure, the switch element 225 is configured to perform all of the routing and disposition on the chip such that the forwarding engine and routing engine is co-located within the switch element on the corresponding line card 220. In this manner, ultimate point-to-point connection and routing over the electrical mesh interconnect provides an essentially wired communication path which reduces the SERDES requirements for each differential pair entering/exiting the transceiver face of the line card. In the exemplary embodiment, the circuit board or line card is composed of multiple different routing layers of separate transmit and receive layers. Similarly, in one embodiment, the electrical mesh interconnect embodied in one or more printed circuit boards contains corresponding multiple laminate layers for signal transmit and receive functionality.

FIG. 4 illustrates operation of the switch element in connection with the point-to-point electrical mesh interconnect showing select signal line connections 22535 (internal I/O ports) for activation and forwarding of data packets on the egress side of FPGA 22522c. Also illustrated are switch element I/O signal line connections 22537 (external I/O ports) to select terminals 224 for connection with the peripheral devices for each of FPGAs 22522a-c.

FIG. 4A illustrates operation of the switch element in connection with the point-to-point electrical mesh interconnect showing select signal line connections 22536 (internal I/O ports) for receiving data packets at the ingress side of each FPGA 22522a-c. Also illustrated are switch element I/O signal line connections 22538 (external I/O ports) to select terminals 224 for connection with the peripheral devices for each of FPGAs 22522a-c.

Figure 7A:
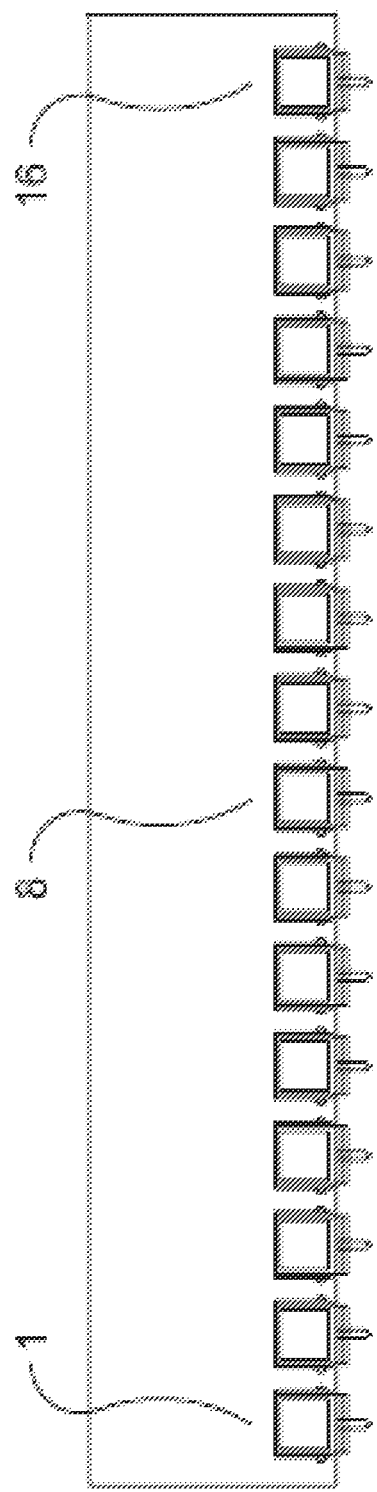
FIG. 7A is an exemplary illustration of the point-to-point electrical mesh interconnect structure for providing direct connection between integrated circuits on a plurality of line cards for data packet transfer according to an embodiment of the present disclosure.

FIG. 7A is an exemplary illustration of the point-to-point electrical mesh interconnect structure for providing direct connection between integrated circuits on a plurality of line cards for data packet transfer according to an embodiment of the present disclosure. Each terminal connection provides a separate routing path for a differential pair connection associated with 16 line cards/switch elements.

Figure 7B:
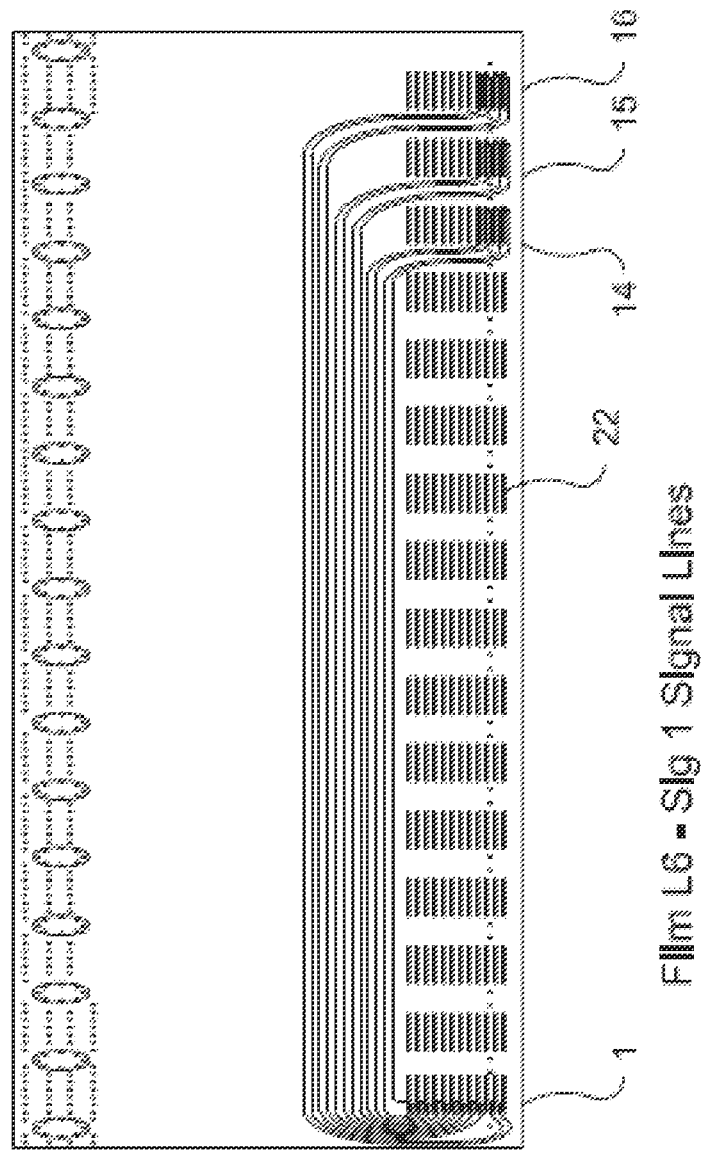
FIG. 7B is an exemplary illustration of the point-to-point electrical mesh interconnect structure showing select signal communication lines for providing direct connection between semiconductor switch elements disposed on line cards for data packet transfer according to an embodiment of the present disclosure.

FIG. 7B is an exemplary illustration of the point-to-point electrical mesh interconnect structure showing select signal communication lines 22 for providing direct connection between semiconductor switch elements disposed on line cards for data packet transfer according to an embodiment of the present disclosure. As can be seen, select connector paths for the differential pairs are fixedly established between internal I/O terminals according to FPGA I/O arrangement and line card identification. As shown, the connection within a given layer of the mesh interconnect shows signal path connectivity between line cards 1, and 14, 15, and 16, by way of non-limiting example.

Referring again to FIGS. 2-4, in an embodiment of the disclosure a control plane on each switch element associated with each line card comprises an internal Ethernet network in communication with the motherboard for communicating independently with each line card/switch element. Communication is accomplished by the control plane sending to each of the line cards their routing table(s) (and/or Open-Flow variables ingress packet processing) to establish each line card's configuration as to where to send data packets on the network. In an embodiment, a plurality of QSFP ports (e.g. 2 bidirectional QSFP ports from mother board to each line card—2 per line card-see, e.g. FIG. 5B) provides for n=16 QSFP control signals and 16 line cards within the system in order to provide point-to-point control via the Ethernet within the system. It is understood that other numbers of line cards and/or control signal may be implemented, such as n=4, n=16, or n=32 line cards, by way of non-limiting example. Furthermore, modulation schemes such as PAM-4, QAM, QPSK may be implemented within the system as is understood by one of ordinary skill in the art. A processor such as an Intel Pentium or Xilinx processor or other such microprocessor device is configured on the control plane for controlling the routing through the network. The control plane operates to constantly read source device addresses (e.g. source MAC address) for devices to add to and/or update the table of connections within the system. As will be understood, for each FPGA, each port is numbered and associated with line card, FPGA, and point-to-point fabric electrical interconnect and is known a priori. Because MAC addresses are required to decay at periodic intervals (e.g. 5 sec.), in order that a new device may connect to the network (or an existing device may be maintained), the control plane is constantly responsive to such device broadcasts and reads, updates, and downloads from its master table within the management plane, the mapping table in order to provide refreshed look up tables for each of the semiconductor switch elements associated with each line card. Accordingly, the system learns via the source MAC address of each peripheral device its relative location on the network and based on a received destination MAC address, operates to obtain the destination location (e.g. line card number, FPGA number, output port) connected thereto and provide the requisite output port for transferring the data packet. Alternatively, such may be accomplished via setup a priori via the OpenFlow protocol and external server agent hypervisor.

Depending on the type bits received, the system is operable to index down into the payload in order to retrieve the address (e.g. VXLAN processing). Once the process is complete and the LUT provides the destination output port, the semiconductor crossbar switch element forwards the data packet along with the requisite destination output port number via the electrical mesh interconnect, thereby consolidating the forwarding engine into the switching engine.

As discussed hereinabove, an embodiment of the present disclosure provides for an internal network such as an Ethernet network linking the motherboard or master control to all of the line cards in the chassis. A second internal Ethernet network is disposed on each line card and links all of the FPGAs on each line card to the control microprocessor (e.g. 22500). Thus, the master lookup table is populated (at the motherboard) and updated with requisite peripheral device connections and flow control is provided to each of the lookup tables on each of the N line cards via N separate parallel Ethernet channels to enable simultaneous writes/updates of the respective tables on each line card. The microprocessor on each line card then sends out the updated tables to each FPGA to enable routing. In an embodiment, the microprocessor on each chip may be an ARM processor operable to execute at a 10G line rate to enable efficient table access and updates (e.g. 3.33 GHz). In an embodiment, the master controller CPU on the motherboard through the network operating system writes the look up tables onto each of the line card/semiconductor switch elements and calls a device driver to modify a programmable chip. It is to be understood that while disclosed embodiments herein describe and include Ethernet communications and standards, other computer networking communications standards and protocols used in high-performance computing having very high throughput and very low latency (e.g. infiniband) may also be implemented.

Figure 5:
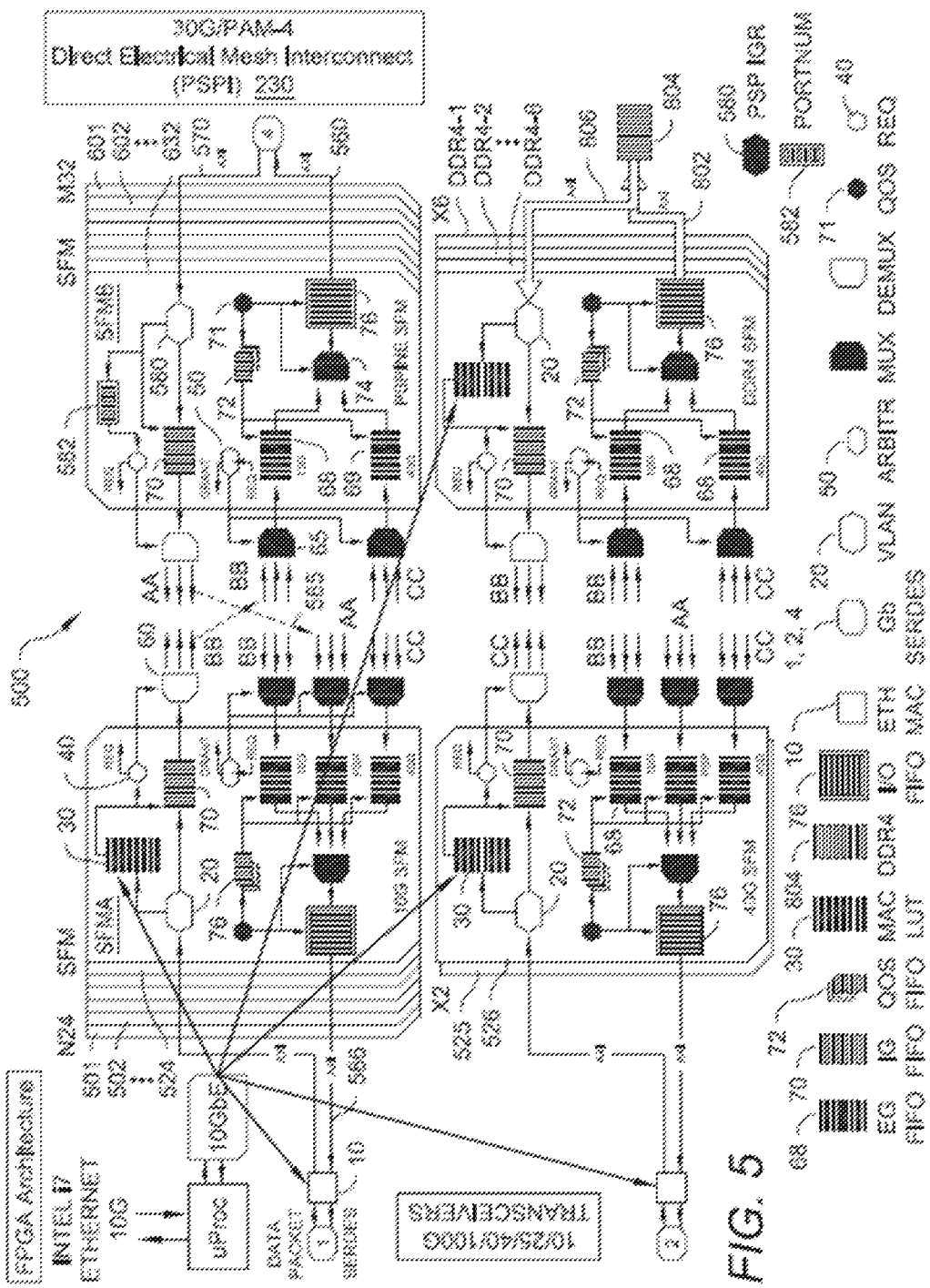
FIGS. 5, 5A, and 5B are schematic diagrams illustrating components of switch flow module processing associated with a semiconductor switch element embodied as an FPGA architecture for controlling the network data packet transfer from source to destination peripheral devices according to embodiments of the disclosure.

The block diagram of FIG. 5 shows an exemplary internal FPGA architecture of a hyper scale switch slice (HSS) 500 according to an embodiment of the present disclosure. The HSS is applicable to implementation or application within a hardware chassis for communications within a data center. In the embodiment disclosed in FIG. 5, the hyper scale switch engine or HSS integrates the forwarding engine and switch engine functionality into a set of building blocks or switch flow modules (SFMs) instantiated on the integrated circuit and which interfaces with external system(s)/device(s) via corresponding SERDES (1, 2, 4). The HSS 500 architecture of the present disclosure is configured in the form of different sets or types of building blocks or SFMs implemented in parallel vector data form, with component structural elements shown therein constituting each of the I/O SFMs (10G I/O SFMs 501-524 and 40G I/O SFMs 525, 526), PSP SFMs (601-632) and DDR SFMs (DDR1-DDR6). The HSS architecture of the present disclosure utilizes transceivers only at the external interfaces or boundaries and thereby realizes savings in both power and speed by avoiding additional parallel/serial serdes conversions within the HSS. Further, the HSS 500 architecture of parallel data vector SFM modules advantageously supports interfacing (e.g. serdes element 4) with any external fabric (e.g. CLOS or non-CLOS networks), thereby providing a plug-and-play architecture with integrated forwarding and switch engine and OpenFlow engine with configurable building block SFMs for instantiation on an integrated circuit.

The HSS diagram effectively equates to a single FPGA, with 2 or, in the present embodiment, 3 FPGAs in a line card. As discussed above, in an exemplary embodiment, 16 line cards are provided in a hyper scale switch chassis and dependent upon the line card capability as a 10/25/40/100G Ethernet functionality. Additional data stream processing (e.g. 200G, 400G) may be implemented via pipelining process to mitigate the need for additional cycles within the chip. In an embodiment of the disclosure, system resources are reduced by a pipelining process to mitigate the requirement for additional cycles for performing additional work associated with increased data rates. In order to effect very high data streams (e.g. 200G or 400G), the chips that implement the signal processing (having a 64 bit bus width (8 bytes)) would require execution at speeds (e.g. 2G) in excess of system capabilities. In an embodiment, the system according to the present disclosure may implement pipelining for 100G and above. In an embodiment, for 400G processing, pipelining of four 100G data streams may be implemented and aggregated to provide such enhanced data throughput. Similar processing may be provided for 200G (i.e. pipelining of two 100G data streams) throughput. Such processing is distinct from the mechanisms for 10G and/or 40G (4 lines or wires) with one data signal split across four lines.

In an exemplary embodiment, a plurality of Switch Flow Modules (SFM) (e.g. 58) are provided for a 10G switch element with integrated fabric. Other numbers of instantiations may be required for different rate switching (e.g. 40G). Each I/O SFM contains the ingress/egress FIFO, Routing Lookup Table and sequencers. The I/O SFM is triggered and commences packet transfers in reaction to the Ethernet MAC core control signals emanating from the core microprocessor (e.g. Xilinx Ethernet Core) on the I/O side indicating reception of a packet. An additional way that triggers will occur are for packets that come in via the transceiver to cause the sequencer/scheduler to initiate a request to transfer to the appropriate egress port via a cut through flow. The appropriate port is determined from the router lookup table and hash function to reduce the address space. The egress stage of the SFM grants requests through an arbiter that resolves simultaneous requests from multiple SFMs. A User Interface AXI Bus manages the router and lookup tables. Quality of Service (QoS) prioritization is implemented in accordance with Ethernet rules.

Referring again to FIG. 3 in conjunction with FIG. 5, overflow processing (DDR) is provided so as to divert packets that cannot be forwarded due to contention to a buffer for subsequent processing. In addition, the integrated semiconductor switch and fabric according to an embodiment of the present disclosure comprises a plurality of n layers or laminates (e.g. n=16) to facilitate the volume of signal connections and direct point-to-point connections within the system.

Figure 6A:
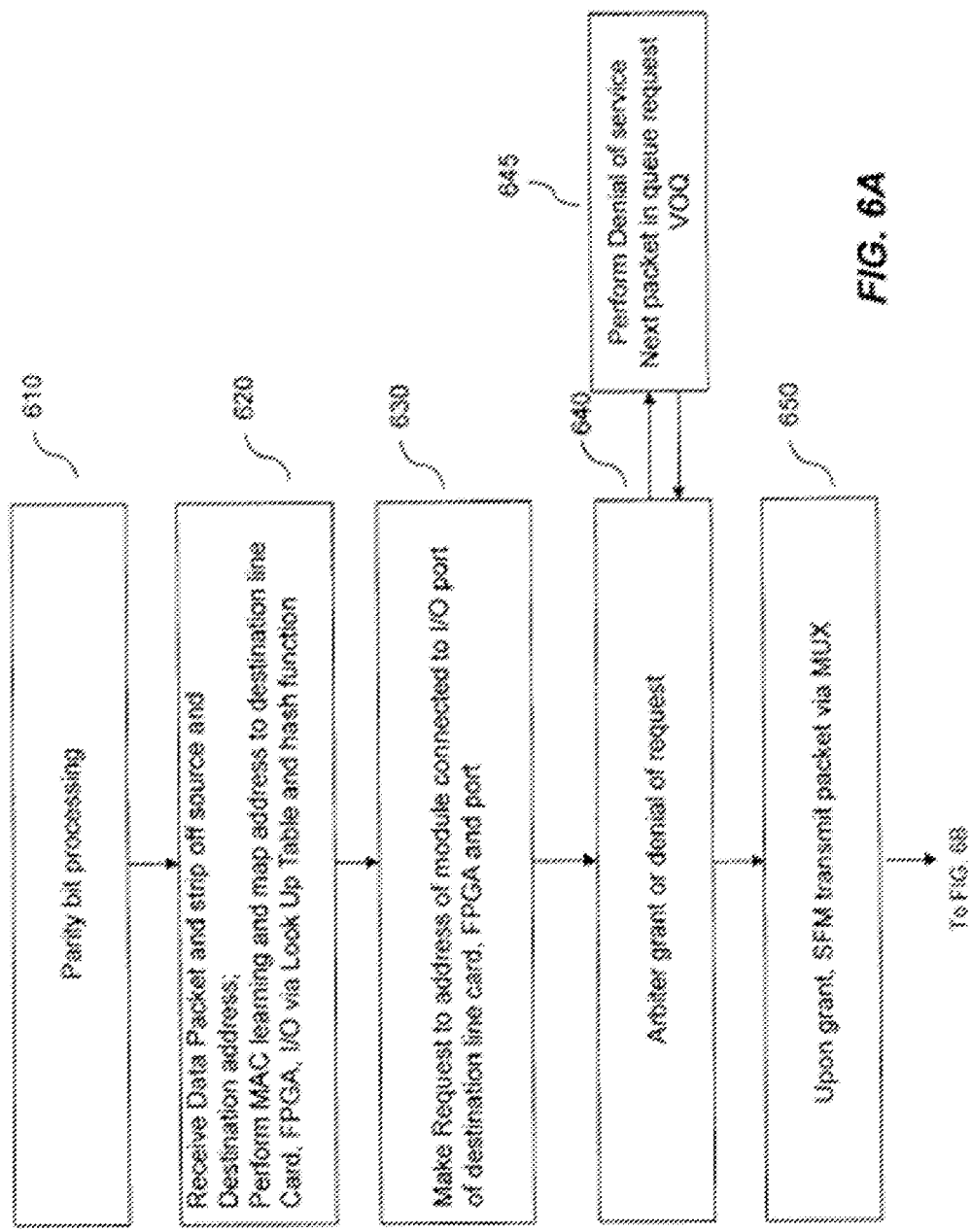
FIG. 6A-6B is a process flow illustrating a method of sending a data packet through a network switch with semiconductor switch elements and point-to-point electrical mesh interconnect according to an embodiment of the present disclosure.
Figure 6B:
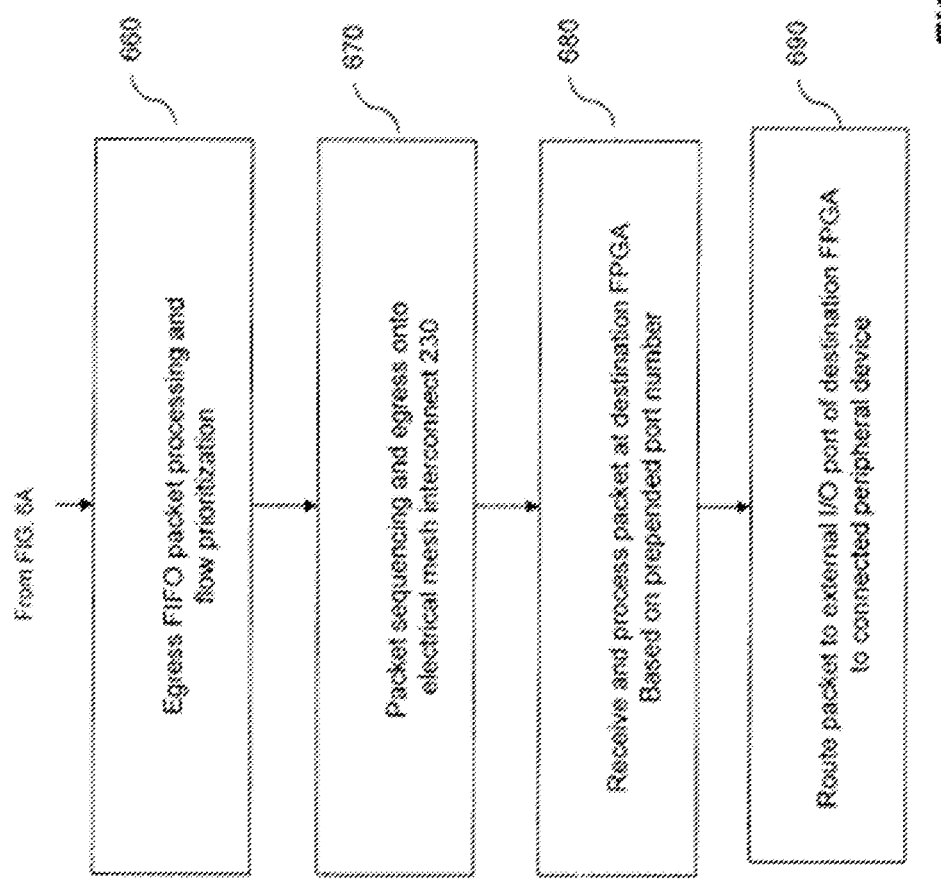

Referring now to FIG. 6 in conjunction with FIG. 5, there is disclosed a process flow illustrating steps for sending a data packet through a semiconductor crossbar switch element and electrical mesh interconnect according to an embodiment of the present disclosure.

In an exemplary embodiment, the FPGA architecture of FIG. 5 is embodied as a set of N (e.g. N=26) switch flow software modules or components (SFMs) designated as I/O SFMs (labeled 501, 502, . . . , 526), and M (e.g. M=32) SFMs designated as direct connect SFMs (labeled 601, 602, . . . , 632). The direct connect (PSP) SFMs each have direct connections to the electrical mesh network 230 for packet transport. In an embodiment, each of the I/O SFMs of each FPGA can accept requests from both direct connect SFM modules as well as I/O SFM modules of the FPGA. Direct connect SFM modules are configured so as not to be able to send requests to other direct connect SFMS. In an embodiment, each FPGA's SFM digital logic circuit modules and functionality and behavior may be implemented in hardware description language (HDL) useful in describing the structure and behavior of those modules depicted in FIG. 5.

Within the FPGA architecture shown in FIG. 5, a data packet is received at SERDES 1 and communicated to MAC processing module 10 which provides up-chip or down-chip processing (depending on ingress/egress flow) (FIG. 6 block 610). Processing module 10 operates to decrease/increase the packet bit number by N bits (e.g. N=2 from/to 66 bits to/from 64 bits) to address parity as part of the input/output processing and timing or re-timing functionality associated with the switch flow modules of FIG. 5. In this manner, communication channel noise is mitigated by stripping off 2 bits upon entry into the SFM and adding 2 bits upon exit.

Processing proceeds to SFM sequencer module 20 (e.g. VLAN processing) within the SFM FPGA architecture. Sequencer module 20 (e.g. of SFM A) operates to strip off the MAC source address and destination address from the incoming packet (FIG. 6 block 620). The source address is utilized by the system for learning (e.g. MAC learning) to determine what devices are connected to the network at particular ports and update the master table and corresponding downstream tables for each of the line cards. On the condition that a device address is not in the lookup table, the system forwards to the microprocessor for delivery to the motherboard for formulation into each of the lookup tables. The destination address is used as an index into the lookup table (LUT) 30 on SFM A in order to determine the output port to route the packet to. This may be implemented via random access memory (RAM) or other on chip storage media. FIG. 6C is an example showing a LUT wherein an 11 bit field is stored, including 4 bits for line card identification (e.g. line card 1-16), 2 bits for FPGA identification on the line card (e.g. FPGA 1-3), and 5 bits of I/O in order to map to 32 different I/O ports. A 2 bit field identifying whether the packet at that particular FPGA is to be routed via the direct electrical mesh interconnect structure or whether the routing pathway is merely internal to the particular FPGA and/or line card associated with that FPGA (and therefore not sent via the electrical mesh fabric interconnect) may also be provided. Under such condition (i.e. 11(PSP)) the route path would not pass via the direct electrical mesh interconnect structure (e.g. source and destination on one of the FPGA's on the same line card).

Referring again to FIG. 5 in conjunction with FIG. 6, the sequencer module utilizes the MAC address as an index to find the mapping location and raise a request (module 40) to a corresponding SFM (e.g. SFM B) that is connected to the determined line card and the determined FPGA on the line card, in order to route the data packet to the appropriate destination (FIG. 6 block 630). Arbiter module 50 (SFM B) receives the request from I/O SFM A (as well as any other SFM requesting packet transfer) and selects the particular request for processing (FIG. 6 block 640). Upon grant of the request, the packet is transported via the cross-bar multiplexer (MUX) arrangement 60-65 for downstream processing (FIG. 6 block 650).

Upon grant of the request, the queued data packet in buffer 70 (ingress FIFO) is transferred via MUX units 60, 65 to the egress FIFO (e.g. module 68) on direct connect SFM B. In an embodiment, the SFMs 601-632 are configured to accept both 10G and 40G pathways via their respective egress FIFO queues (68,69) which are prioritized according to the quality of service (QOS) processing module 71 and QOS FIFO queue module 72 (FIG. 6 block 660). The QOS module interacts with the VLAN processing to select and sequence via MUX 74 packets among the different process flows (e.g. 10G, 40G) according to priority requirements to transmit the packets in the FIFOs (along with the prepended I/O port number) out onto the electrical mesh interconnect 230 (FIG. 6 block 670). It is to be understood that MUX 74 performs priority swap or selection according to the priority of service whereby packets and their priorities are linked according to the queues (i.e. next in line processing) 72 and staging FIFO (e.g. I/O FIFO) 76.

In one embodiment, the FIFO operates to enable different data rates (10G/40G) to proceed through the FPGA by means of skewing/de-skewing the data rates by via input to the FIFO at a first rate and output from the FIFO at a different rate, as is understood by one of ordinary skill.

Still referring to FIG. 5, in conjunction with FIG. 6, once the data packet exits the initial FPGA at SERDES 4 (flow 560), it traverses the electrical mesh interconnect 230 which routes the packet to the destination FPGA. As shown in FIG. 5, at the destination FPGA, the sequencer 580 (via flow 570) receives the packet and correlates the port number prepended on the packet in port number queue 582 with the packet number staging and routing of the packet to the destination port address (FIG. 6 block 680). As previously described, request processing and communication onto the particular port associated with the FPGA via the particular SFM is made through the crossbar (e.g. flow 585) which proceeds through the respective SFM (501-526) to the output port (e.g. flow 586) for receipt by the port connected peripheral destination device (FIG. 6 block 690). As shown, flow arrows identified as AA, BB, and CC represent data packet flows through the crossbar (e.g. at 22 GB rate), with flow arrows identified as AA being at a rate of about 22 GB, and arrows BB and CC representing data packet rates of 10G and 40G rates, respectively.

The FPGA architecture further includes overflow (back pressure) processing SFMs (e.g. 6 or more instantiations) to alleviate throughput bottlenecks. As shown, in the event of a significant blockage of data flow, a request is made to deposit the overflow packets to an external repository 804 via flow 802. Overflow packets may be retrieved from DDR (e.g. DDR4) FIFO 804 via flow 806. The FPGA architecture includes overflow (back pressure) processing SFMs (e.g. 6 or more instantiations) to provide a bypass or alternate route for circumnavigating bottlenecks within the HSS to avoid dropping packets. As shown, in the event of a significant traffic backup of data flow, a request is made to redirect data packets to a repository 804 (external or internal) via flow 802.

In one embodiment, in the event that the packet request is denied, processing proceeds to the next packet in the queue for a request. Processing of that next packet then proceeds as outlined hereinabove. In the event that the request is granted and processing of that next packet proceeds to its destination port, then a new request is made for the previously denied packet. Otherwise, in the event of a second denial, processing proceeds to the next packet in the queue for a request. As the denial of service request provides for multiple (e.g. three or more deep) sequential packet requests, if the third packet in line gets denied, processing reverts back to the first packet for making a new request (VOQ).

As shown with respect to the embodiment of FIG. 5, multiple instantiations of switch elements or switch flow modules (SFMs) are implemented within a networked switching device or hyperscale switch slice (HSS). Each SFM is integrated with other SFMs to constitute an HSS within a programmable logic device such as an FPGA or other integrated circuit (IC). In accordance with an aspect of the present disclosure, the switch flow module represents a single port switch element configured as a fundamental building block for integrating with other SFMs to build into an integrated network data packet switch. Each SFM has the forwarding engine and switch engine co-located therein. In an embodiment, a plurality of SFMs are integrated to constitute an HSS on an FPGA integrated onto a line card. In an embodiment, multiple instantiations of input/output (I/O) SFMs (501-526) at varying data rates (e.g. 10G, 40G, 100G, etc.), direct connect (e.g. PSP) SFMs (601-632), overflow processing SFMs (DDR SFMs DDR4-1-DDR4-6), and broadcast SFMs are implemented. The architecture of the present disclosure reduces the power/dissipation requirements (by not requiring the multiple I/O traversals of the SERDES as in prior art architectures) while providing enhanced speed and processing throughput. Other embodiments are also contemplated, such as the HSS with direct connect (PSP) SFM interfacing with Clos networks (in contrast to the mesh or wired backplane).

In an embodiment, each SFM includes an ingress module and an egress module, with the ingress module further including a MAC extraction module, hash function module, receive (Rx) packet memory, packet sequencer including packet information process module, read address generator and virtual output queue (VOQ) module, and a requestor module.

The SFM egress module is further divided into sub modules or processing functionality of transmit (Tx) packet memory, for 10G, 40G, and 25G (PSP) data rate processing; VLAN detection, for 10G, 40G, and 25G (PSP); packet info module processing for 10G, 40G, and PSP; a QoS and weighted Round Robin scheduler, and a read address generator.

Control Plane Processing

The disclosed hyperscale switch can be immersed into a live network to autonomously determine routing information and LAN topology, or may be configured via an external OpenFlow agent such as an SDN Controller. In either case, the N (e.g. sixteen) line-cards are configurable by the control plane, implemented using a motherboard server and NIC cards amounting to 16 full-duplex 10 GbE pipes, with one connection per line card. The control plane also collects the telemetry of the internal workings of the switch and displays state variables via a Graphical User Interface (GUI) running on the motherboard.

Figure 13:
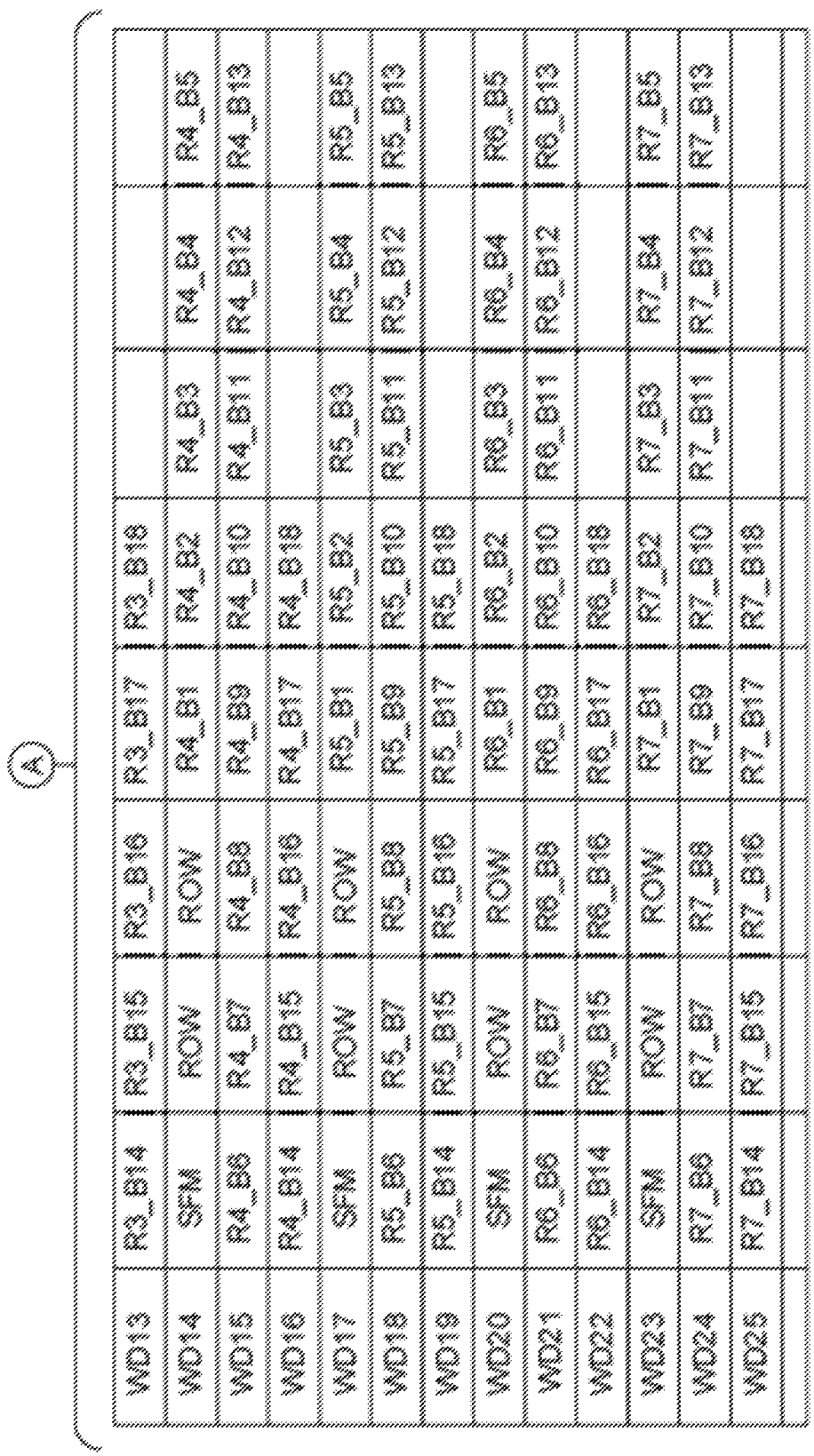
FIG. 13 is an example of a frame structure for MAC propagation.

Control plane processing according to an aspect of the present disclosure includes both MAC learning and MAC propagation functions. The MAC learning processing is performed on the integrated circuit (e.g. FPGA) ingress operational side, with packet transfer up to the control processor (e.g. Zynq processor) associated with the respective line card, and ultimately to the Motherboard (output from the FPGA). MAC propagation processing is performed on the integrated circuit (e.g. FPGA) ingress operational side, with updating of the HASH LUT Table with port number information (input to the FPGA). FIG. 12 shows an example embodiment of an Ethernet frame structure associated with MAC learning and SFM read operations, while FIG. 13 shows an exemplary frame structure for MAC propagation, which may be updated to contain VLAN based SFM specific row information.

In an embodiment, when the switch is running in auto immersion mode, each line card feeds back to the Motherboard via an onboard microprocessor. A running list of new MAC addresses, MAC Learning, is sensed on the ports. The Motherboard, in turn, forms and manages a routing table based on the ML and pushes down through the Ethernet pathways updated router tables, MAC Propagation, continuously, periodically. Also, the Motherboard keeps track of activity levels on each port, and when the activity falls outside of a prescribed period (MAC Aging), the Motherboard removes that port from the router table to ensure that stale connections do not exhaust memory resources.

VLAN processing is associated with the control plane loading each VLAN ID (N bits, e.g. where N=12) into the I/O SFMs only. In this manner a sub network or group of sub networks may be created which divides up the plurality of modular switch ports. FIGS. 9A and 9B illustrate various processing flows associated therewith. Access port processing with one ID only is shown in FIG. 9A, in contrast to inbound trunk port processing which allows multiple VLAN IDs (e.g. N=24 VLANs spanning different local area networks) shown in the process flow of FIG. 9B. As shown therein, the control processor loads N VLAN IDs into registers and processing determines whether data packets are ingress or egress. If determined to be not on the trunk, then the tag (ID) is inserted into the packet (header) and routed to the appropriate port. In a VLAN enabled switch a broadcast SFM is configured to ensure packets are sent based on VLAN broadcast groups only.

Figure 10:
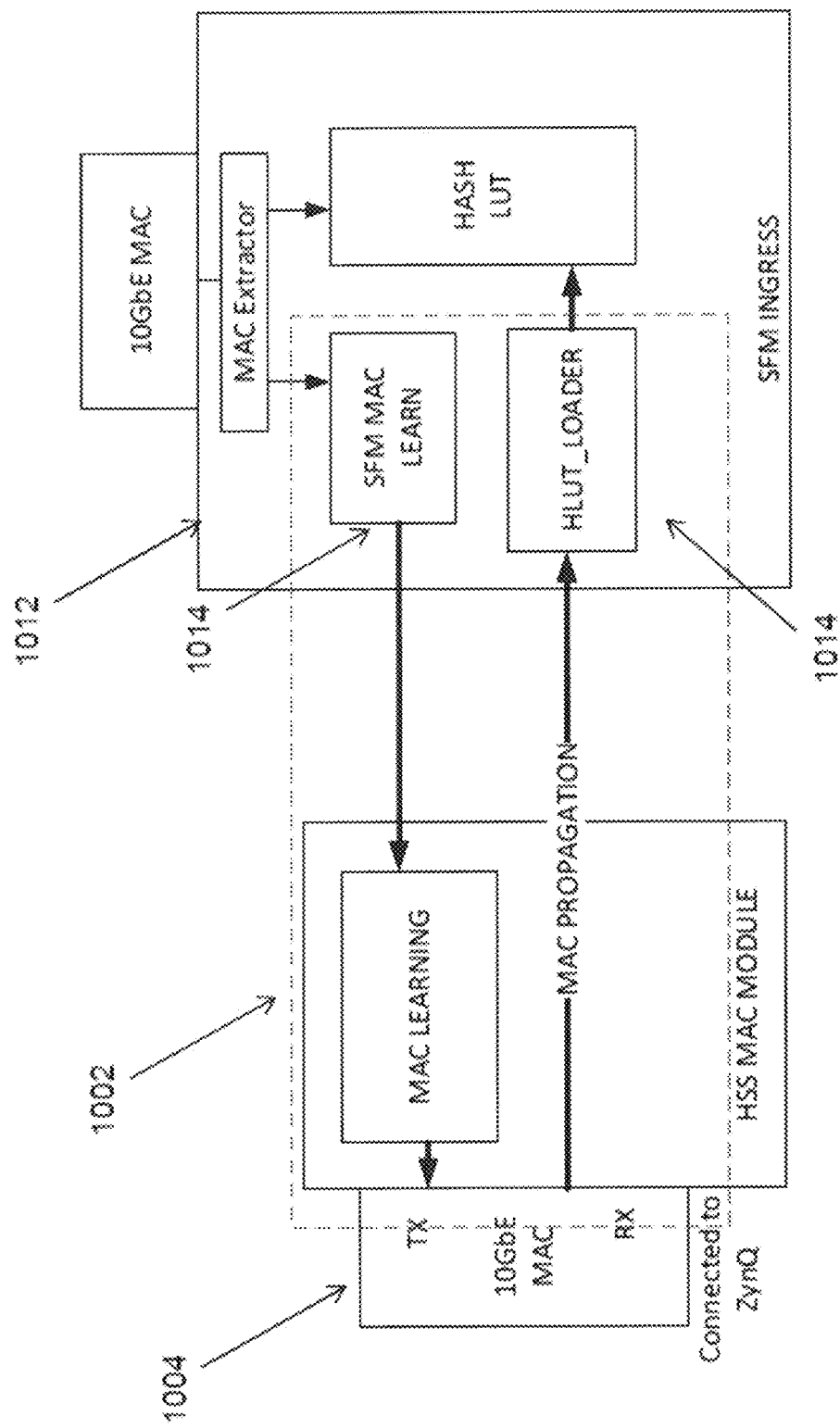
FIG. 10 is an exemplary block diagram illustrating key components of the MAC learning and propagation of the HSS system according to an embodiment of the present disclosure.

FIG. 10 is an exemplary block diagram illustrating key components of the MAC learning and propagation of the HSS system according to an embodiment of the present disclosure. As shown, the SFM MAC Learning processing (block 1014) takes place within each I/O SFM. Embodiments may be implemented in computer code such as HDL or other appropriate software/hardware/firmware and data base lookup table access technologies. In an embodiment, module 1014 operates to create a N×M table (e.g. 48 wide×64 deep) to save MAC source addresses ("SRC-MAC_TBL") and perform read/write operations thereon. A table refresh rate R is selected. In an embodiment, a table refresh rate on a given duty cycle (e.g. 10 microsecond (us) duty cycle) may be implemented. MAC registers are also reset every duty cycle. The system operates to filter repeating MAC source addresses by comparing against the last three MACs received. The MAC learning is performed in K cycles (where K=4) and collects up to N MAC source addresses, while stopping storing of MAC source addresses when the table is full.

The HSS MAC Learning processing module 1002 periodically aggregates MAC learning information from each SFM and transfers the set of SFM information to the control processor (e.g. Zynq processor) via the Ethernet, according to the predefined frame format. Such processing may be implemented as an autonomous mode, in contrast to an externally guided OpenFlow mode of operation. Module 1002 collects continuously the N (e.g. N=26) SFM "SRC-MAC_TBL" per duty cycle. Only new valid MAC addresses shall be read from the SRCMAC_TBL and (rather than reading the entire table) by default. The module forwards (block 1004) an Ethernet frame (e.g. 1508-byte or 9000-byte depending on the configuration) to the control processor per duty cycle.

For MAC propagation processing, the receive (RX) path of the Ethernet is connected to the HLUT LOADER module 1014 within each SFM to load the port numbers to the HASH Table (as per the code in HSS Superstructure). HLUT LOADER module 1014 receives Ethernet frames from the Control Plane (e.g. Zynq) processor and stores the frame in internal memory. The module 1) writes rows into each SFM or globally across the set of SFM (with global SFM designated as 255); 2) uses predetermined packet size of, e.g., 1,508 or 9,000 bytes; 3) contains a predetermined number (e.g. 78) Hash LUT rows (18 bytes per row) per packet; 4) if not meant to be written globally across all SFMs, then the hash LUT row entry is updated to specific SFM(s) based on 1-bit encoding present in the frame received from the control processor (e.g. Zynq) along with hash LUT row entries. The module also utilizes duty cycle, half periods to avoid read/write location collision avoidance.

Virtual Output Queue (VOQ)

Figure 8A:
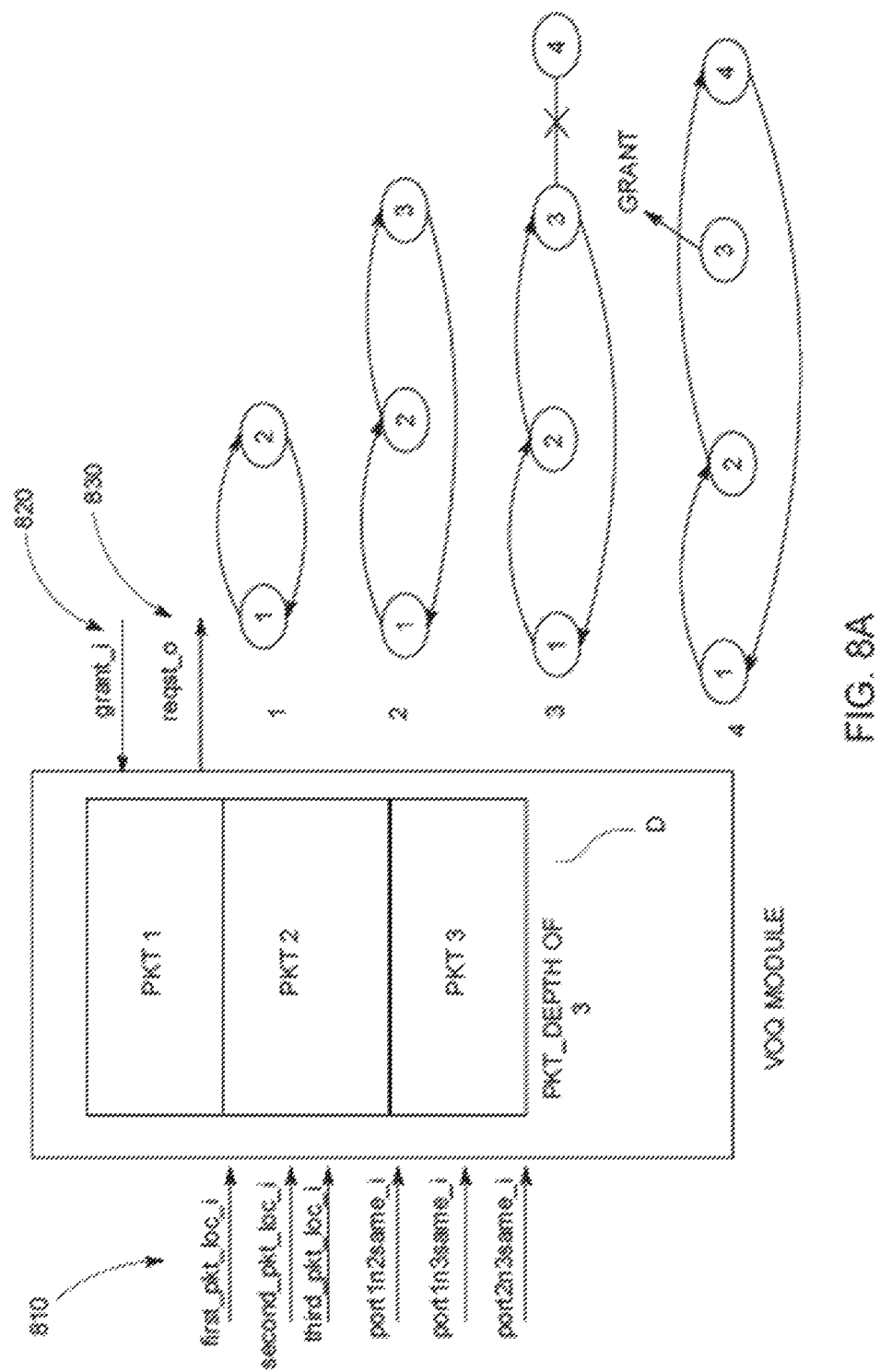
FIG. 8A is a block diagram illustrating aspects of VOQ processing in accordance with an embodiment of the present disclosure.

Referring now to FIG. 8A in conjunction with FIG. 5, there is shown a block diagram illustrating aspects of VOQ processing in accordance with an embodiment of the present disclosure useful for collision avoidance. The VOQ module resides on the ingress side of an SFM, such as illustrated in FIG. 5 as SFM 524. In an embodiment, the depth (D) of the VOQ module is a predetermined number, which in a preferred embodiment is given as three (3), so that a virtual port number of only 3 packets is queued. The VOQ module receives as input(s): the destination SFM port number 810 from the packet info. module, and a grant 820 from the requestor module. The VOQ module provides as output(s): the port number 830 to requestor module and the read start address and enablement for the read address.

The VOQ process flow is described as follows.
1. The port number is provided to the VOQ module from the packet info module. On the condition that only one port number is available, that port number is sent to the requester module, and the process is repeated until it a grant is received.
2. If two destination port numbers are available, then the first port number shall be sent to the requestor module and the VOQ module shall wait for the grant. Upon receipt of the grant, that packet is sent out on the cross bar by the read address generator module. If the grant is not received within a predetermined time period (e.g. within 3 clock cycles) then the second (2nd) port number is sent to the requester module. If the grant is not received again within the predetermined time frame constituting timely receipt, then the third port number shall be sent. This process shall cyclically repeat.
3. If three destination port numbers are available, then the VOQ module sends the 1st port number to the requestor module and waits for the grant. If the grant is not timely received, then the VOQ module sends the 2nd port number. If a grant not received for the 2nd port number is not timely received, then the 3rd port number is sent. This process is repeated until one of the port numbers receives a grant.
4. In an embodiment, even though a fourth (4th) port number may be available the VOQ module considers the first three packets and they shall be sent to the requester module until they receive a grant. On the condition that the 3rd port number obtains a grant, then the 4th port number will be taken to consideration by the VOQ module if it is available. If the port number of consecutive packets within the VOQ module has the same destination number, then the front line one port number will be sent to the requestor module.

Figure 8B:
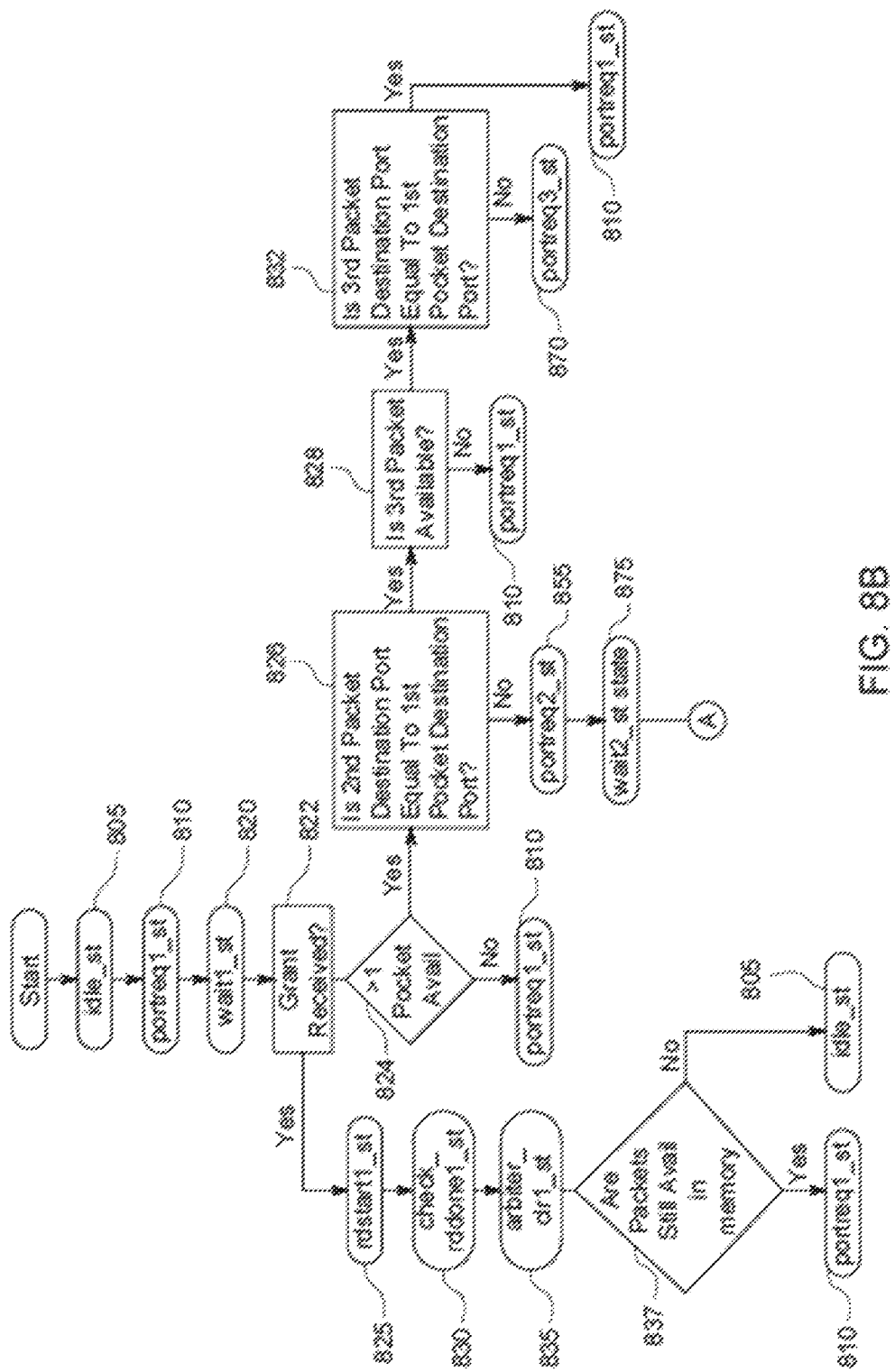
FIG. 8B shows a more detailed process flow associated with the VOQ module finite state machine transition processing.
Figure 8B:
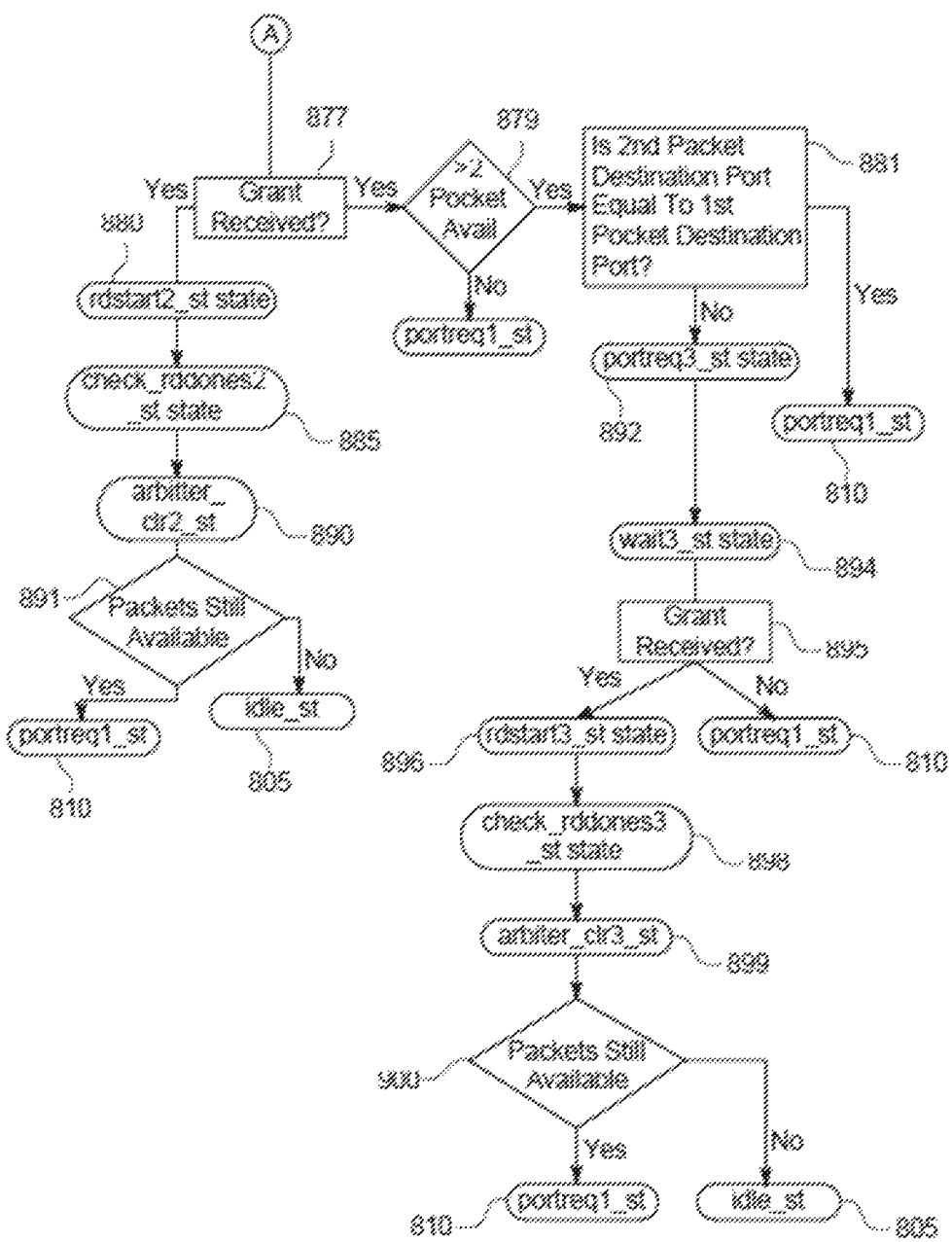

FIG. 8B shows a more detailed process flow associated with the VOQ module finite state machine transition processing. As shown, in reset condition, the VOQ finite state machine (FSM) is in a default idle mode labeled idle_st (block 805). Upon release from reset, a check is made to determine if the destination port of the first packet is available from the hash lookup table HASH LUT (e.g. written to the port array in the pkt_info_module). If the destination port of the first packet is available, processing moves to the next state portreq1_st (block 810), which sends a request to the first packet destination switch flow module (SFM) and moves to state wait1_st (block 820). In this state, the module waits for a predetermined number of clock cycles (e.g. 2 or 4) and then checks if a request is granted. If a grant is received, the system moves to state rdstart1_st (block 825). The rdstart1_st state (block 825) triggers reading the first packet from memory, such as a Block Random Access Memory (BRAM) used for storing large amounts of data inside of an FPGA, by way of non-limiting example. State processing includes updating of the sequence array in the pkt_info_module and triggering the read address generator. Upon completion, processing moves to state check rddone1_st (block 830). The check rddone1_st state waits for completion of ongoing read operations. Once completed processing moves to state arbiter_clr1_st (block 835). This state sends a "clear" signal to the destination SFM arbiter module, and checks if packets are still available in memory by checking the port count in the port array. On the condition that packets are still available, processing proceeds to state portreq1_st (block 840). Otherwise, the system moves to the idle_st state (block 805).

When the system is in the wait1_st state (block 820) and if no Grant is received, the module checks if more than one packet is available. If not available, processing moves to state portreq1_st (block 810). If available, it checks whether the second packet destination port is the same as the first destination port. If the port numbers are not the same, processing moves to state portreq2_st (block 855). Otherwise, the system checks if more than two packets are available in BRAM. If not available, processing proceeds to state portreq1_st (block 810). If available, a check is made to determine if the first packet destination port is the same as the third packet destination port. If the same, the processing proceeds to portreq1_st (block 810). Otherwise, the system moves to state portreq3_st (block 870).

The portreq2_st state (block 855) sends a Request to the second packet destination SFM and moves to the wait2_st state (block 875). The wait2_st state waits for 2 clock cycles and then checks whether a Grant has been received, and if so, proceeds to the rdstart2_st state (block 880). The rdstart2_st state triggers reading of the second packet from BRAM and upon completion, proceeds to the check_rddones2_st state (block 885). The check_rddones2_st state waits for completion of ongoing read operation and then moves to the next state arbiter_clr2_st (block 890). The arbiter_clr2_st state sends a Clear signal to the destination SFM arbiter module, and checks if packets are still available in BRAM by checking the port count in the port array. If packets are still available in BRAM, processing proceeds to state portreq1_st (block 810). Otherwise, the system moves to the idle_st state (block 805).

When the system is in the wait2_st (block 875) and if no Grant is received, the module checks if more than two packets are available. If not available, processing moves to state portreq1_st (block 810). If available, it checks whether the second packet destination port is the same as the third destination port. If the port numbers are not the same, processing moves to state portreq3_st (block 892). Otherwise, it moves to state portreq1_st (block 810).

The portreq3_st state (block 892) sends a Request to the third packed destination SFM and moves to the wait3_st state (block 894). The wait3_st state waits for 2 clock cycles and then checks whether a Grant has been received, and if so, proceeds to the rdstart3_st state (block 896). The rdstart3_st state (block 896) triggers reading of the third packet from BRAM and upon completion, proceeds to the check_rddones3_st state (block 898). The check_rddones3_st state waits for completion of ongoing read operation and then moves to the next state arbiter_clr3_st (block 899). The arbiter_clr3_st state sends a Clear signal to the destination SFM arbiter module. If packets are still available in BRAM, processing proceeds to state portreq1_st (block 810). Otherwise, the system moves to the idle_st state (block 805). When the system is in the wait3_st state (block 894) and if no Grant is received, the system transitions to the portreq1_st state (block 810).

In another embodiment, a parallel VOQ processing arrangement architecture is provided for collision reduction when routing of data packets between PSP SFMS (e.g. 601-632 in FIG. 5) and I/O SFMs (e.g. 501-524 in FIG. 5). In order to reduce wait times and avoid collisions, an architecture according to an embodiment is provided wherein the PSP flows are greater than one. By way of non-limiting example, the I/O SFM is modified (FIG. 5A) from that shown in FIG. 5, such that two different flow paths (PSP1 and PSP2 in FIG. 5A) are created for accommodating the M32 PSP data flows in FIG. 5. For example, flow path PSP1 is configured to uniquely accommodate a first set M1 of flows from PSP SFMs (e.g. 601-624) while flow path PSP2 is configured to uniquely accommodate a second distinct set M2 of flows from other PSP SFMs (e.g. 625-632). The division of flows may be even (symmetrical) or uneven (asymmetrical) according to design requirements. In similar fashion, the embodiment of the architecture shown in FIG. 5B reflects components and processing associated with the HSS switch device and the detailed components for each of the I/O and direct connect of PSP switch flow modules (SFMs) for instantiation on the FPGA chip, along with overflow or bypass operations associated with the DDR4 engine and accompanying processing between the I/O SFMs, PSP SFMs, DDR SFMs, and associated external elements.

DDR SFM Processing

Figure 5A:
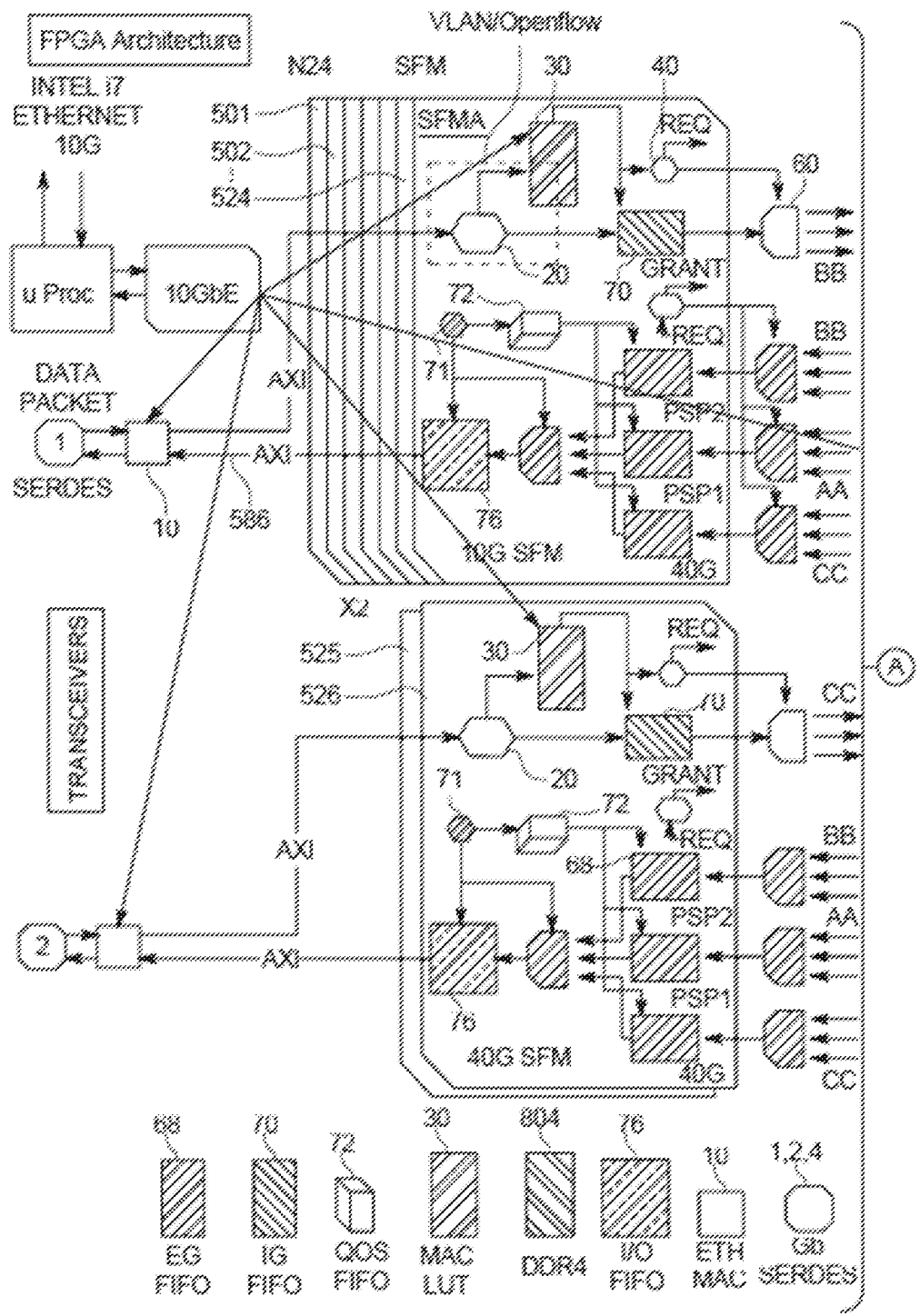
Figure 5A:
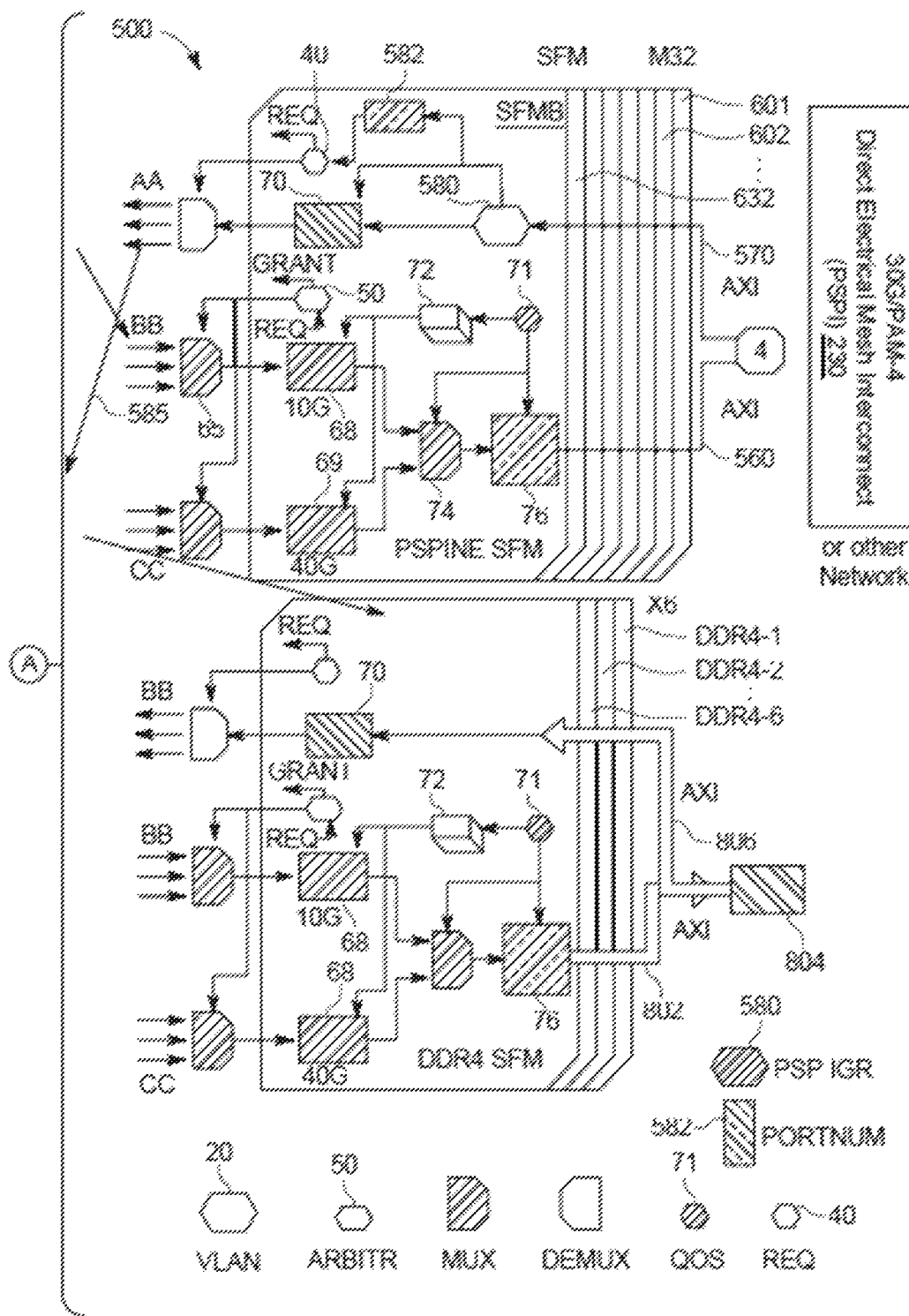
Figure 5B:
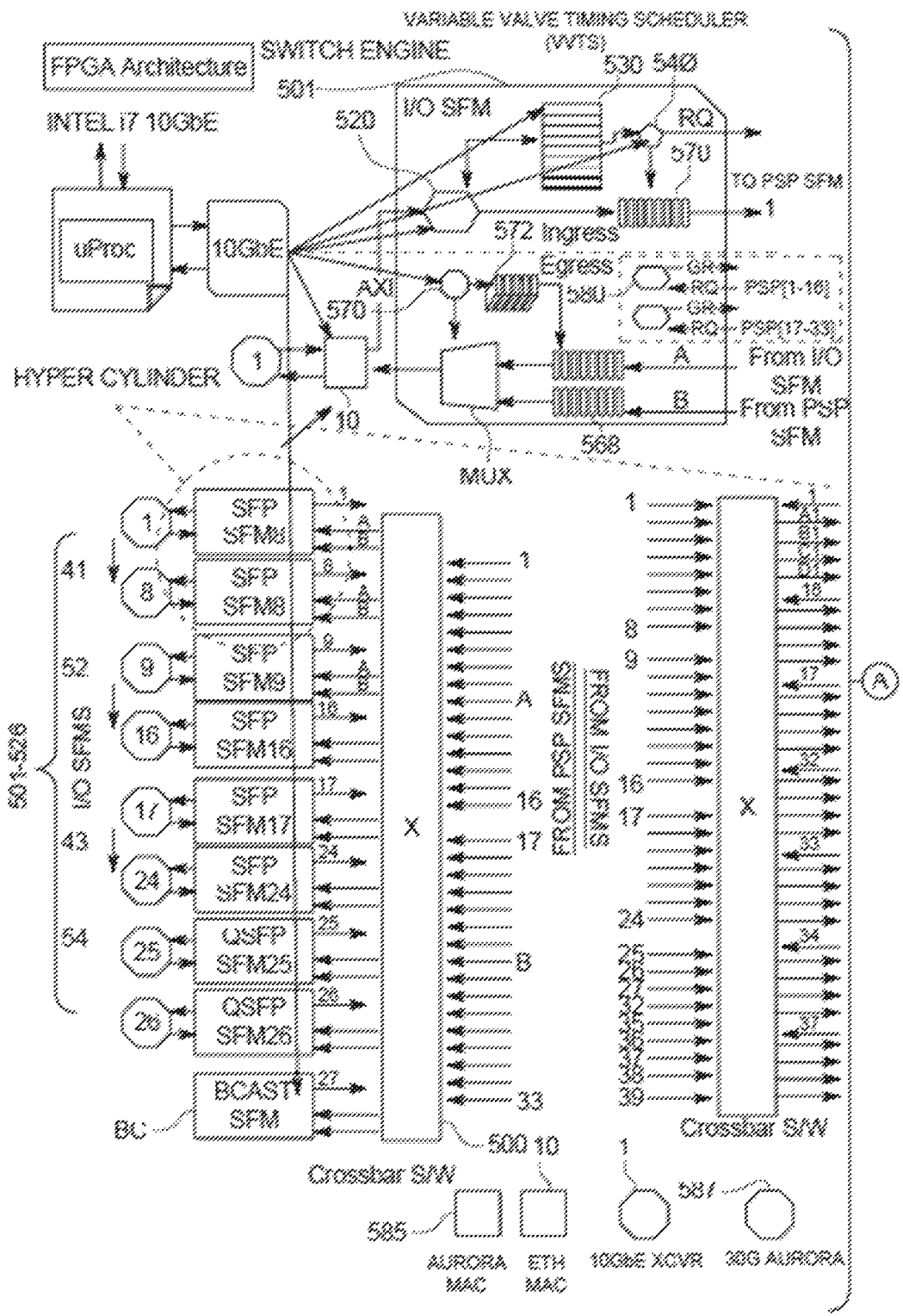
Figure 5B:
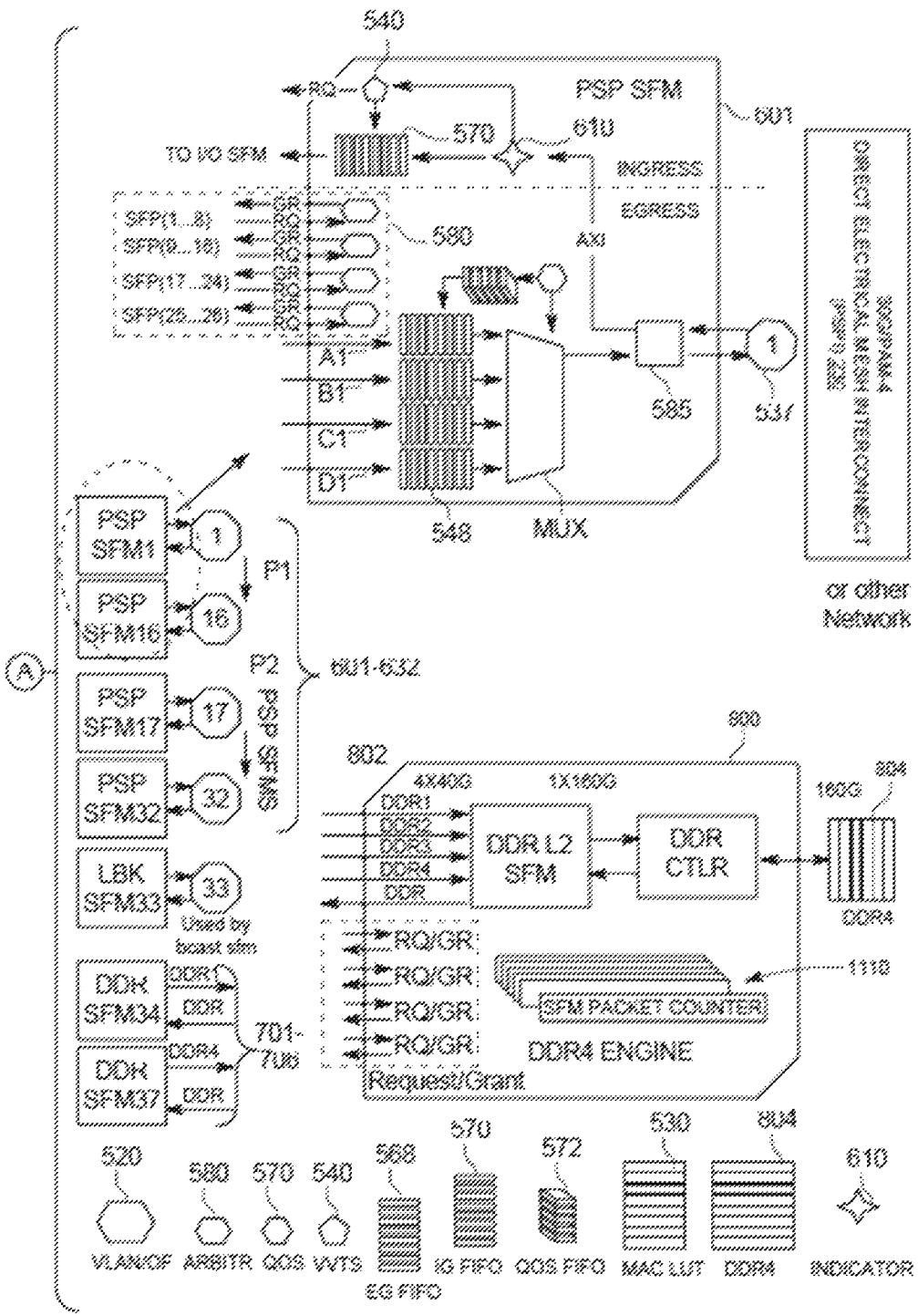

The FPGA architecture further includes overflow (back pressure) processing SFMs (e.g. 6 or more instantiations) labeled 701-706 in FIG. 5B, to provide a "bypass" or alternate route for circumnavigating bottlenecks within the HSS to avoid dropping packets. As shown, in the event of a significant traffic backup of data flow, a request is made to redirect data packets to a repository 804 (external or internal) via flow 802. This overflow processing system as described herein provides the capability to manage heavy packet bursts without dropping packets, or locking up internal connections due to congestion problems. The disclosed bypass or braking system with slightly longer path delay allows for a more uniform, reliable, and efficient back pressure mitigation.

As shown with respect to the embodiment of FIG. 5B, multiple instantiations of switch elements or switch flow modules (SFMs) are implemented within a networked switching device or hyperscale switch slice (HSS). Each SFM is integrated with other SFMs to constitute an HSS within a logic device such as an FPGA or other integrated circuit (IC). In accordance with an aspect of the present disclosure, the switch flow module represents a single port switch element configured as a fundamental building block for integrating with other SFMs to build an integrated network data packet switch. Each SFM has the forwarding engine and switch engine co-located therein. In an embodiment, a plurality of SFMs are integrated to constitute an HSS on an FPGA integrated onto a line card. In an embodiment, multiple instantiations of input/output (I/O) SFMs (501-526) at varying data rates (e.g. 10G, 40G, 100G, etc.), direct connect (e.g. PSP) SFMs (601-632), back pressure processing SFMs 701-706 (DDR SFMs DDR4-1-DDR4-6), and broadcast SFMs are implemented. The architecture of the present disclosure reduces the power/dissipation requirements by not requiring the multiple I/O traversals of the SERDES as in prior art architectures, while providing enhanced speed and processing throughput. Other embodiments are also contemplated, such as the HSS with direct connect (PSP) SFM interfacing with Clos networks (in contrast to the mesh or wired backplane).

According to another aspect of the present disclosure, the DDR SFM (701) is configured to take in multiple flows of data packets from a designated number of I/O SFMs that are experiencing a back-pressure situation, whereby the Ingress RAM (570) of the I/O SFM has accumulated packets beyond a designated threshold depth. Each I/O SFM (501) has an opportunity to gain a connection to a specific DDR SFM running at higher throughput to avoid backing up and follows the standard arbitration to transact packet transfers. In contrast to I/O SFMs, each having their own transceiver and MAC, the DDR SFM contains a read-write (R/W) interface to a DDR Engine (800), which ultimately transfers the packets to and from a high-bandwidth memory (804) for temporary storing of said packets. The DDR Engine action of transferring packets to and from the high bandwidth memory consists of Layer-2 DDR SFM which accumulates packets from several Layer-1 DDR SFM streams (Hyper Cylinder) sending packets in a FIFO fashion and optionally under control of the QOS setting in the packet via the singular high-bandwidth memory data bus.

By way of non-limiting example, according to an aspect of the present disclosure, upon I/O SFM connection establishment with a DDR SFM, the connection follows the standard SFM request—grant arbitration and each I/O SFM aligns to a specific DDR SFM to maintain packet ordering. In an embodiment, termination is made responsive to an empty signal (indicative of an empty condition) from the corresponding connected DDR SFM, in conjunction with a DDR Engine empty signal, indicative of the condition of that DDR SFM's buffer in memory.

Figure 11A:
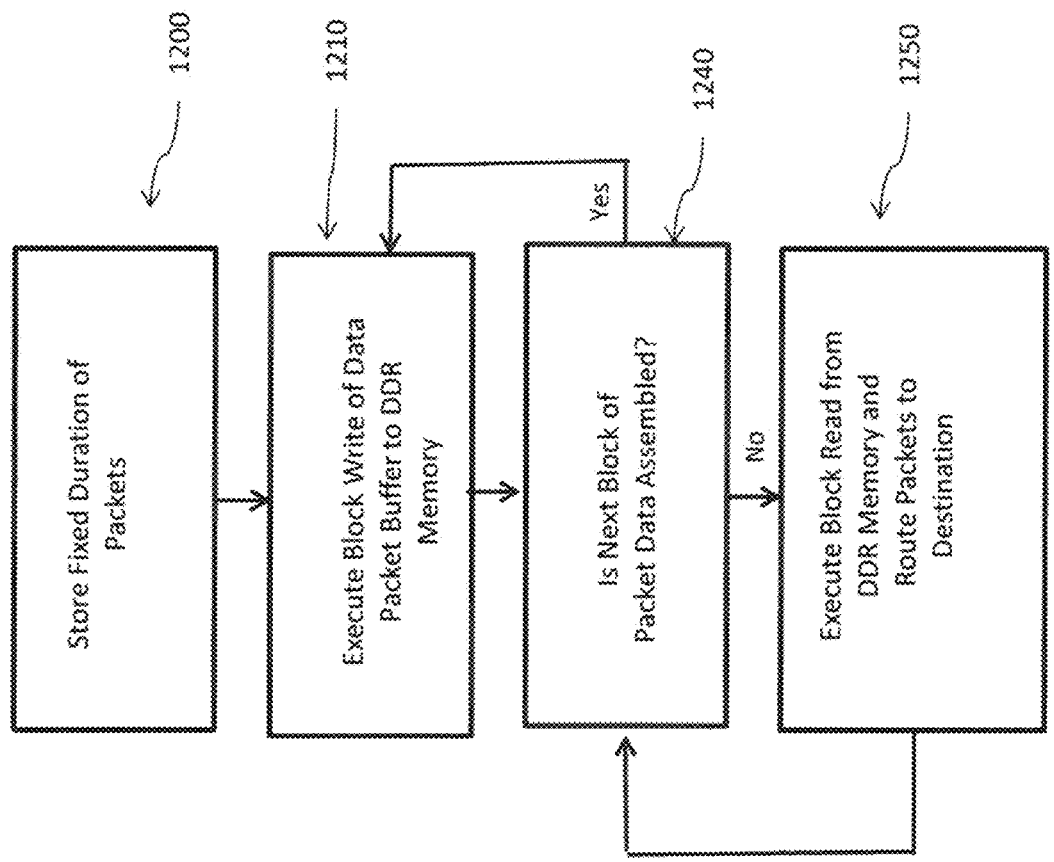
FIG. 11A-11C show exemplary steps associated with DDR overflow processing according to an embodiment of the present disclosure.
Figure 11B:
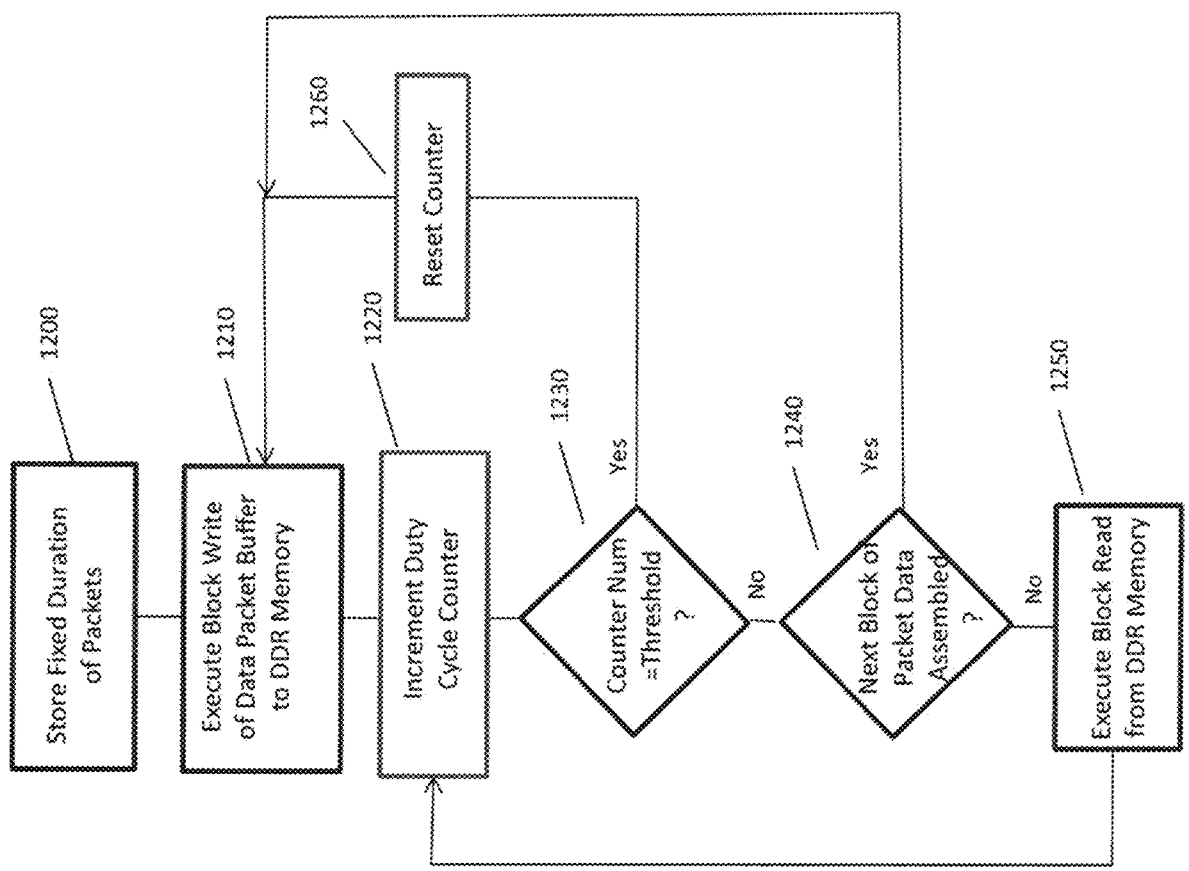
Figure 11C:
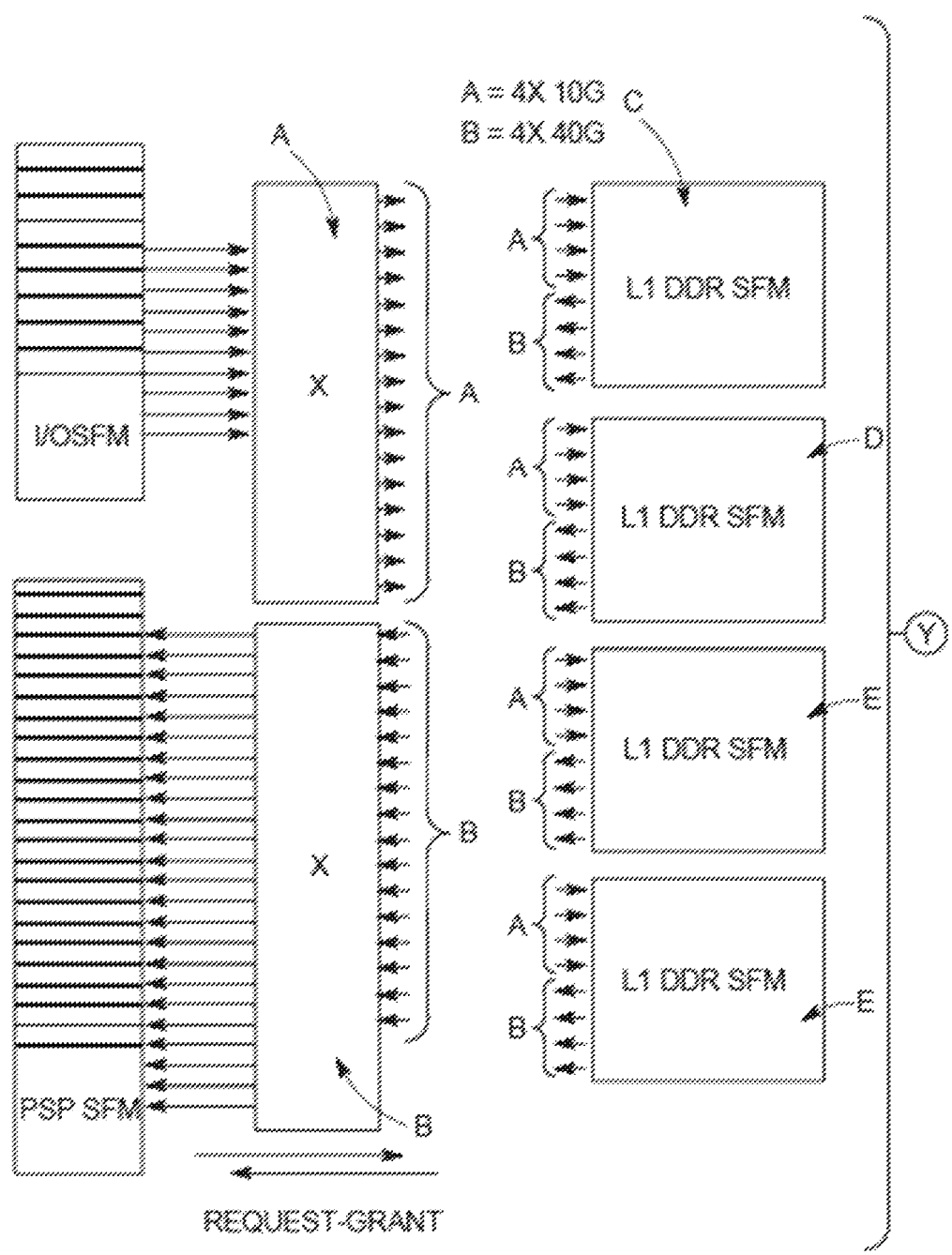
Figure 11C:
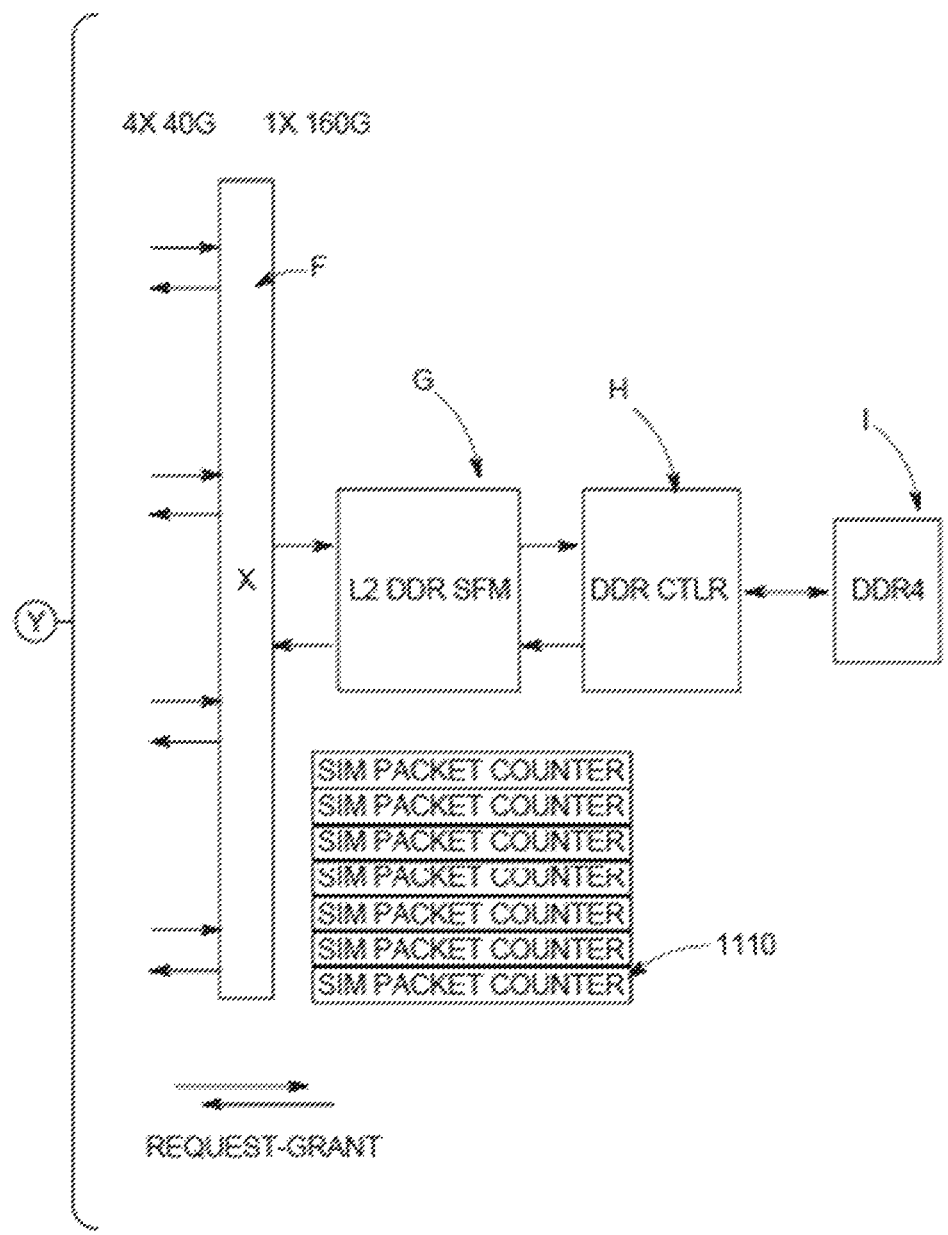

Referring now to FIG. 5B in conjunction with FIGS. 11A, 11B, and 11C, there is illustrated an HSS system including a pool of DDR SFMs. The DDR SFMs are mapped to several specific I/O SFMs to maintain packet ordering and simplicity of design, as illustrated in the various signal lines L from the I/O SFMs. It is to be noted that, in one embodiment, for Layer-1 N=4 DDR SFMs are implemented, which run faster than the I/O SFMs to ensure the DDR path can transfer packets faster than the source I/O SFMs can deliver. Further, DDR SFMs are mapped to several specific I/O SFMs to maintain packet ordering and simplicity of design.

For I/O SFM backpressure processing, routing within the I/O SFM continues whereby, rather than establishing connection with and routing data packets to the corresponding PSP SFM (e.g. 601) via the crossbar switch connection, routing is diverted to a DDR SFM (e.g. 701) via the crossbar as a bypass route for temporary storing of data packets. With the bypass route, the DDR SFM is invoked based on the ingress FIFO (e.g., element 570 of FIG. 5B) depth exceeding a back-pressure threshold capacity. When this condition occurs (i.e. when the number of packets in FIFO 570 exceed the threshold), the I/O SFM makes a request to a designated DDR SFM. The DDR arbiter operates to activate/redirect a given MUX such that, when a grant is received by the particular I/O SFM, the I/O SFM is connected with the given port number associated with the granted DDR SFM. Each I/O SFM transfers packets to a DDR SFM and a dedicated Hyper Cylinder within the DDR SFM. Therefore, each I/O SFM has a corresponding cylinder within the dedicated DDR SFM, and this allows for parallel transfers from multiple I/O SFMs. Each Hyper Cylinder has its own arbiter to support the parallel operation. In an example embodiment, the DDR arbiter granting of a DDR SFM connection returns the said DDR SFM address and which is stored in the I/O SFM as a register, whereby the normal request—grant (i.e., arbitration) process is utilized to transfer each data packet from the I/O SFM to the designated DDR SFM, while ensuring that the same connection is sustaining and exercised each time. When the grant is received by the requesting I/O SFM (via the I/O SFM receiving its port number), that SFM begins sending packets to the arbiter address. In this manner, a channel is established between the I/O SFM and particular DDR SFM via the DDR arbiter.

In an embodiment, once a connection between an I/O SFM and DDR SFM (via the DDR arbiter) is established (unlike typical processing where connections are made and broken on a packet basis) communication of the packets there between proceeds in a normal fashion via the request-grant arbitration process until the packet depth in the ingress FIFO on the I/O SFM is reduced to a given threshold (e.g. depth of 0 or 1). The back-pressure data packets received by the particular DDR SFM are passed from the DDR ingress queue to the DDR memory 804 via the DDR engine (FIG. 5B). As shown in FIG. 11C, the HSS DDR controller coordinates reads and writes to the DDR based on a prescribed period of time to ensure proper utilization of the memory bus. Writes take precedent over reads. If the write buffer contains at least the prescribed number of packets, then a write burst will take place with the external DDR. Otherwise, a DDR read will take place with the external DDR device. In this way, the DDR device will fill during heavy packet bursts at the I/O ports and drain when the burst condition subsides at the I/O ports. The DDR sequencer tracks both the DDR counts (e.g. number of Ethernet frames) and DDR addresses for each SFM. In an embodiment, the DDR controller keeps track of packets per SFM in the DDR write buffer and DDR read buffer. When a particular SFM write buffer and read buffer equal zero, then the DDR SFM arbiter will send a zero signal to the particular I/O SFM, and the I/O will cease sending packets to the DDR SFM and route as per normal processing. In this way the bypass path is broken and packet routing returns to normal.

In an embodiment, referring to FIGS. 5B and 11A-11C, a Layer-1 DDR SFM acts to intake packets from the I/O SFM that is experiencing a back-pressure situation and thereby avoid packet drops. It does this by allocating a high throughput interface that ultimately deposits packets into a deep DDR memory configured to store up to several seconds of aggregated heavy data flows from a collection of I/O SFMs (heavy data throughput transient congestion scenario). The Layer-2 DDR SFM acts in the same way as the Layer-1 DDR SFM and provides a higher bandwidth interface which aggregates the flows from the Layer-1 DDR SFM and then presents the packets in a single stream without any segmentation for writing the packets into an external DDR memory such that the memory is used in a FIFO fashion. The writing into memory takes precedence over the reading back from memory, since the switch normally handles a full load of packets with ease entering the I/O SFMs, outside of the detrimental case of the many-to-one situation wherein all switching technology eventually breaks down, with this exceptional case being a transient condition that will eventually abate and enable the switch to recover and unload the stored packets.

In this manner the DDR SFM packet counter in concert with the corresponding memory buffer packet counter determine whether the empty conditions exist, so as to trigger a break of the bypass path connection.

In an embodiment, writing packets into memory takes precedence over the reading back from favoring absorbing a transient burst of packets, resulting from the stress condition of the many to one situation, and later unloading the data packets from temporary external storage when the transient dissipates.

The DDR memory, which may consist preferably of a single interface, or alternatively have multiple interfaces, has, in one embodiment, for each of the N DDR SFMs (e.g. N=4 or 6), N corresponding independent ingress flows. The DDR controller monitors the aggregation of a prescribed burst duration of data packets into the L2 DDR SFM (e.g. a 50-microsecond integration window), to utilize the block write feature of the DDR memory to optimize its access bandwidth. With the DDR controller favoring write commands over read commands for reading back data packets, the read-side eventually gains DDR transfer cycles when the transient burst of data subsides, whereby the write side buffer fill occurs more slowly. The read operation obtains the DDR bus when the write controller aggregates less than a predetermined amount (e.g. 50-microseconds of packet data) during the integration window. In this way, the DDR controller eventually yields to the read side and drains the DDR memory and DDR SFM buffers. The DDR Engine 800 pulls data packets from the DDR SFMs (701-706) in parallel and time division multiplexes the packets and writes those packets into the DDR memory 804. In order to keep up with the various flows, the DDR interface must be N (e.g. 6) times faster than its data flows. By implementing TDMA processing within the DDR, all of the SFMs are allocated sufficient bandwidth to send out their respective packets. By way of non-limiting example, for DDR processing of 64 bits×2.4 Gbit/sec (with read/write operations performed on the same line), then processing may run at 64 Gb ((64×3)/2) or 6 channels or flows of 10G lines, or 2 flows of 25G processing. As shown, 4 DDRs each of 40G (output) provide for 160 GHz of bandwidth alignment. The set of N I/O SFMs (e.g. N=24) are then equally distributed across each of the 4 DDR SFMs and provide a cylinder or buffer thereto.

The DDR controller monitors the aggregation of a prescribed burst duration of data packets into the L2 DDR SFM, say a 50-microsecond integration window, to utilize the block write feature of the DDR memory to optimize its access bandwidth. With the DDR Controller favoring writing over reading back data packets, the read-side eventually gains DDR transfer cycles when the transient burst of data subsides, and the write side fills much slower. The read operation obtains the DDR bus when the write controller aggregates less than 50-microseconds of data during the integration window. In this way, the DDR controller eventually yields to the read side and drains the DDR memory and DDR SFM buffers.

The DDR SFM includes a packet counter for each I/O SFM connected. When a packet enters the ingress side of the DDR SFM from an I/O SFM, the associated packet counter increments. When a data packet exits the egress side of the DDR SFM, then the packet counter decrements. Once the packet counter decrements to a given threshold (e.g. zero corresponding to an empty buffer), then the DDR SFM sends an control signal to the associated I/O SFM of the "empty" or "zero" condition. The I/O SFM then reverts to routing packets in the default, high-speed process through the switch.

In an embodiment, read back packets from the external memory are directed to the designated DDR SFM egress side based on the prepended I/O SFM number. In this manner, the system ensures that data packets are kept in order without the risk of packet "jump" or packet disassembly/reassembly across lines. The egress side of the L1 DDR SFM interfaces to the crossbar that connects to the PSP SFMs and utilizes the highest transfer rate hyper cylinder in the HSS to ensure rapid draining of the DDR memory and quick and efficient reversion to standard operation. When packets are transferred to the PSP SFM the associated I/O SFM packet decrements.

In an embodiment, the DDR Controller favors writing over reading and monitors the aggregation window to determine whether to execute a block read or continue to block writes to the DDR memory. In this manner, the DDR controller schedules block writes and reads to maximize the bandwidth of the external DDR bus, which is a single bidirectional bus.

The DDR4 SFM module is configured to grant connection of any I/O SFMs (I/O SFM 1-24). The DDR4 SFM receives the packets from 10G SFMs based on the standard request and grant functions. The dedicated DDR4 mux-bank shall mux the data between the 10G I/O SFMs and DDR4 SFMs. The DDR engine keeps packet buffer counts and pointers for the packets stored in the DDR4 Memory. Once a connection is established, the DDR SFM continuously sends packets to the DDR Engine, and once packets accumulate in the memory, the DDR Engine reads those packets back on the condition that the DDR SFM has capacity in its egress buffer, and forwards the packets to the DDR SFM. Once a connection between any I/O SFM and a DDR-SFM is established, all new packets coming in from MAC progress through the normal I/O SFM ingress path and over to the DDR SFM via the Crossbar and ultimately to be transferred to the memory for temporary storing. The bypass routing to the memory continues until the buffer counts in the DDR SFM and memory packet buffer counts decrease to a preset threshold (e.g. zero). At this stage, the connection is broken and new packets route as normal through the Ingress RAM and through the Crossbar on their way to the destination I/O SFM without ever encountering the high-speed memory temporary storing intended for bypass routing to ride through heavy traffic congestion and large bursts of data. The break in the I/O SFM connection (arbiter clear) occurs upon draining the DDR4 buffer. In an embodiment, the DDR engine creates N (e.g. 6) TDM read/write slots to the DDR4 controller and partitions N (e.g. 6) DDR4 memory buffers for N=6 DDR4 SFMs.

Counters 1110 are configured at each end so as to inform when packets may enter and exit via the DDR. In an embodiment, counters in the DDR4 engine are associated with each I/O SFM requesting storage such that when a packet comes in, the counter increments (at DDR-L1 of FIG. 11C), and when a packet exits the DDR SFM, the counter is decremented. In this manner, when a counter is decremented to a null (zero) condition for a given SFM, the DDR controller activates an interrupt (zero) signal to break the I/O SFM connection and signal the I/O SFM to return to normal routing condition (i.e. no DDR processing).

Thus, the DDR controller may be implemented in software with processing illustrated in FIGS. 11A-11B and comprises a cycle or sequencer (e.g. of T=10 usecond duty cycle) having write dominated processing which operates to aggregate enough packets in the given timeframe T to block write the data to the DDR. If enough data packets are aggregated after completion of the block write, the DDR controller performs another block write; otherwise it will insert a block read to read data back out from the DDR. Upon completion of the block read, the DDR controller will again check to see if a block write may performed (if sufficient packets aggregated to satisfy the block write). Otherwise, another block read will be performed and processing continues in this fashion, as shown schematically in blocks 1200, 1210, 1240 and 1250 of FIG. 11A and FIG. 11B.

In a more detailed embodiment shown in FIG. 11B, the DDR controller is further programmed using a counter (blocks 1220, 1260) such that every kth cycle (block 1230=yes), a block write is inserted and performed 1210, in order to drain the buffer. In this manner any packets remaining in the queue are written to DDR and subsequently read back out from memory 1250 as the transient backpressure condition clears.

QoS and Weighted Round Robin Processing

Figure 9:
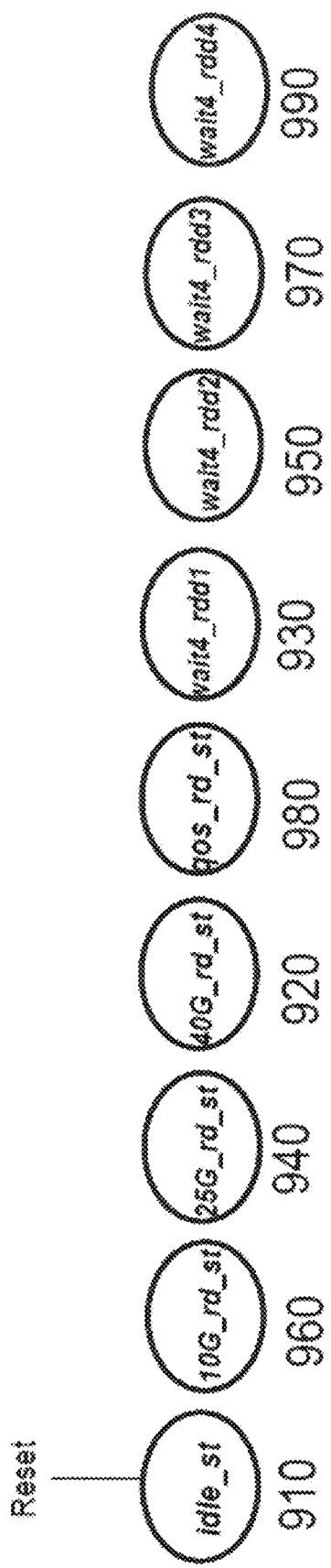
FIG. 9 shows exemplary processing module states associated with Quality of Service (QoS) processing of one or more software flow modules constituting an HSS according to an embodiment of the present disclosure.
Figure 9A:
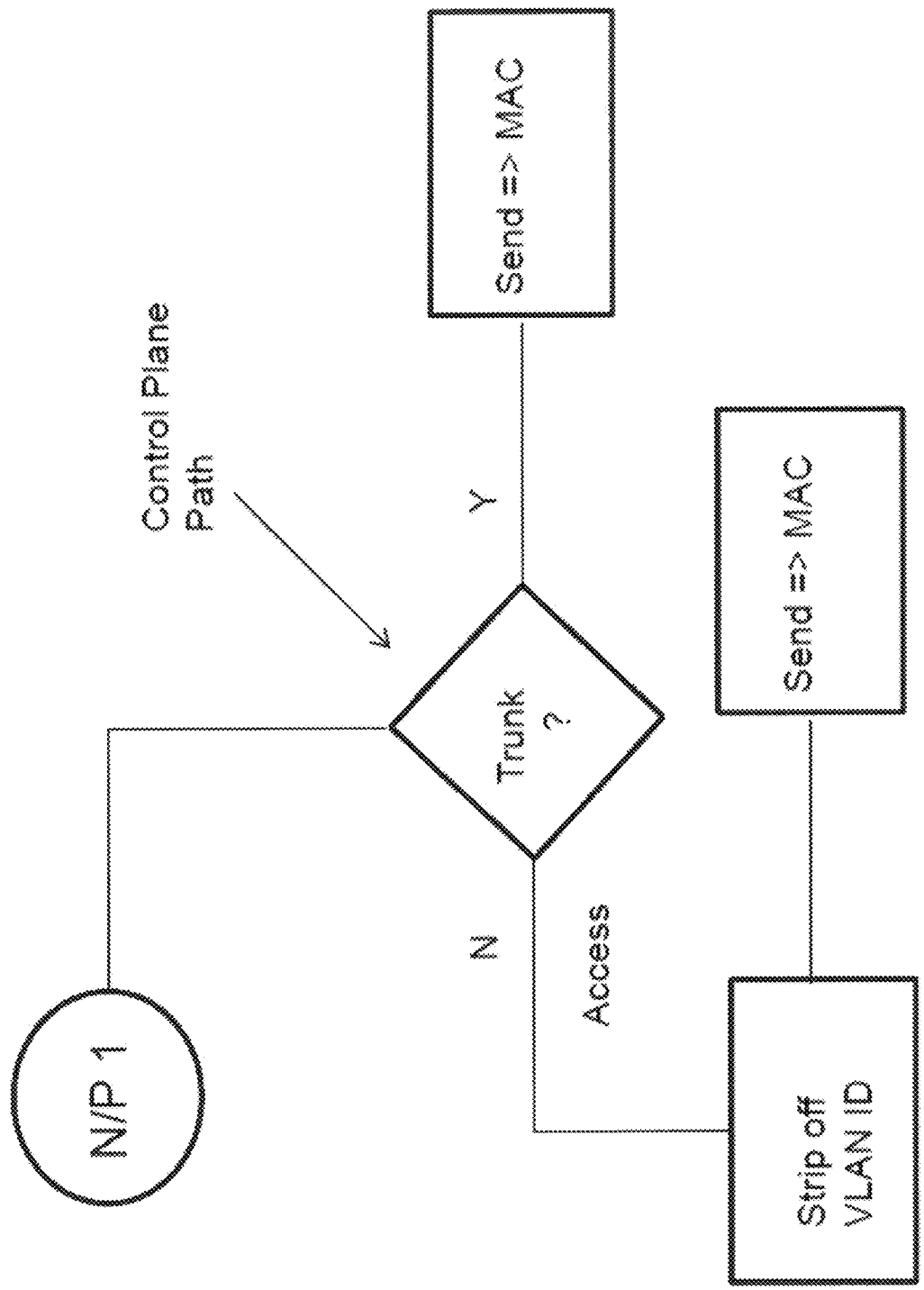
FIGS. 9A and 9B illustrate various processing flows associated with VLAN processing.
Figure 9B:
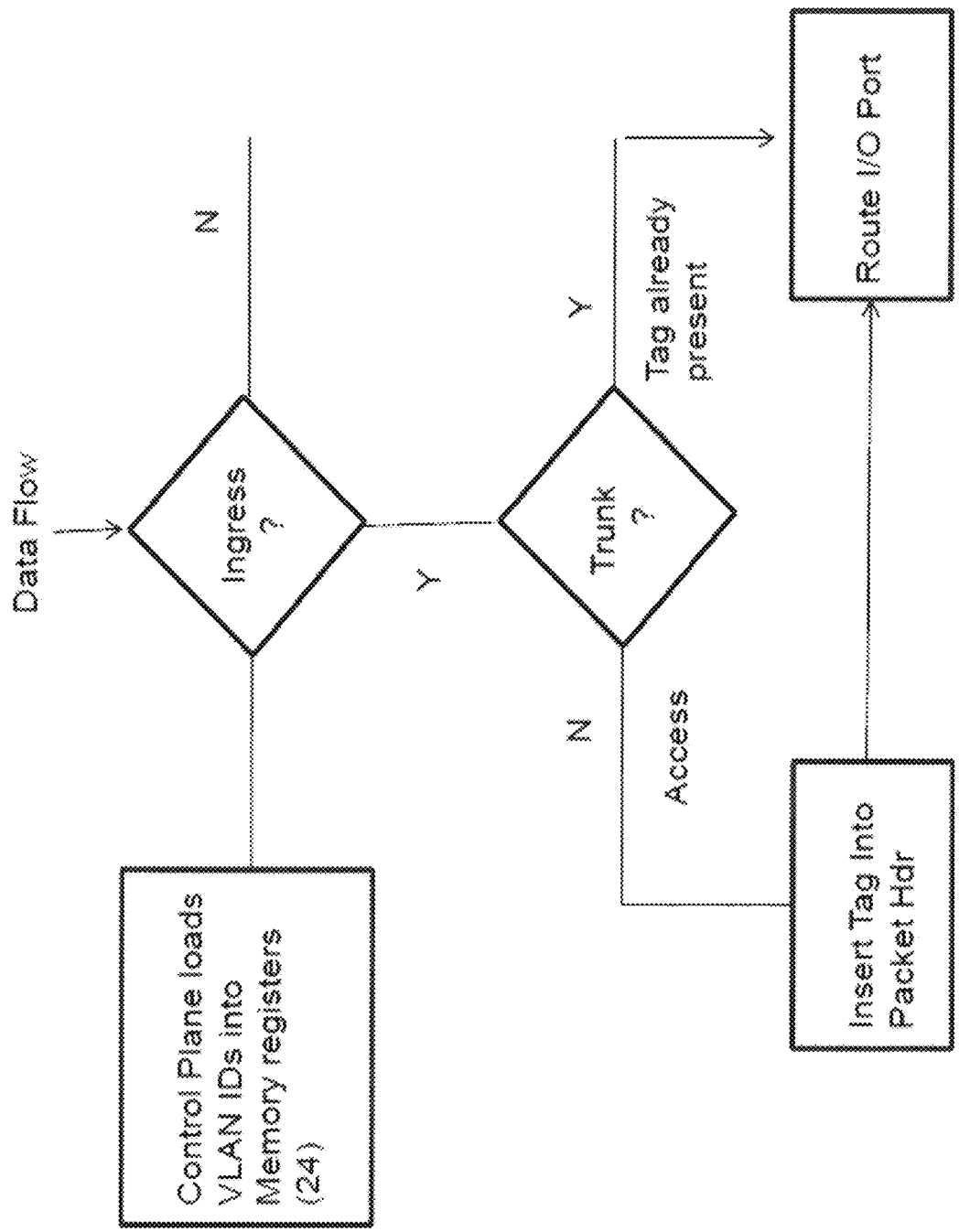

FIG. 9 shows exemplary processing module states associated with Quality of Service (QoS) processing of one or more software flow modules constituting an HSS according to an embodiment of the present disclosure. The QoS processing module serves the VLAN packet based on priority given in priority bits compared to normal packets. In a preferred embodiment, a weighted round robin scheduling process may be implemented wherein weights are allocated to each port. In one embodiment, a SFM weight designation may be configured with allocations as follows: (a) 10G—1; (b) 25G—1; and (c) 40G—4. In such an embodiment, in each round, one 10G packet, one 25G packet and four 40G packets are sent out to the MAC.

Referring to FIG. 9, each of the processing states is described as follows. The state idle_st (block 910) is the default state and is triggered by a signal (t_ready) signal from a 10G MAC. Once the signal t_ready is received the process will check for 10G, 40G, and 25G VLAN packets. If received they will be served first. If not received, processing will check for normal packets. That is, if the packet count of the variable 10G_qos_pkt_count_i or 25G_qos_pkt_count_i or 40G_qos_pkt_count_i are greater than 0, then the next state of FSM will be qos_rd_st (block 980). Otherwise, if the packets available are 40G_pkt_count_i then the next state of the FSM is transitioned to 40G_rd_st (block 920); if packets available are 25G_pkt_count_i then the next state of the FSM is 25G_rd_st (block 940); and if packets available are 10G_pkt_count_i then the next state of the FSM is 10G_rd_st (block 960).

The state 40G_rd_st (block 920) triggers read operation from 40G BRAM, and the next state of FSM is progressed to wait4_rddone1_st (block 930).

The wait4_rddone1_st state (block 930) waits for the read done signal from the read address generator and checks for any VLAN packets available. If not available, the process checks if all specified number of 40G packets are sent or not. If sent, the process then switches to 10G/25G packets if respective packets are available. If not available the process checks if 40G packets are available. If not, the process transitions to (block 910) idle_st state.

The 25G_rd_st state (block 940) triggers read operation from 25G BRAM, and the next state of the FSM is progressed to wait4 rddone2 st (block 950).

The wait4 rddone2 st state (block 930) waits for the read done signal from the read address generator module and then checks if any VLAN packets are available. If not available, the process checks if all specified number of 25G packets are sent or not. If sent, the process then switches to 40G/10G packets if respective packets are available. If not available, the process checks if 25G packets are available. If not, the process transitions to (block 910) idle_st state.

The 10G_rd_st state (block 960) triggers read operation from 10G BRAM, and the next state of the FSM is progressed to wait4 rddone3 st (block 970).

The wait4_rddone3_st state (block 970) waits for the read done signal from the read address generator and then checks if any VLAN packets are available. If not available, the process checks if all specific number of 10G packets are sent or not. If sent, the process then switches to 25G/40G packets if respective packets are available. If not available, the process checks if 10G packets are available. If not, the process transitions to (block 910) idle_st state.

The qos_rd_st state (block 980) triggers the read operation of VLAN Packets, and the next state of the FSM is progressed to wait4 rddone4_st (block 990).

The wait4 rddone4 st state (block 990) waits for the read done signal from the read address generator and then checks if any VLAN packets are available. If available, then processing will transition to qos_rd_st (block 980). If not, it checks for the specific number of 40G packets if available and then the next state is 40G_rd_st (block 920). If not available, then it will check for the specific number of 25G packets, if available and then the next state transitions to 25G_rd_st (block 940). If not available, then it will check for the specific number of 10G packets if available and then the next state transition is to 10G_rd_st (block 960). If no packets are available, the process transitions to (block 910) idle_st state.

Thus, there is disclosed a non-Clos data network switching apparatus for communicating data packets from a first switch-connected peripheral device, to a second switch-connected peripheral device, the apparatus comprising a chassis; a plurality of line cards housed within the chassis and having I/O ports for transceiving data packets; a control processor configured to maintain a lookup table mapping peripheral device connections with corresponding I/O ports associated with the plurality of line cards, a crossbar switching element on each line card, the crossbar switching element configured to enable electrical connection of any one of the line card I/O ports through direct point-to-point electrical mesh interconnect pattern which connects each of the plurality of line cards with every other one of the line cards, to a corresponding destination port on one of the plurality of line access cards, in response to detection of a data packet on an ingress I/O port of a given line card, and according to the lookup table mapping based on an address header of the data packet, whereby transmission of packets between input and output ports of any two line cards and respective cross bar switch elements occurs in only two hops.

The embodiments are provided by way of example only, and other embodiments for implementing the systems and methods described herein may be contemplated by one of skill in the pertinent art without departing from the intended scope of this disclosure. For example, although embodiments disclose a data packet network architecture, apparatus, device, and/or method that implements the semiconductor crossbar switch element onto or associated with a given line card, such configuration is not essential to the practice of the disclosure, as such switch elements may be implemented in or onto other substrates, such as a backplane (or midplane), by way of non-limiting example. Further, although embodiments of the present disclosure illustrate a printed circuit electrical mesh interconnect, and connected in an interleaved backplane structure (relative to the line card/switch element configuration) such configuration is an advantageous embodiment but is not essential to the practice of the disclosure, as such electrical mesh interconnect may be implemented via other means, such as direct wire connection with no backplane or printed circuit board), and/or via other non-backplane structure (e.g. on a line card). In an embodiment, discrete wires such as micro coaxial or twinaxial cables, twisted pairs, or other direct electrical wire connections may be made with the internal I/O ports of each of the FPGAs through connectors and micro wire cables such as those provided for high speed interconnects. Modification may be made for pigtails for cable ready applications.

Still further, implementation of the present disclosure may be made to virtual switches within a data center or other segmented software-controlled data packet switching circuit. In such virtual data packet switched systems, the form of a plurality of semiconductor crossbar switch elements interconnected via a direct point-to-point electrical mesh interconnect with integrated switching, forwarding and routing functionality embedded into each crossbar switch, may be substituted for the prior art (e.g. Clos network) implementations, in order to reduce hops, decrease power dissipation and usage, and enable execution on a high performance computer server to provide for virtual segmentation, securitization, and reconfiguration. The semiconductor crossbar switch elements may be configured as virtual switches within a virtual machine (VM) for providing routing using MAC address header and lookup table mapping of configuration elements. As overlay network clients or VMs, require gateways to provide routing functionality, the present disclosure enables OSI layer 2 or layer 3 switching for redirecting data message traffic, using the destination Media Access Control (MAC) address and logical sublayers to establish initial connection, parse the output data into data frames, and address receipt acknowledgments and/or queue processing when data arrives successfully or alternatively, processing is denied.

In a further example, switch elements implemented as an optical switch mesh faric such as a ROADM with Liquid Crystal on Silicon (LCoS) implementation may be configured as another alternative embodiment according to an aspect of the present disclosure.

By way of further example, processing systems described herein may include memory containing data, which may include instructions, the instructions when executed by a processor or multiple processors, cause the steps of a method for performing the operations set forth herein.

OpenFlow Processing within HSS

Further still, the present disclosure provides an example of an OpenFlow processing incorporated within the I/O SFM module of FIG. 5B on the ingress side as an alternative to the data packet processing on the I/O SFM ingress side in FIG. 5, to thereby provide channel instructions (e.g. formal instructions and actions) from the motherboard onto each of the chips (ASICs or FPGAs).

According to another embodiment of the disclosure, the I/O SFM may be further configured to be operable with OpenFlow communications protocols, which enable remote control of the forwarding plane of network switches and routers such that the network devices can be programmed remotely. FIG. 14A shows an example of an I/O SFM module integrated within such a system. On the ingress side, as an alternative to the data packet processing on the I/O SFM ingress side in FIG. 5, channel instructions (e.g. formal instructions and actions) are provided and received from an external agent (e.g. OpenFlow controller) typically running on a server onto each of the chips (e.g. ASICs or FPGAs).

Using the OpenFlow protocol, the system according to an embodiment of the present disclosure provides for the internal computer processing system (control plane) to send flow tables received via the network to the SFMs (e.g. one by one or collectively), which carry packet header fields to match and instructions to execute dependent upon matching and actions to perform on the packet. Such actions include packet forward, packet drop, or modify packet header fields. In an exemplary embodiment, the HSS switch can be governed entirely by an external SDN Controller on a port-by-port basis via the OpenFlow protocol. The switch supports the OpenFlow methodology, such as, OpenFlow 1.5.1 with one flow table per port. The OpenFlow functionality provides the data center LAN the capability of routing packets under control of an external OpenFlow controller agent and implement layer-3 routing as well, rather than relying on the built-in automatic LAN learning feature inherent in layer-2 (L2) switches, in effect providing an L2 and L3 software programmability feature to route packets.

The OpenFlow protocol embodiment within the HSS system defines the OFM (OpenFlow Module), PHI (Packet Header Insertion), and PHE (Packet Header Extraction) modules, which extract packet header fields, perform flow entry matching (e.g., via a lookup table), and ultimately modify the data packet depending on the matching flow entry actions configured. The OFM implements the Open Flow (OF) Flow table, processes N (e.g. N=6) MAC output packet headers successively in TDM fashion and at line rate via a single logic block, and performs packet header field lookups such as the hash LUT. Such a system provides multi-tasking of the hardware on a temporal demand basis, thereby reducing hardware requirements while still maintaining "separate" hardware networks achievable via virtualization.

Figure 14:
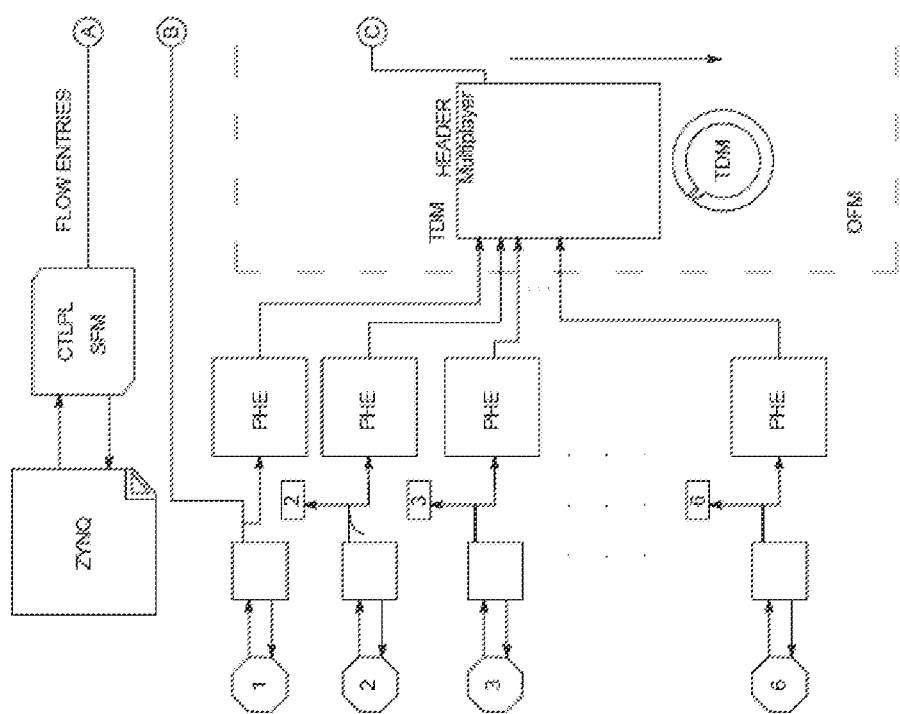
Figure 14:
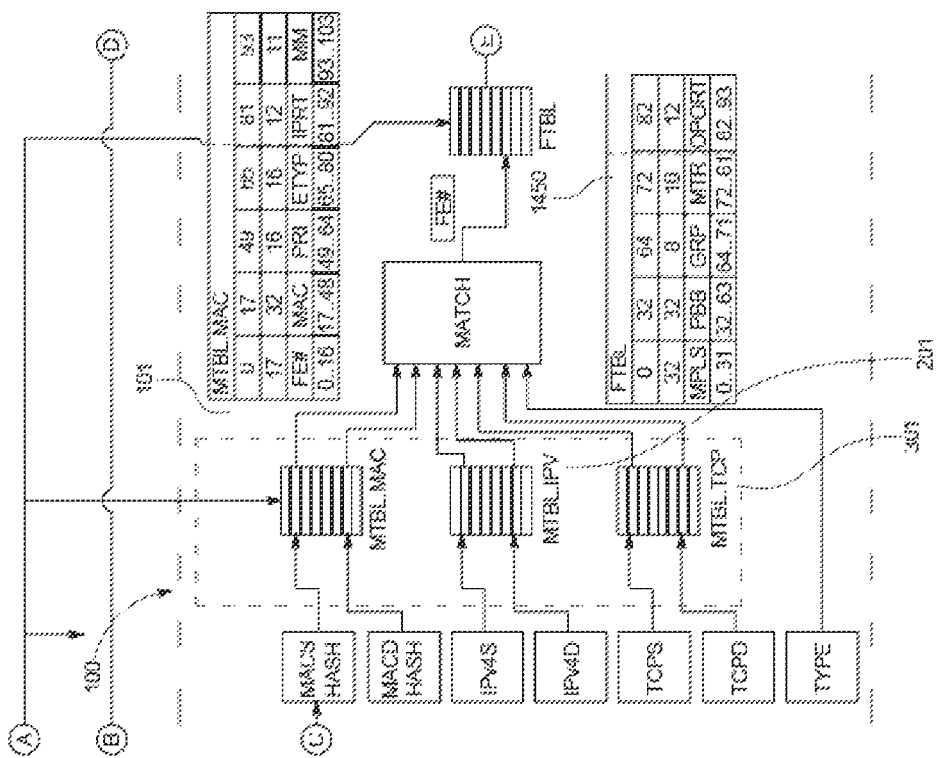
Figure 14A:
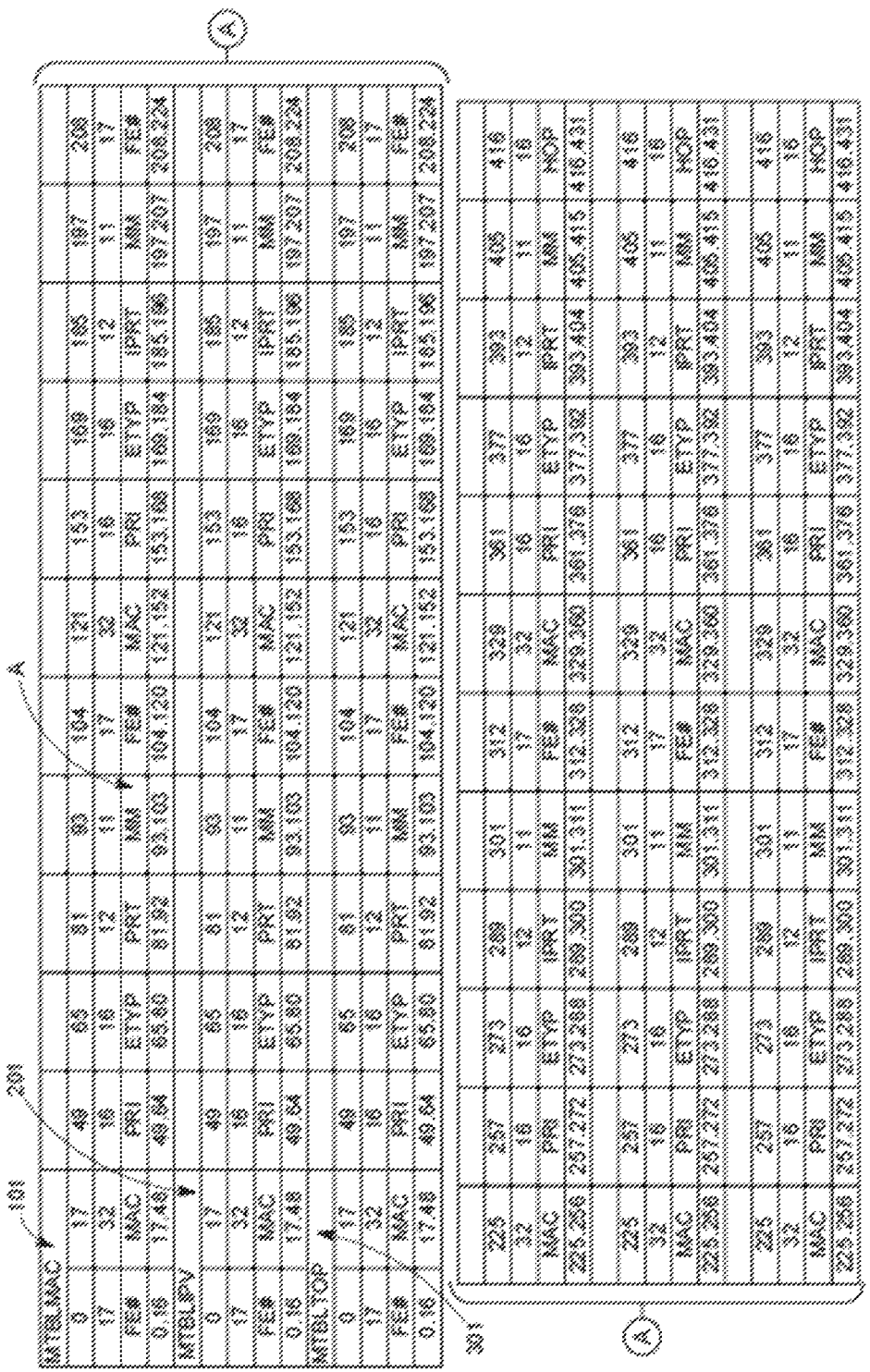

As shown in FIG. 14, the OFM module is positioned between the multiple Ethernet MAC front-end interfaces and the corresponding multiple SFM ingress RAM modules. The control plane processor (e.g. Zynq processor) blasts the flow entries into the OFM like HLUT tables.

Each OFM includes three match tables (MTBL) identified as 1) MAC MTBL, 2) IPv4 MTBL, and 3) TCP MTBL, with formats as shown in FIG. 14A. RAM memory blocks (e.g. lightweight memory blocks such as URAM or BRAM) may be used to implement the flow tables according to embodiments of the disclosure.

The TDM device shown in FIG. 14 operates to rotate through N (e.g. N=6) independent extracted packet headers successively to the MTBL, simultaneously for both source and destination addresses.

In an exemplary embodiment, there are four flow entries per row in the MTBL. Embodiments of the disclosure contemplate implementation of only a single flow table or multiple flow tables, according to system requirements. Referring to FIG. 14A, the OFM module hashes MAC addresses, with the MM field A standing for match/mask.

The three MTBL tables 101, 201, and 301 of FIG. 14A are loaded via the control plane microprocessor independently (e.g. xA0, xA1, xA2). The HSS message format illustrated in FIG. 14B. A single write command updates the OFM MTBL tables concurrently, with RAM updates implemented as block-memory writes with variable offset and block length. In an exemplary embodiment, table write times are of the order of 11 msec (3 Gbps). Flow entry fields include the following:
(FE #)—flow entry number (16 bits);
(MAC)—MAC address (either source or destination—32 bits);
(PRI)—Priority of the flow entry;
(ETYP)—Ethernet type field for matching (16 bits);
(IPRT)—input port for matching (12 bits);
(MM)—match fields/IPv4 mask (11 bits);
(HOP)—16 bits.

The required match fields are shown in FIG. 14C for OpenFlow version v1.5.1. The architecture of the present disclosure utilizes all 3 MTBLs concurrently. If a match is detected, then the FE # is forwarded to the FTBL (FIG. 14). When there are multiple flow entry matches, the highest priority is selected and the corresponding FE # indexes into the FTBL.

FIG. 14D shows an enlarged view of an exemplary flow table flow entry (FTBL) illustrated in FIG. 14. The flow entry number is implicit with the address in memory. The OPORT represents the output port to forward to, with the IA field representing the instruction/action bits.

Figure 14F:
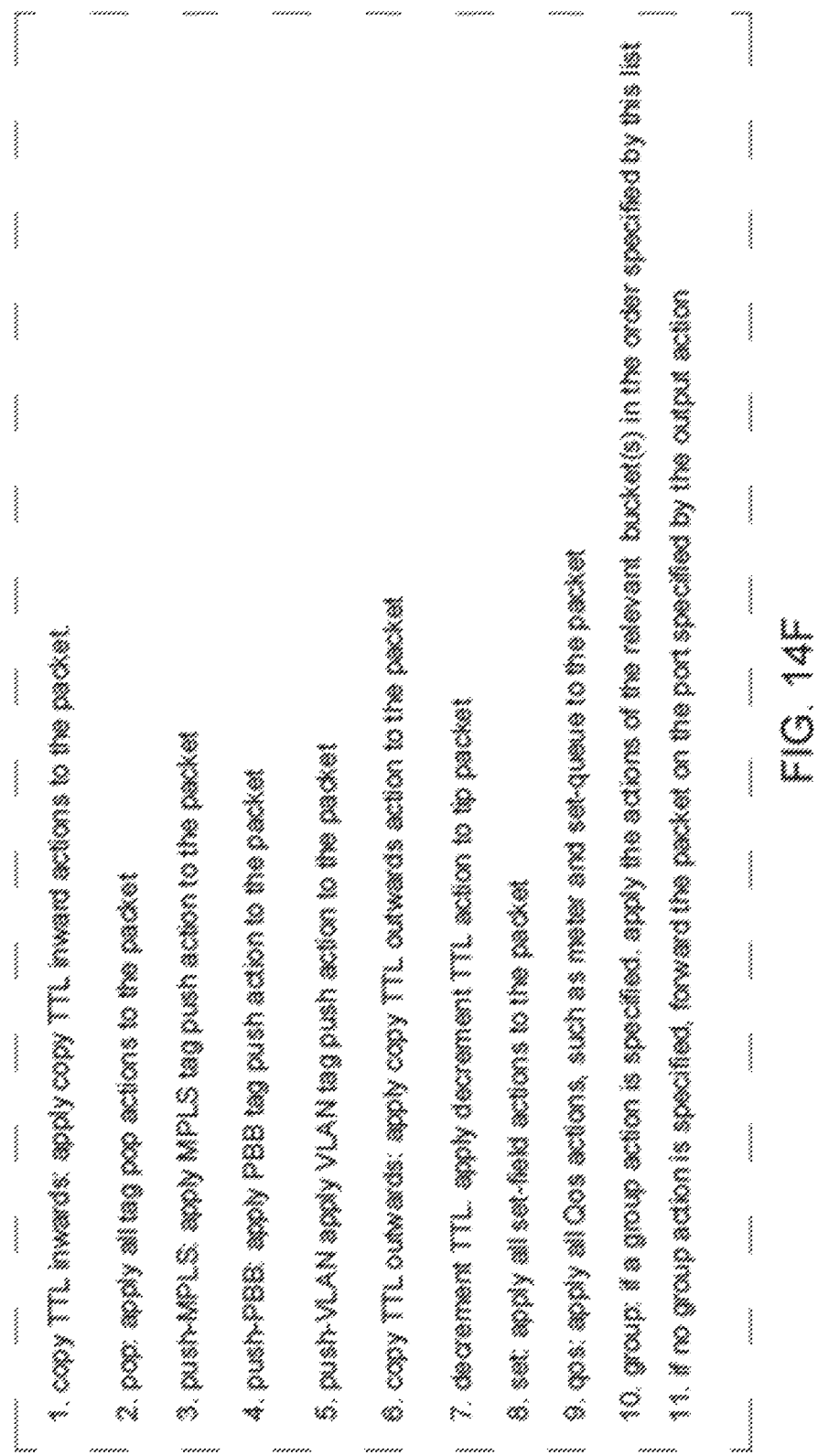

FIG. 14D shows an exemplary view of a message format for flow entry implementation whereby the control plane writes the FTBL 1450. Entries are block-addressable anywhere within the memory (e.g. URAM or BRAM) and may be of variable block size. A flow entry counter is incremented each time a match occurs for that flow entry, with the control plane operative to read and write the counter field value via the URAM B port. As is understood, OpenFlow instructions act upon the actions in the flow entry by either invoking the actions or updating the actions. Select actions are illustrated in FIG. 14F.

The OFM operations further perform metering according to embodiments of the present disclosure. With a meter placed on a flow entry and the occurrence of a match, the OFM compares the flow entry counter, timestamp, HSS real-time counter, and meter value in FTBL, and if there is a level trip, the OFM forwards a "drop" action to the PHI, zeroes the flow entry counter and updates the timestamp. Otherwise, the counter is incremented and processing continues.

Figure 14G:
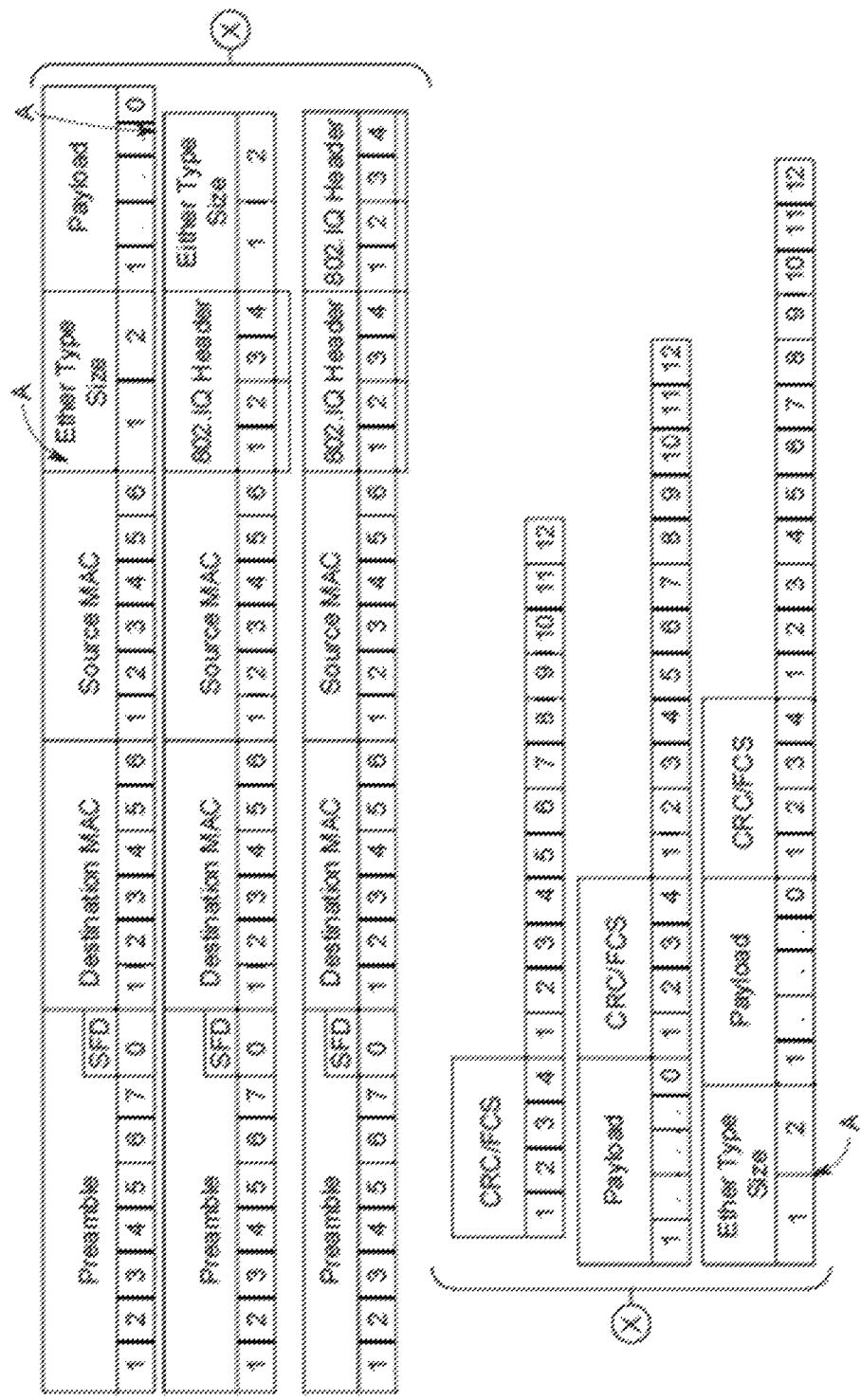

The PHE module buffers packets and extracts packet header fields from the various data flows (e.g. 32, 64, 128, or 512 bit data flows) dependent on the I/O MAC type, and forwards those parallel to the OFM for matching. The PHE operates to determine the base Ethertype field, which follows one or more tags (e.g. 32 bit tags), from external LAN devices. FIG. 14G illustrates an exemplary double tagged Ethernet frame with Ethertype field(s) A for reference purposes.

Figure 14H:
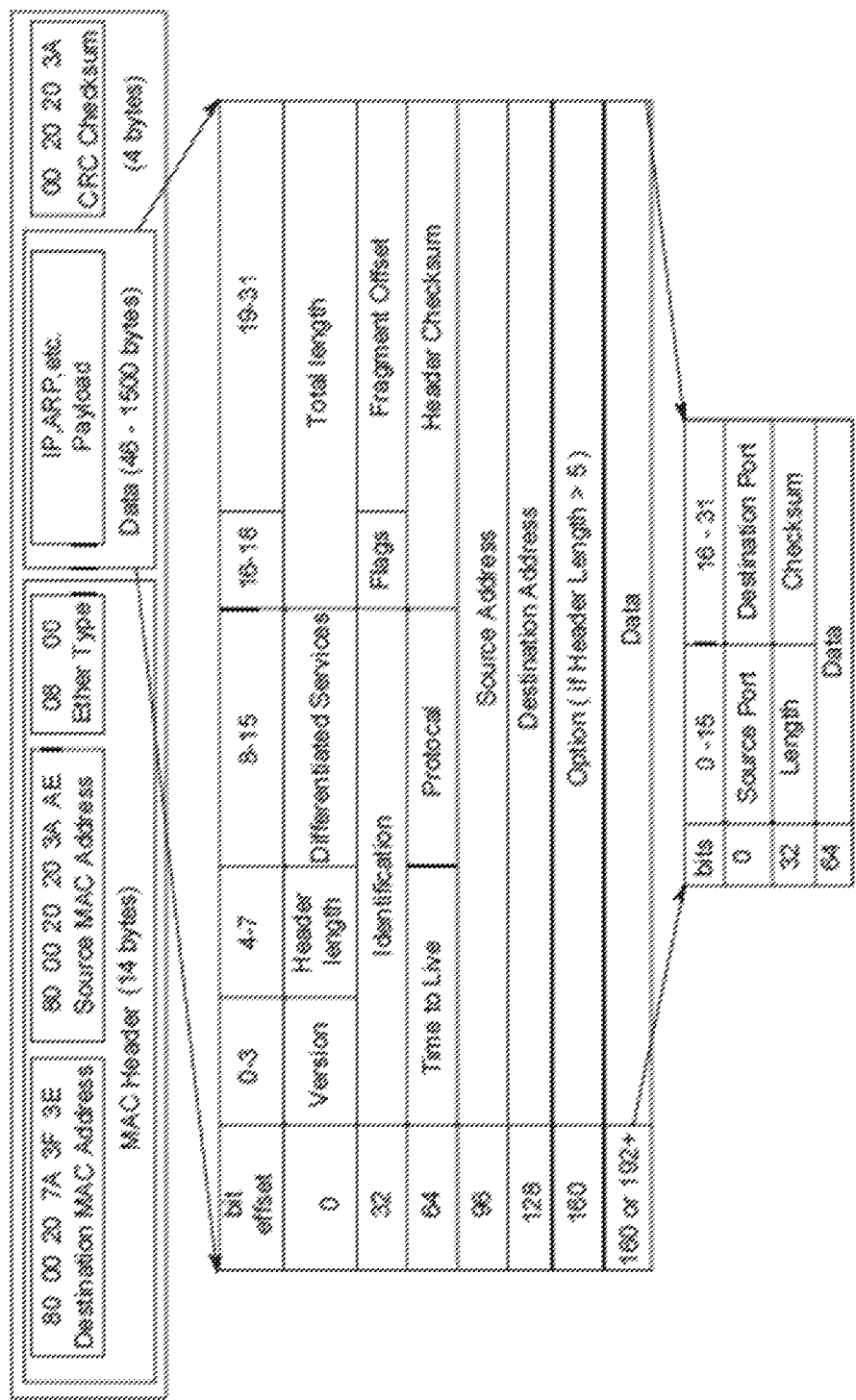
Figure 16:
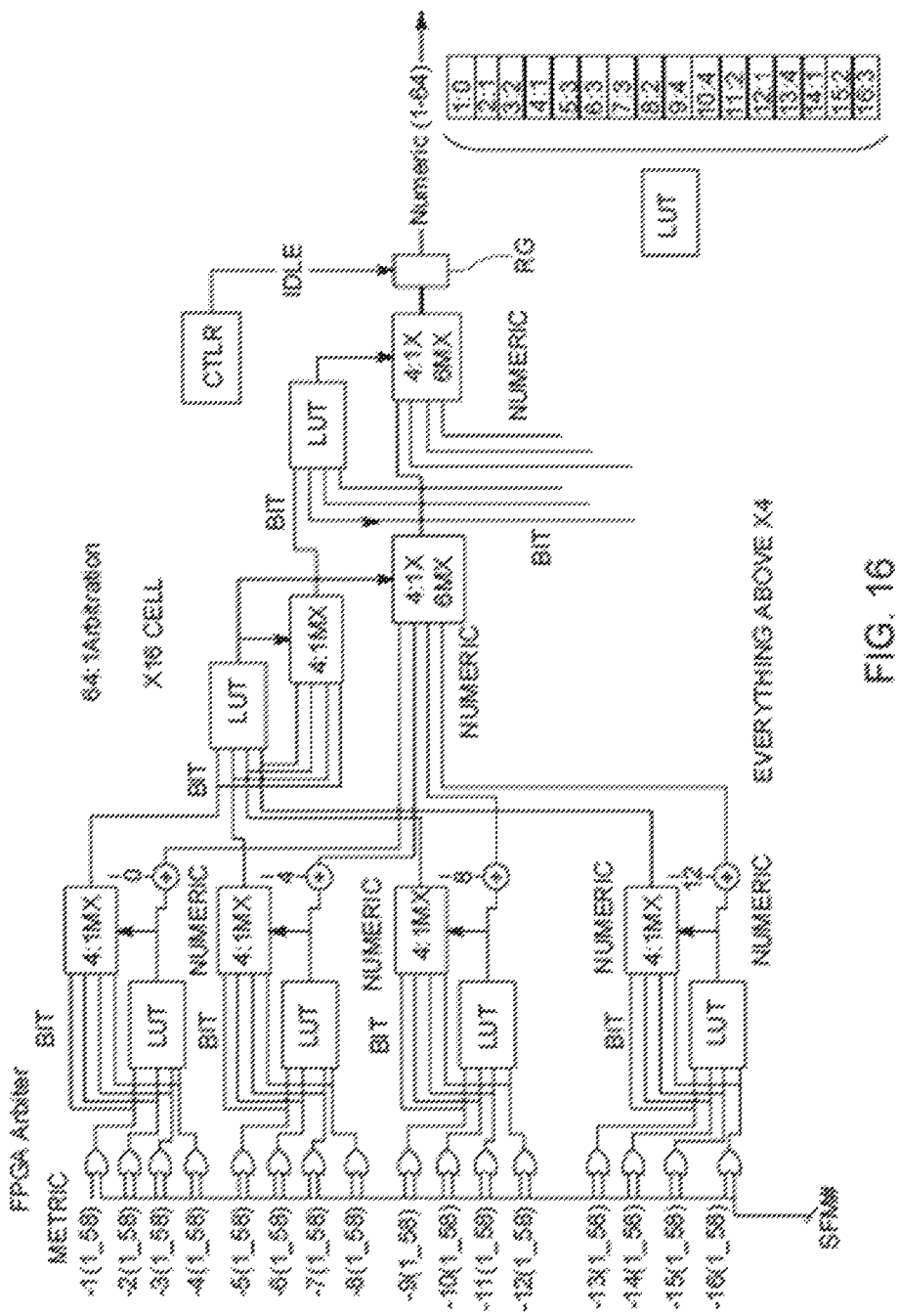
FIG. 16 is a schematic diagram illustrating components of an FPGA arbiter or arbitration sequence within an FPGA architecture for controlling network data packet transfer according to an embodiment of the disclosure.

Upon locating the Ethertype, processing continues whereby the other packet header field locations are well-defined offsets, such that the PHE module forwards the insertion points to the PHI module. FIG. 14H provides a more detailed view of the data field bits for Ethernet/IPv4/TCP encapsulation. The PHI operates to drop or forward packets untouched and inserts fields or modifies fields in the packet header responsive to the Action bits returned by the OFM along with the location pointers forwarded by the PHE. Insertable fields include MPLS and VLAN tags, and TTL into the various data flows (e.g. either 32, 64, 128, or 412 bit data flows) depending on the I/O SFM type. The TTL field is decremented as well. The output of the PHI is provided to the ingress RAM, and processing proceeds as in the HSS packet flow processing shown in FIG. 5B.

In an exemplary embodiment, packet header insertion or modification is simplified by means of a distributed RAM of a relatively small (e.g. 2 packet) depth and 16 bit width that implements a lightweight VHDL design. In an embodiment, the 16 bit cylinder width RAM resolves technical problems relating to wrap around cases and repositioning of cylinder outputs to accomplish field insertion. In an embodiment, each cylinder has independent read control for providing the timing of firing operation, with 32, 64, 128, and 512 bit data flows, thereby leading to 2, 4, 8, and 32 cylinders, respectively.

FIG. 14I illustrates an exemplary 32 bit data flow (10G SFP+) two cylinder implementation showing two scenarios associated with tag insertion from original packet data. In the first scenario, cylinder firing or activation after tag insertion delays the packet by a single cycle after cycle-5 (1400). The second scenario illustrates a tag 1420 and MPLS label 1430 insertion, with the second cylinder inserting a single cycle delay after cycle-5 and cycle-6 to accommodate tag and MPLS insertion. Subsequently, the two cylinders will be out of step by one cycle (1430) upon playback.

Figure 14J:
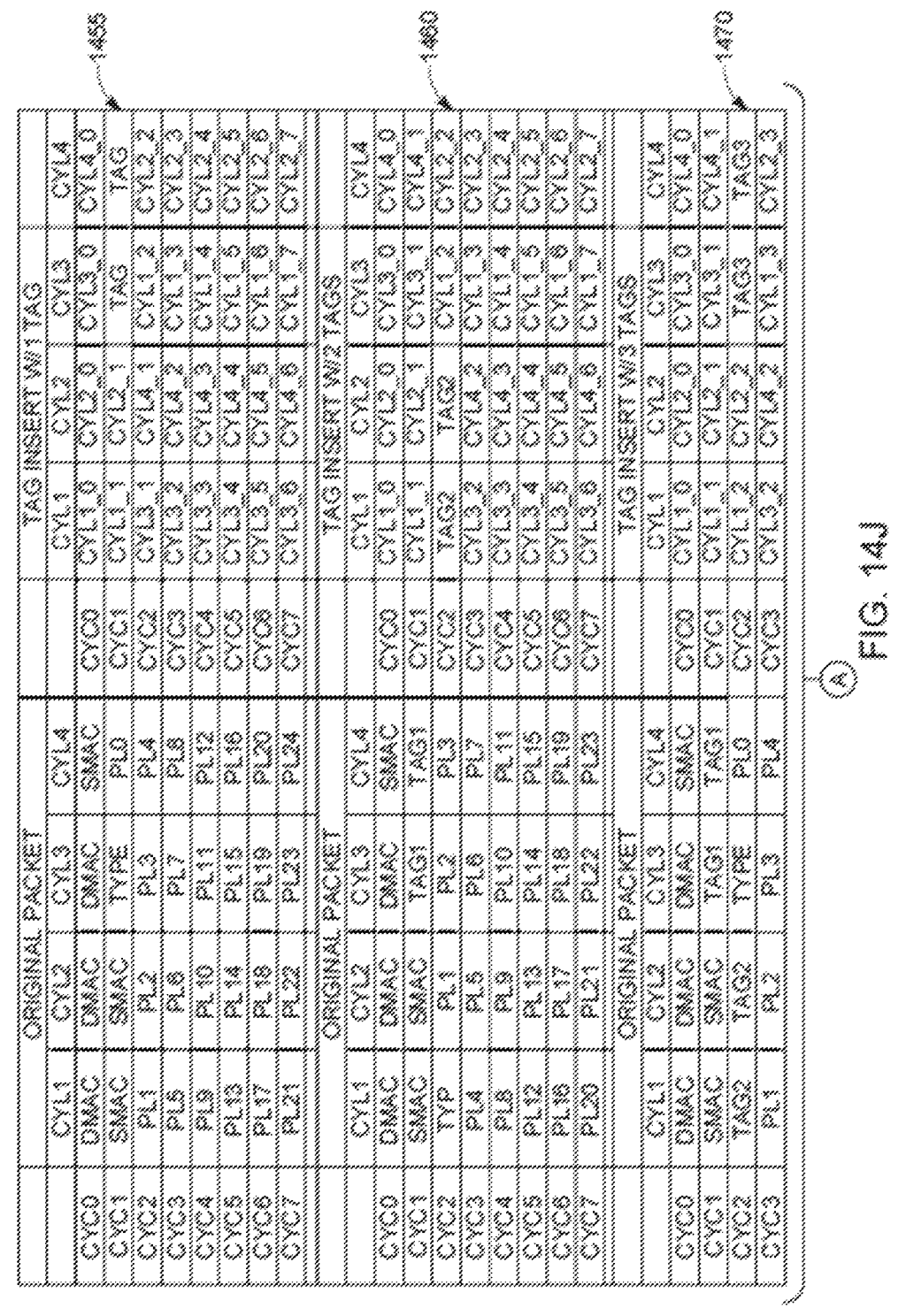
Figure 14J:
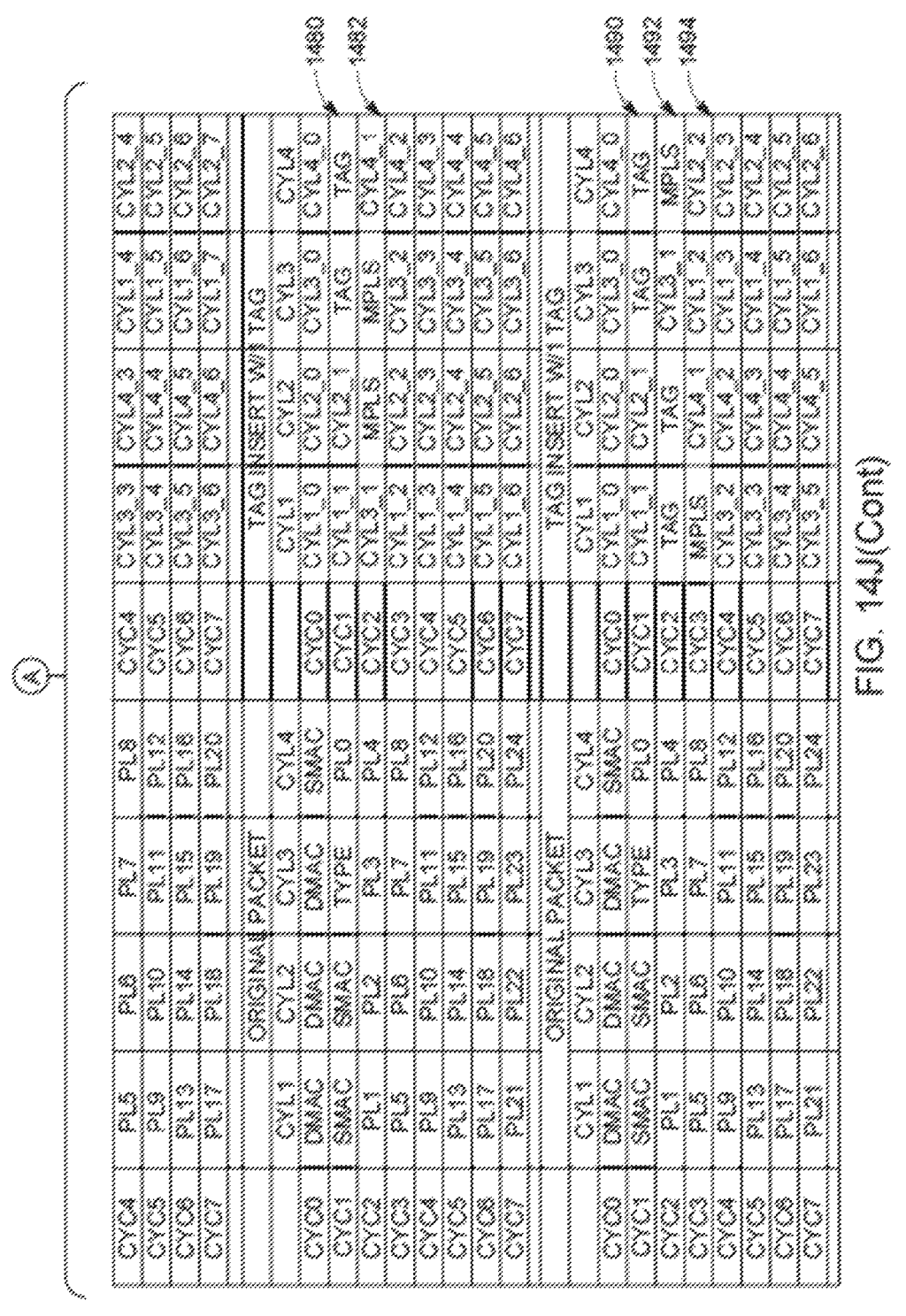

FIG. 14J illustrates a 64 bit data flow (25G SFP+) with insertion scenarios wherein tag and/or MPLS insertion indicates each cylinder output is constrained to appear in only two locations (1455, 1460, 1470, 1480, 1482, 1490, 1492, 1494), thereby simplifying the multiplexing process and enhancing data processing operations and throughput. In similar fashion, a 128 bit (40G SFP+) insertion scenario illustrated in FIG. 14K constrains each cylinder output to appear in only four places and likewise simplifying output multiplexing.

In addition, the system further implements a group table OF feature which replicates packets for purposes of broadcasting packets for sending to all ports on the device. In addition to broadcasting, additional requirements of the group table processing adhere to the requirements of the Open Flow protocol being implemented (e.g. OF v1.5.1).

As shown in FIG. 15, the system further implements counters readable via the control plane processor and multiplexed along with base telemetry, according to the particular read command instruction invoked, with processing occurring in pipelined fashion to address timing closure.

For port type configurations associated with a Controller port within the OpenFlow protocol, a control plane message is defined that sets one of the HSS ports to this designation. When a given port is set to a Controller port, all packets entering on this port are forwarded to the control plane and ultimately reach the motherboard for handling by the BSOS software, which forwards the packets to OVS via the puncture interface. For output processing, data packets extracted from OVS via an OF controller (e.g. OpenDaylight, BSOS, etc.) directs those packets to the control plane destined for an I/O SFM and output (i.e. egress) from the switch, as per the normal routing process described herein.

As shown herein above, a packet entering the OpenFlow HSS, the front-end design implements a time-division multiple access (TDMA) scheme sharing the Flow Table distillation resources (MTBL=Match Table, FTBL=Flow Table) across N number of I/O SFM, since the logic processing involved with the OpenFlow matching operation is heavy and can become unrealizable in ASIC technology without such efficient utilization of resources.

In embodiments, a Control plane software OVSDB Reformatter may be a Linux C program that integrates into the system's BSOS NOS and OpenVswitch. The program interacts with the OVSDB database periodically and sends the Flow Table—Flow Entries down in a reformatted fashion to the HSS OFM units. The reformatting enables use of a lightweight, VHDL-friendly URAM replica of the Flow Table.

As described herein, the system and architecture of the present disclosure provides for a system having reduced hops, wherein a "hop" represents a single ingress or egress routing digital path within a node (e.g. ASIC or FPGA) found in a system of such nodes, and correspondingly a station that performs switching work done as packets traverse through the switch. The system and architecture of the present disclosure contains networking logic and high-performance gigabit analog I/O blocks instantiated around the chip, consisting of a transceiver, Serializer/Deserializer (SERDES) circuit, and MAC.

The system of the present disclosure minimizes the number of hops through a network of semiconductor devices which suffer from dissipating power (work) through resistance and loss of throughput speed crossing through the semiconductor. Correspondingly, the semiconductor Transceiver, SERDES, and MAC blocks consume between 40-50% of the total power in a switching device, shuttling packets in and out. In effect, the transceiving of data packets is wasted work and penalizing to power and latency performance, and the meaningful work is in the routing and switching logic.

The wasted work relates to the transceiving of data packets presenting a dominant power load in a switch and source of delay without providing meaningful packet work such as Buffering, Routing, VLAN switching, Quality of Service, and other L2 and L3 switching services. Accordingly, the network topology of the present disclosure reduces the number of SERDES a data packet encounters passing through the switching network according to embodiments disclosed herein, and produce significantly reduced power and latency, whether a networking switch product or a data center LAN.

As described herein, the mesh network according to an embodiment of the present disclosure (e.g. also applicable in embodiments in FIG. 5, 5A, 5B) in FIG. 1C illustrates a mesh network where each node has direct connections to every other node. A node in this case is a semiconductor switching element such as an ASIC, FPGA, or SoC. In exemplary embodiments as shown and described herein, for the switch there are 32 (10/25G line cards) or 48 nodes (40/100G line cards) depending on the line card type.

FIG. 5B shows an embodiment of Hyperscale Switch Slice (HSS) Chip (SoC) wherein the key elements or atomic building blocks of the HSS is the Switch Flow Module (SFM), with up to 72 of these positioned around the chip. In an embodiment, three types of SFMs—I/O SFM, direct connect or PSP SFM, and Broadcast SFM are provided. The I/O SFM is broken down further into four subtypes—10, 25, 40 and 100G SFM. The I/O SFM subtypes are alike other than the data bus width, which is wider for the faster speeds and the number of cycles per frame in which to perform the routing lookups.

The set of I/O SFM 26 for the 10G line card are grouped into four segments, with each segment a "Hyper Cylinder." A Hyper Cylinder fires independently and improves congestion performance. The Hyper Cylinder smooths congestion, resolving a scenario mitigating 24 I/O SFMs competing for a PSP SFM connection, whereby only eight vie. With only eight SFMs contending, the chances of completing a call connection on the initial try are significantly increased. Correspondingly, the Hyper Cylinder design allows the HSS switch engine to run more efficiently, limiting misfires and streamlining latency performance. The PSP SFM packet transfer system also employs the same approach with just two cylinders for example, rather than four, which is beneficial considering the speed of that interface and the capability to transmit packets along the pathway.

Figure 17:
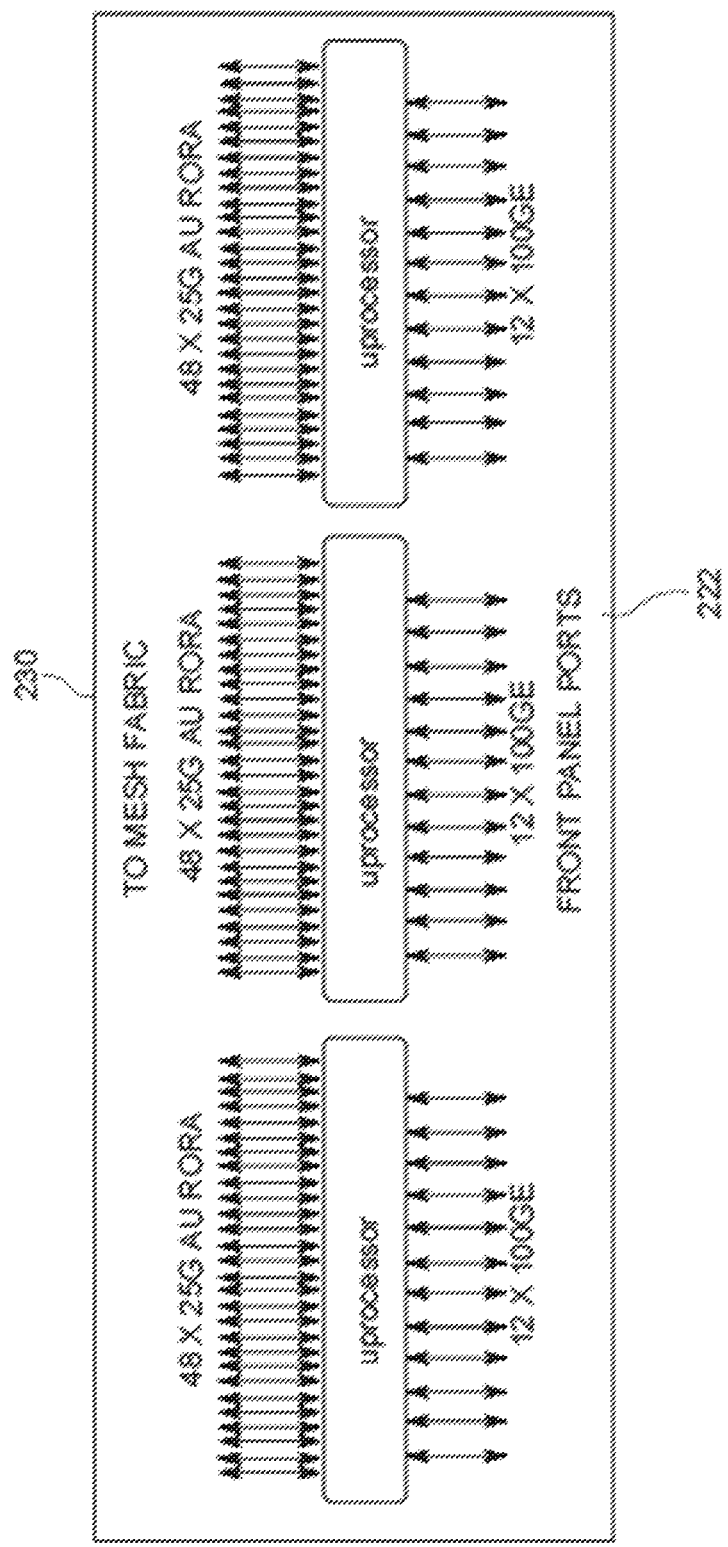
FIG. 17 is a schematic illustration of the HSS data packet communications input/output from the perspective of an integrated circuit chip according to an embodiment of the present disclosure.

In an embodiment, the overall HSS from an ASIC perspective is shown below in FIG. 17. The line card of the present system architecture contains two HSS for the 10G Line card and three for the other line card types—25/40/100G. The figure represents the 100G type. The fabric interface consists of 48 lines running at 25G for a total bandwidth of 1,200 Gbps per HSS. That bandwidth is sufficient to handle the I/O tributaries and commensurate with the I/O ports bandwidth of conventional switches. Moreover, the design supports 56G PAM4 fabric which provides an 2,688 Gbps fabric interface.

Referring now to the HSS architecture which is constituted by the SFM modules and their component architectures reflecting in FIGS. 5, 5A, and 5B, and as best shown in the embodiment of FIG. 5B, each SFM breaks down into two sections: ingress and egress. The packet enters an SFM from an I/O port and flows through the I/O SFM (501) Ingress section, Crossbar, and subsequently the PSP SFM (601) Egress section and eventually out onto the mesh network or direct connect fabric or backplane (230). This path represents an overall ingress flow from an HSS perspective. Following the Ingress stage, the packet enters via the mesh network or direct connect fabric and flows through to a PSP SFM ingress, Crossbar, I/O SFM Egress, and output to the I/O port for further handling by a server or aggregation switch. This path represents an overall egress flow from an HSS perspective. Finally, each packet ultimately propagates through a single Ingress and Egress stage in the case of the Mesh 230, in contrast to propagation through a Clos network architecture, which travels through at least two such stages.

Upon entry into the SFM via the Transceiver, SERDES, and MAC, the packet encounters the VLAN/OpenFlow (OF) section (520) of the ingress, and routing policies are invoked either according to VLAN settings from the Control Plane or OpenFlow (OF) Flow Tables loaded likewise. In the normal flow of L2 switch operation, OF processing is bypassed, and the "Hyper Cylinder" Congestion Reducer packet MAC Destination Address gets hashed and input to the Hash LUT, which provides the destination I/O port number. The destination port gets prepended to the packet, and that ultimately tells the destination HSS which port to output the packet. Each Egress section of the SFM, whether PSP or I/O Egress section, incorporates QoS logic and governs the priority of packets waiting in line. What that means is that QoS occurs two times on the way from input to output from HSS1 to HSS2. That ensures packets with higher priority will avoid getting delayed, having to wait anywhere along the path internal to the switch.

Furthermore, the switch according to embodiments of the present disclosure supports OpenFlow 1.5.1.

Broadcast SFM Processing

Broadcast SFM module is similar to I/O SFM architecture except that there is no VLAN, OpenFlow or routing/lookup table, but includes a replication engine which serves to replicate the packet for every PSP SFM and for every I/O SFM via a dedicated PSP SFM identified as a loopback SFM on each HSS, in order to broadcast a packet out onto each of the N (e.g. N=832) switch ports. FIG. 5B shows the broadcast SFM (BC) for implementation on a given HSS. In operation, when an I/O SFM (e.g. SFP SFM 1 of FIG. 5B) receives a packet but does not know where to route to, the I/O SFM routes the packet to a designated PSP SFM 33 labeled loopback SFM on the HSS (FIG. 5B). The loopback (LBK) SFM 33 provides the packet via the crossbar to the broadcast SFM BC for replication. Processing proceeds with BC sending the packet to every PSP SFM on the HSS sequentially (via sequential Req->Grant operations). The packet is tagged with a broadcast identifier as a pre-pended bit and replicated and routed via the loopback SFM 33 to send to each of the I/O SFMs, and replicated and sent to each of the PSP SFMs via the crossbar. Thus, broadcast SFM processing operates at the first or ingress HSS by performing two replication processes: 1) one on every PSP SFM; and 2) one on every I/O SFM (via the loopback SFM). At the second or egress HSS, only I/O replication (i.e. local and not PSP SFM replication) is performed. It is to be understood that the loopback SFM is a PSP SFM designated or configured for output and input right back in via a transceiver/mesh network (i.e. loopback) into a given module. In this manner the broadcast SFM is output via Mux 500 in order to facilitate efficient packet broadcasts without requiring additional queues for I/O egress processing.

Figure 18A:
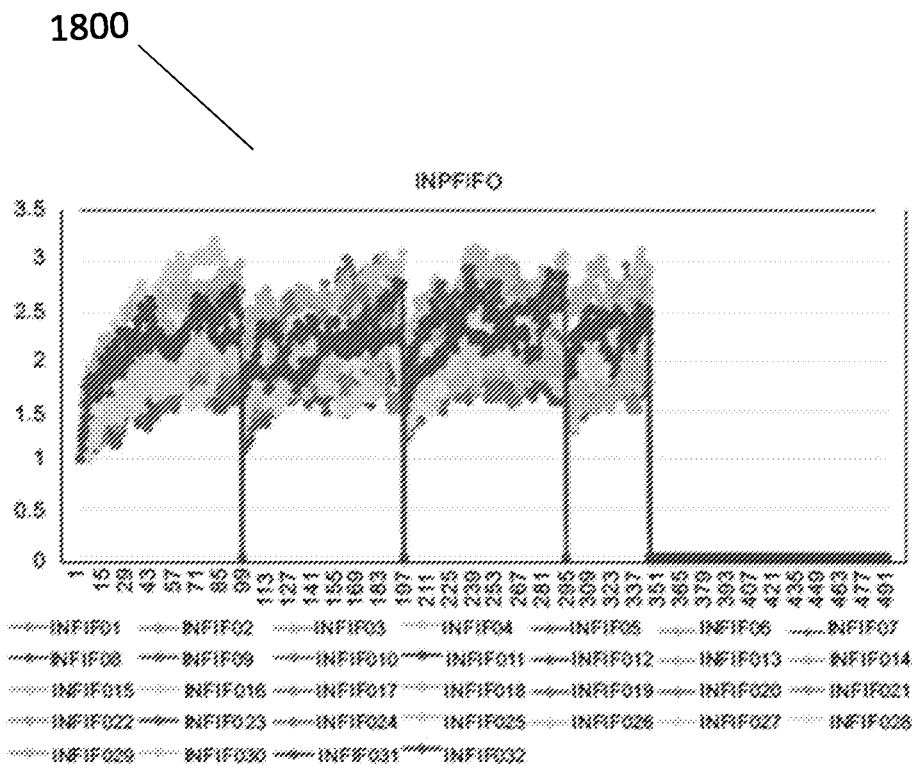
FIGS. 18A, 18B, 18C, 18D, 18E, and 18F illustrate simulation results for the system architecture according to an embodiment of the disclosure having a sixteen line-card configuration with 10 GbE ports.
Figure 18B:
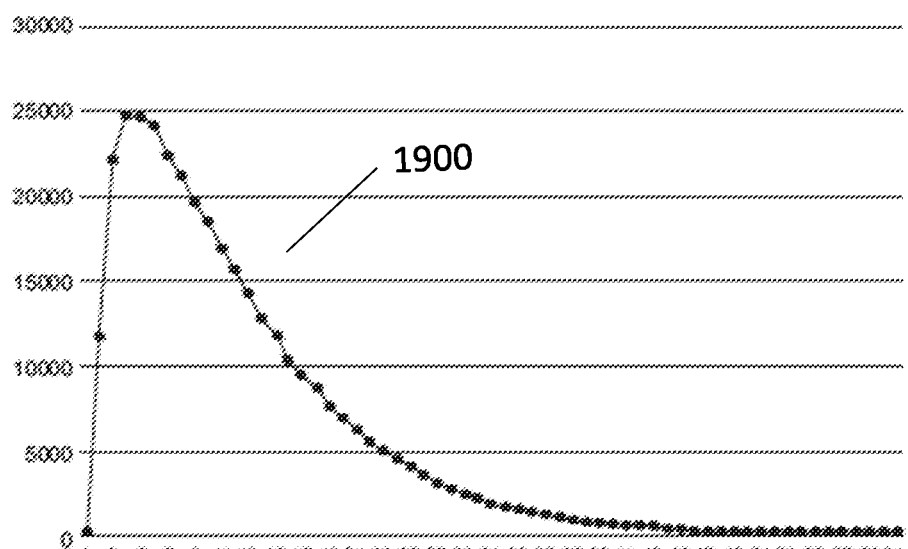
Figure 18C:
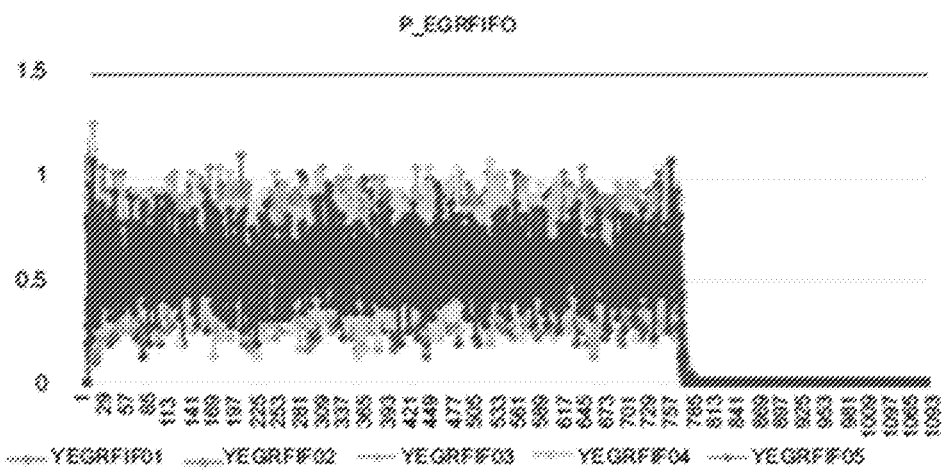
Figure 18D:
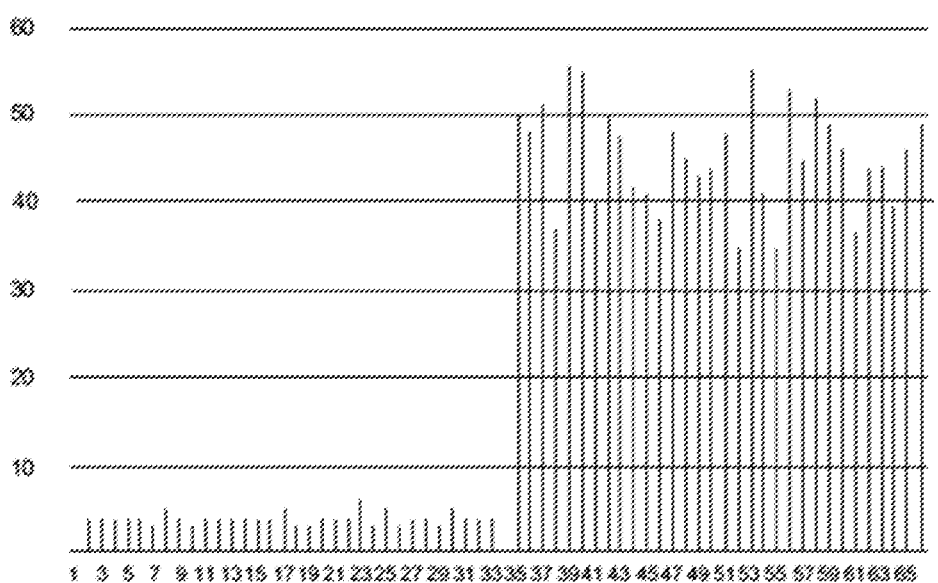
Figure 18E:
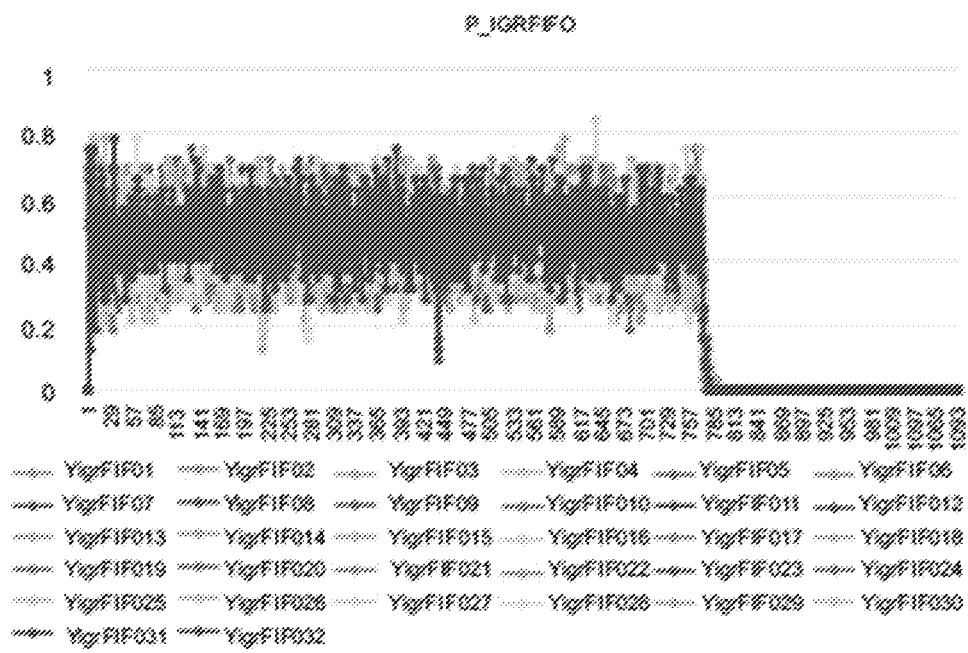
Figure 18F:
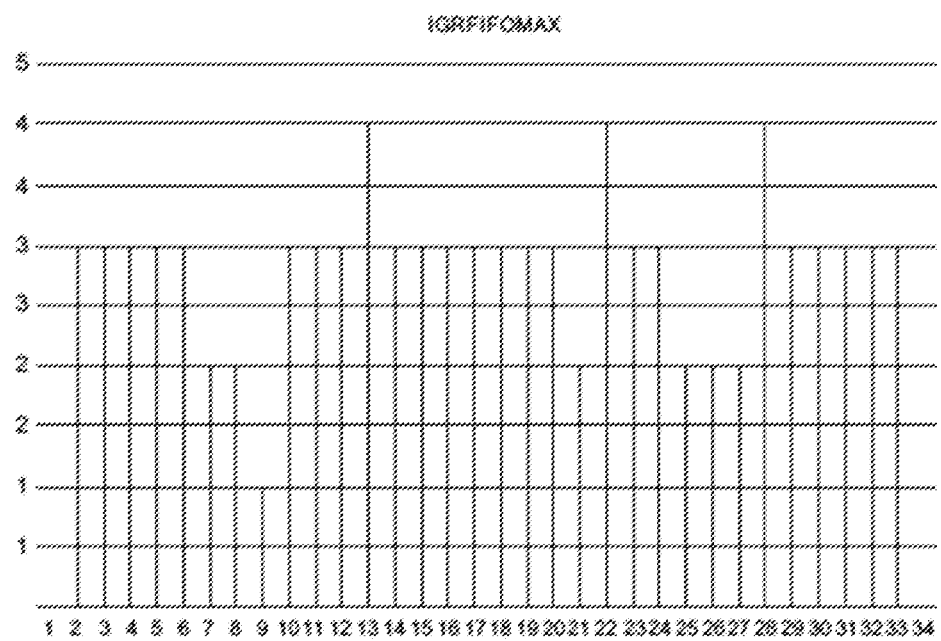
Figure 19B:
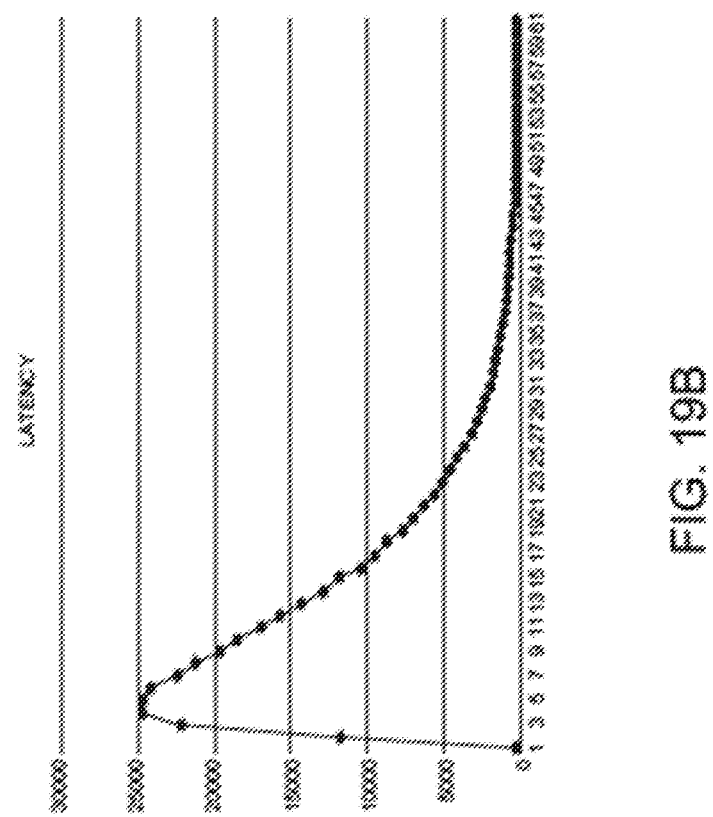
FIGS. 19A and 19B illustrate simulation results for an input FIFO of the an I/O SFM of the HSS executing relative to the I/O input rate and relative latency.
Figure 19A:
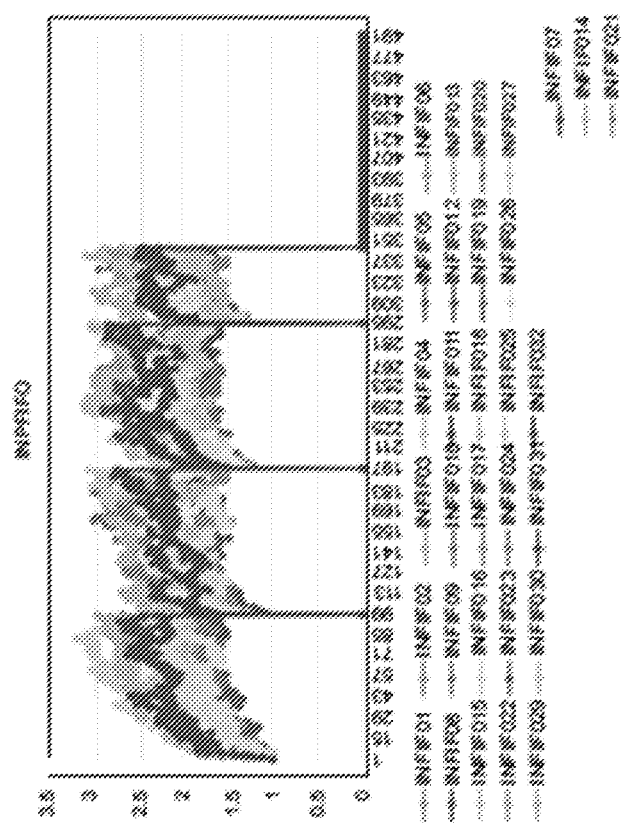

FIGS. 18A, 18B, 18C, 18D, 18E, and 18F shows the results of a 500-cycle simulation of ingress and egress FIFOs for the system architecture in a sixteen line-card configuration with 10 GbE ports. Correspondingly, there is a total of 1024 ports in the setup with 4 Ingress Hyper Cylinders and 2 Egress per HSS (see FIG. 5B—Hyper Cylinders depicted as shades of blue (S1-S4) in the Ingress section). Whereby, each Hyper Cylinder has its independent arbitration system that reduces collisions, congestion, and latency ultimately. In all plots, the flat line curves represent well-behaved buffers, under control, and stable, with the slight exception of the INPFIFO curve 1800 (Input FIFO) which nevertheless, represents a stable system (FIG. 18A). The INPFIFO resides in the front-end of the Ingress section and stages packets before granted connection and transferred through the Crossbar and into the PSP SFM. The minor variation of the INPFIFO buffer queued data packets, relative to the other buffering, results since the simulation packet transfer rate from the Ingress FIFO to the PSP Egress FIFO was run at the minimum of 1.3× of the I/O input rate. When increased by a relatively marginal 10%, the INPFIFO levels out, and latency decreases, as depicted in FIG. 18B. The Latency curve 1900 portrays latency by the number of packets, according to the x-axis. In the simulation with a minimum packet size 64-byte packets, the mode latency is four packets. Correspondingly, a minimum frame computing to 51 ns at 10 Gb relates to an average latency through the switch of 204 ns. With an average Ethernet packet size of 400 bytes, the latency works is 1.3 us, which is four times faster than conventional, fully loaded switches.

Figure 20:
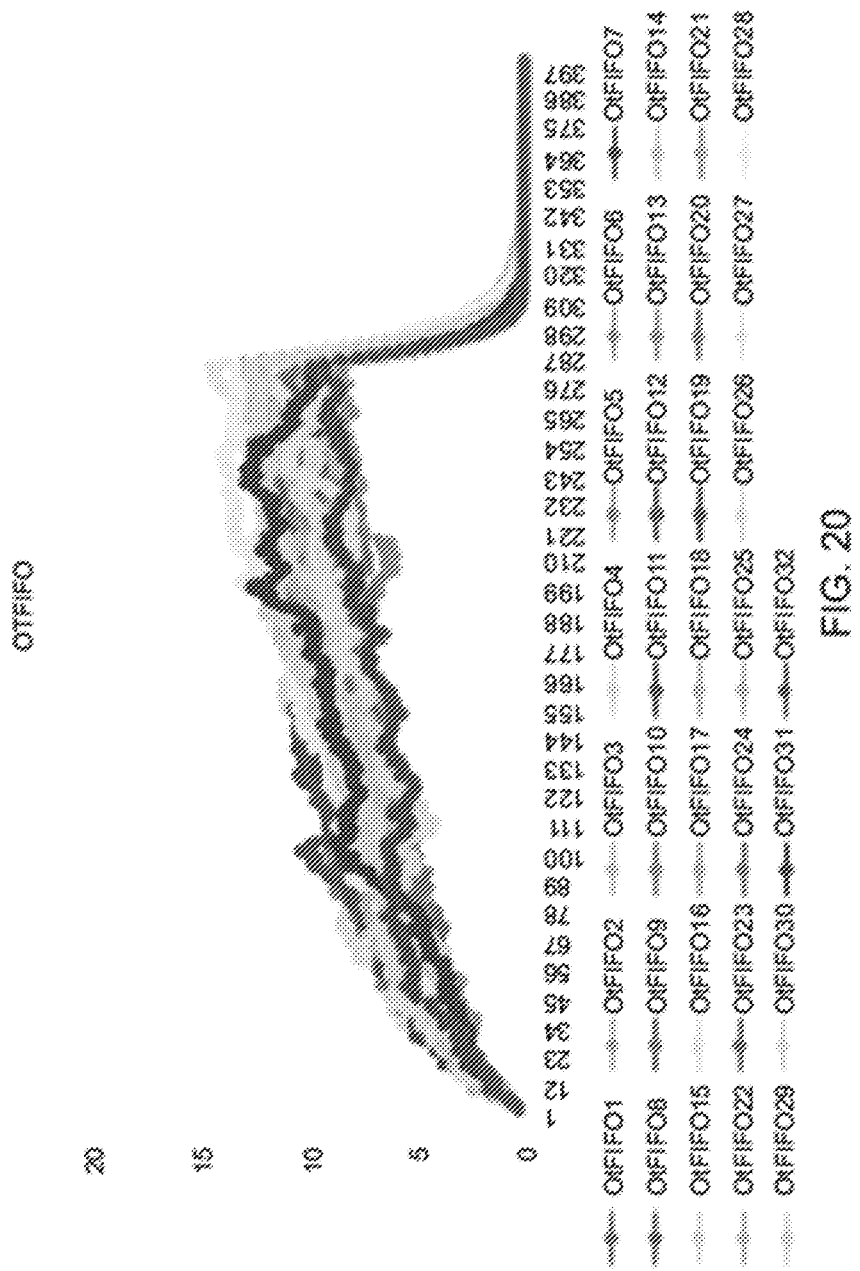
FIG. 20 shows the egress I/O SFM buffer response of a fully loaded switch having a ramp up curve relative to other buffers.

FIG. 20 shows an Egress I/O SFM buffer response of a 100% fully loaded switch, having a ramping up curve in contrast to the other buffers that are more level and under control. This ramp-up integration relates to a step function response, as the I/O Egress stage effectively becomes inundated with a surge of packets, responsive to the volume of transfers massing while propagating through the switch. The wave of data packets mounts since the internal PSP SFM rate runs two times (2×) faster than the I/O SFM rate. Over time, the data packets collectively arrive at the I/O egress effectively at once as a volume of transfers, inundating the I/O output with transactions. This surge response is to be expected (normal) for a switch stressed with a full 100% load.

As described herein, and referring to FIG. 5B, an architecture such as a system on a Chip (SoC) Hyperscale Switch Slice (HSS) or other such HSS is provided. The atomic building block of the HSS engine is represented by its Switch Flow Module (SFM) architecture, with up to 72 such modules positioned around a single chip. According to an embodiment of the disclosure, three fundamental types of SFMs are provided—I/O SFM, PSP SFM, and Broadcast SFM. The I/O SFM is broken down further into four subtypes—10, 25, 40 and 100G SFM. The I/O SFM subtypes are substantially alike other than the data bus width, which is wider for the faster speeds and the number of cycles per frame in which to perform the routing lookups.

The HSS switch engine advances the technology and includes buffering of packets on the ingress side and egress side as well after the Crossbar mux. Further, the HSS includes an architecture that allows for a simpler and less expensive logic implementation of Quality of Service (QoS) and crossbar transfer scheduling, as well as congestion management and an advanced form of virtual output queueing (VOQ) head-of-line blocking management.

The HSS switch engine includes congestion management functions including segmentation or Hyper Cylinder, Transverse Virtual Output Queueing, and Variable Valve Scheduler, which reduces implementation loss, power consumption, and latency.

Switch Flow Module (SFM)

The SFM represents the fundamental building block of the HSS, and effectively creates a single port switch. Two fundamentally different types of SFMs, the I/O SFM and direct connect or PSP SFMs, are shown schematically in the exploded blocks of FIG. 5B. The I/O SFM contains a Hash Lookup Table (HLUT), OpenFlow, Ingress and Egress FIFO queues, Transverse Virtual Output Queueing, Variable Valve Scheduler, and Quality of Service as well as the Control plane MAC Learning, MAC Propagation, MAC Aging, and Telemetry interfaces. In an embodiment, 26 I/O SFMs are configured or instantiated per HSS, with the hyper cylinder segmentation banding together a subset of SFMs. The PSP SFM, unlike the I/O SFM, includes a HLUT that determines routing via a prepend indicator 610 inserted by the I/O SFM earlier in the transmission chain, and is without a control plane interface. In one example implementation, the I/O SFM is tethered to an Ethernet MAC 10 (FIG. 5B), and the PSP SFM to a Xilinx Aurora MAC 585 (FIG. 5B).

Hyper Cylinder Segmentation

In one aspect of the disclosure, each of the N (N=26) I/O SFMs for the 10G line card are grouped into four segments shown in FIG. 5B and marked on the left as S1-S4 for the I/O SFM and two segments shown on the right for the PSP SFM (P1, P2), with each shaded segment being a "Hyper Cylinder." Each Hyper Cylinder fires independently and improves congestion performance. The Hyper Cylinder smooths congestion by resolving the scenario where instead of 24 SFP SFMs competing for a PSP SFM link, only eight (8) vie for connection. With only eight SFMs contending, the probability of completing a connection on the initial try are significantly increased. In addition, the Hyper Cylinder design allows the HSS switch engine to run smoother, limiting misfires and streamlining latency performance. The PSP SFM packet transfer system also employs a similar architecture of just two cylinders rather than four, with excellent performance considering the higher throughput of its interface and capability to transfer packets at significant speeds.

The overall HSS from an ASIC perspective is shown in the prior figures with an exemplary line card containing two HSS for the 10G Line card and three for the other line card types—25/40/100G. The figure represents the 100G type. The fabric interface comprises 48 lines running at 25G for a total bandwidth of 1,200 Gbps per HSS.

Transverse Virtual Output Queueing—TVOQ

In the current implementations of modular switches, a typical virtual output queueing (VOQ) architecture defines at the ingress port of the switch engine ASIC a separate FIFO queue per each egress port. For example, with a ten egress-port switch engine, there would be ten ingress FIFO queues per ingress port, for a total of 100 ingress FIFO queues. Such approach to VOQ implementation increases the complexity of the design geometrically for the number of ingress and egress ports (M×N). Ultimately, the crossbar multiplexing of this design may be become inordinately complex and require the designer to add an additional networking ASIC chip. Such an approach to congestion management may work in certain instances, however, it operates at the cost of complexity and power consumption.

TVOQ implementation according to an embodiment of the present disclosure streamlines operation and uses just a single FIFO queue which simplifies the architecture. The TVOQ implementation, traverses rapidly from the front of the line, one at a time, to N packets deep, and requests a connection to the designated egress side buffer. Once the traversing reaches N packets deep, the algorithm modulo wraps around and returns to the front of the line and starts requesting again.

Without a grant from the egress side, the TVOQ module automatically steps down the FIFO queue entries, successively seeking a connection to the designated egress port. In this manner, the TVOQ process relieves the design pressure and maintain implementation of a three-chip design rather than a lossy four chip, which leads to excessive power dissipation, while supercharging latency performance like that of legacy VOQ approaches.

Variable Valve Timing Scheduler—VVTS

Traditional market-based switch schedulers designed to transport packets from ingress to egress according to fairness algorithms, employ a complicated timing scheme, whereby crossbar transfer sequences take place on a fixed interval. By having a predetermined timeframe intended for greater predictability, the packets ultimately get broken-up and traverse through the switch in equal-sized segments. Those segments must get reassembled, in proper order, before output to the switch destination port. The logic and timing involved in reordering the pieces back into a complete, holistic packet is fraught with complex and balky operations.

According to an aspect of the present disclosure, there is provided a real-time scheduler whereby ingress to egress transfers are performed per a request and grant "on-demand" basis. Rather than the ingress being synchronized to periodic scheduling, the scheduler reacts instantly to the next packet in line at the moment the current transfer completes. This instantaneous reaction to the next transfer inline represents the variable portion of the valve scheduler.

With the grant logic residing at each egress stage of the SFM per Hyper Cylinder, grants are determined in a randomized fashion depending upon the combination of ingress requestors through a cascade of lookup-table levels. In addition, the system implements a first-stage round-robin to ensure that packets do not slip through the cracks or wait too long as a result of the random arbitration. This round-robin—randomized implementation, has been proven through simulations using a 100% fully loaded switch. The system liberates prolific connections at any instant in time, with the switch easing congestion on-demand. The majority of packets exit after just three packet timeframes or less, 1.2 us at 500 bytes per and fourteen packet timeframes under worst-case conditions. Combining the VVTS with the Hyper Cylinder, the system design provides two congestion reducer innovations in the switch engine, and more significantly advanced latency performance.

Telemetry

The SFM provides various and diverse telemetry data for system monitoring and assessment, including line card health power state variables, Ethernet packet statistics, ingress and egress FIFO depth statistics, and packet latency distribution from ingress to egress. The HSS periodically collects the various measurements while the Control plane ultimately gathers telemetry from each line card. The information is then made available to the network administrator via a GUI or remote database sampling. The FIFO depth statistics are crucial parameters to network analyses, including determining where the network may be experiencing heavy traffic, and providing insight for mitigation of potential network problems.

While the foregoing invention has been described with reference to the above-described embodiments, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A hyperscale switch device (HSS) comprising:
   a plurality of input/output (I/O) switch flow modules instantiated on an integrated circuit in switchable communication via a cross bar switch, with a plurality of direct connect switch flow modules (PSP SFMs) instantiated on said integrated circuit, for transferring data packets between external devices,
   wherein for the plurality of input/output (I/O) switch flow modules instantiated on the integrated circuit, each said I/O switch flow module instantiation having:
   on an ingress side, a forwarding engine configured to receive and forward data packets; and an interface responsive to the forwarding engine for communicating a data packet out from the I/O switch module according to a port number provided by the forwarding engine; wherein the forwarding engine receives a network address identifier received in a data packet at an I/O port for transmission to a destination I/O port, and determines an internal port number for routing by the switch engine out from the switch module, according to a lookup table which maps internal port numbers of the switch module with destination I/O ports corresponding to peripheral devices connected to a network; and a First-In-First-Out (FIFO) queue configured to receive data packets via an input serializer/deserializer interface at a given bit rate, and transmit the data packet outside of the switch flow module to another switch flow module designated according to a router table and responsive to a grant from the designated switch flow module upon the raising of a real-time request; and
   on an egress side, a sequencer configured to receive multiple independent data packets at an input of the sequencer responsive to requests for connection from external switch flow modules connectable via an internal switch matrix, and sequentially transmit each data packet to a corresponding port of an external device;
   wherein for said plurality of direct connect switch flow modules (PSP SFMs) instantiated on said integrated circuit, each said direct connect switch flow module instantiation having:
   on an ingress side, a FIFO queue for receiving data packets via an input serializer/deserializer interface at a given bit rate, and for transmitting the data packet outside of the switch flow module to a particular port in accordance with a data packet indicator and responsive to a grant from an another switch flow module associated with the particular port of a real-time request;
   on an egress side, a sequencer configured to receive multiple independent data packets at an input of the sequencer responsive to requests for connection from other switch flow modules connectable via an internal switch matrix, and to sequentially transmit each data packet to a corresponding port of an external integrated circuit element;
   thereby reducing the number of transceiver hops needed to progress a data packet from a source external I/O port to a destination external I/O port.

2. The hyperscale switch device of claim 1, wherein the lookup table mapping is generated through internal learning means or through external programming via an OpenFlow protocol and a LAN hypervisor server.

3. The hyperscale switch device of claim 2, further comprising said I/O switch flow module comprising a sequencer module configured to interface with an external controller according to a predetermined protocol to obtain routing information and LAN topology for data packet routing out of the I/O switch flow module.

4. The hyperscale switch device of claim 2, wherein the sequencer module includes a Hash look-up table to a) determine the port number and b) pre-pend onto the data packet in the FIFO queue and c) route said data packet out of the switch flow module for transfer to an external integrated circuit.

5. The hyperscale switch device of claim 4, wherein the external integrated circuit is an intermediate integrated circuit connected to the end point integrated circuit via a direct connect mesh network.

6. The hyperscale switch device of claim 5, wherein the external integrated circuit is an intermediate integrated circuit connected to the end point integrated circuit via a multi-level network.

7. The hyperscale switch device of claim 4, wherein the sequencer is configured to store in a queue only a preset number of packets for output via the switch engine, and wherein, when multiple packets reside in the sequential queue for output via the switch engine, the sequencer causes the switch engine to sequentially output real-time, on demand connection requests for corresponding packets in said queue based on their order within the sequential queue and according to an arbitration, whereby, on the condition that a grant acknowledgement of the given connection request is not received after a given number of clock cycles, the sequencer outputs a new connection request for the next packet in the line, on the condition that said indicator points to a destination address distinct from the preceding destination addresses in the queue.

8. The hyperscale switch device of claim 7, wherein a single FIFO queue stores all of said data packets.

9. The hyperscale switch device of claim 1, wherein when the number of data packets in the I/O SFM ingress FIFO queue exceeds a predetermined threshold, the I/O SFM sequencer raises a request to establish connection with another switch flow module for transferring data packets from said FIFO queue into high bandwidth memory via said another switch flow module upon grant of said connection request.

10. The hyperscale switch device of claim 2, further comprising on the egress side, an arbiter configured to resolve simultaneous requests received from other switch flow modules.

11. The hyperscale switch device of claim 10, wherein on the ingress side, the sequencer is configured to pre-pend a data packet priority bit indicator for downstream VLAN routing of said data packet according to one or more protocols.

12. The hyperscale switch device of claim 10, wherein, on the egress side, the egress sequencer is responsive to a priority indicator of said data packet to sort data packets according to priority for VLAN routing of said data packet.

13. The hyperscale switch device of claim 10, further comprising a plurality of independent arbiters, each associated with a respective egress FIFO queue, for granting parallel requests to transfer data packets from select sub-groupings of other switch flow modules, to thereby reduce congestion for data packet transfer connections.

14. The hyperscale switch device of claim 2, wherein the sequencer module interfaces with a control plane processor to accept routing information and LAN topology according to updates in the routing table.

15. The hyperscale switch device of claim 2, wherein the sequencer module interfaces with a control plane processor to accept routing information and LAN topology according to an Openflow protocol.

16. The hyperscale switch device of claim 1, wherein, on the condition that said I/O SFM cannot determine the destination switch flow module for routing of said data packet, said I/O SFM routes the data packet to a designated switch flow module for packet replication and broadcast via sequential request and grant operations via the crossbar, and wherein each said replicated data packet is tagged with a broadcast identifier.

* * * * *